US011655950B2

(12) United States Patent
Wilcox et al.

(10) Patent No.: US 11,655,950 B2
(45) Date of Patent: May 23, 2023

(54) LIGHTING DEVICES HAVING OPTICAL WAVEGUIDES FOR CONTROLLED LIGHT DISTRIBUTION

(71) Applicant: IDEAL INDUSTRIES LIGHTING LLC, Racine, WI (US)

(72) Inventors: Kurt Wilcox, Libertyville, IL (US); Jin Hong Lim, Morrisville, NC (US); Curt Progl, Raleigh, NC (US); Steve Wilcenski, Cary, NC (US); Zongjie Yuan, Libertyville, IL (US)

(73) Assignee: IDEAL INDUSTRIES LIGHTING LLC, Racine, WI (US)

( * ) Notice: Subject to any disclaimer, the term of this patent is extended or adjusted under 35 U.S.C. 154(b) by 0 days.

(21) Appl. No.: 17/672,510

(22) Filed: Feb. 15, 2022

(65) Prior Publication Data

US 2022/0170603 A1 Jun. 2, 2022

Related U.S. Application Data

(60) Continuation-in-part of application No. 16/392,978, filed on Apr. 24, 2019, and a continuation-in-part of
(Continued)

(51) Int. Cl.
*F21S 8/08* (2006.01)
*F21V 21/116* (2006.01)
(Continued)

(52) U.S. Cl.
CPC .............. *F21S 8/088* (2013.01); *F21S 8/086* (2013.01); *F21V 5/00* (2013.01); *F21V 21/116* (2013.01);
(Continued)

(58) Field of Classification Search
CPC .. G02B 6/0016; G02B 6/0021; G02B 6/0031; F21V 21/116; F21S 8/086; F21S 8/088
See application file for complete search history.

(56) References Cited

U.S. PATENT DOCUMENTS 5,857,770 A 1/1999 Fohl et al.
6,464,365 B1 10/2002 Gunn et al.
(Continued)

OTHER PUBLICATIONS

International Search Report and Written Opinion for International Patent Application No. PCT/US2020/022229, dated Jun. 18, 2020, 15 pages.
(Continued)

*Primary Examiner* — Jong-Suk (James) Lee
*Assistant Examiner* — Christopher E Dunay
(74) *Attorney, Agent, or Firm* — J Clinton Wimbish; Nexsen Pruet, PLLC

(57) ABSTRACT

Lighting devices having optical waveguides for controlled light distribution are provided. A lighting device includes a housing, a light emitter disposed in the housing, and a waveguide at least partially disposed in an opening of the housing. The waveguide includes a light input surface defining coupling features, wherein the light emitter is disposed adjacent the light input surface and emits light into the coupling features. The waveguide further includes a light transmission portion disposed between the light input surface and a light extraction portion, wherein light from the light emitter received at the light input surface propagates through the light transmission portion toward the light extraction portion. The waveguide further includes the light extraction portion, which comprises at least one light redirection feature and at least one light extraction feature that cooperate to generate a controlled light pattern exiting the lighting device.

20 Claims, 57 Drawing Sheets

Related U.S. Application Data application No. 16/369,138, filed on Mar. 29, 2019, now Pat. No. 11,249,239, said application No. 16/392,978 is a division of application No. 15/192,979, filed on Jun. 24, 2016, now Pat. No. 10,317,608, which is a continuation-in-part of application No. 15/060,306, filed on Mar. 3, 2016, now Pat. No. 9,841,154, and a continuation-in-part of application No. 15/060,354, filed on Mar. 3, 2016, now Pat. No. 9,835,317, and a continuation-in-part of application No. 14/657,988, filed on Mar. 13, 2015, now Pat. No. 9,709,725, and a continuation-in-part of application No. 14/485,609, filed on Sep. 12, 2014, now Pat. No. 9,952,372, and a continuation-in-part of application No. 29/496,754, filed on Jul. 16, 2014, now Pat. No. Des. 764,091, and a continuation-in-part of application No. PCT/US2014/030017, filed on Mar. 15, 2014.

(60) Provisional application No. 62/301,559, filed on Feb. 29, 2016, provisional application No. 62/301,572, filed on Feb. 29, 2016, provisional application No. 62/025,905, filed on Jul. 17, 2014, provisional application No. 62/025,436, filed on Jul. 16, 2014, provisional application No. 62/005,965, filed on May 30, 2014.

(51) Int. Cl.

| | | |
|---|---|---|
| *F21V 8/00* | (2006.01) | |
| *G02B 6/24* | (2006.01) | |
| *G02B 6/26* | (2006.01) | |
| *G02B 6/30* | (2006.01) | |
| *G02B 6/32* | (2006.01) | |
| *G02B 6/34* | (2006.01) | |
| *F21V 5/00* | (2018.01) | |
| *F21V 29/51* | (2015.01) | |
| *F21Y 113/13* | (2016.01) | |
| *F21Y 115/10* | (2016.01) | |
| *F21W 131/103* | (2006.01) | |

(52) U.S. Cl.
CPC ......... *G02B 6/0006* (2013.01); *G02B 6/0016* (2013.01); *G02B 6/0021* (2013.01); *G02B 6/0031* (2013.01); *G02B 6/0035* (2013.01); *G02B 6/0036* (2013.01); *G02B 6/0045* (2013.01); *G02B 6/0055* (2013.01); *G02B 6/24* (2013.01); *G02B 6/262* (2013.01); *G02B 6/305* (2013.01); *G02B 6/32* (2013.01); *G02B 6/34* (2013.01); *F21V 29/51* (2015.01); *F21W 2131/103* (2013.01); *F21Y 2113/13* (2016.08); *F21Y 2115/10* (2016.08)

(56) References Cited

U.S. PATENT DOCUMENTS

| | | |
|---|---|---|
| 7,661,865 B2 | 2/2010 | Baba |
| 8,425,102 B2 | 4/2013 | Rinko |
| 8,541,795 B2 | 9/2013 | Keller et al. |
| 8,736,186 B2 | 5/2014 | Chobot |
| 8,829,821 B2 | 9/2014 | Chobot et al. |
| 8,912,735 B2 | 12/2014 | Chobot et al. |
| 8,975,827 B2 | 3/2015 | Chobot et al. |
| 9,155,165 B2 | 10/2015 | Chobot |
| 9,155,166 B2 | 10/2015 | Chobot |
| 9,303,823 B2 | 4/2016 | Hu et al. |
| 9,366,799 B2 | 6/2016 | Wilcox et al. |
| 9,389,367 B2 | 7/2016 | Yuan et al. |
| 9,411,086 B2 | 8/2016 | Yuan et al. |
| 9,433,061 B2 | 8/2016 | Chobot |
| 9,464,778 B2 | 10/2016 | Yuan et al. |
| 9,519,095 B2 | 12/2016 | Wilcox et al. |
| 9,568,662 B2 | 2/2017 | Lim et al. |
| 9,572,226 B2 | 2/2017 | Motley et al. |
| 9,581,750 B2 | 2/2017 | Wilcox et al. |
| 9,581,751 B2 | 2/2017 | Yuan et al. |
| 9,622,321 B2 | 4/2017 | Creasman et al. |
| 9,625,636 B2 | 4/2017 | Durkee et al. |
| 9,690,029 B2 | 6/2017 | Keller et al. |
| 9,709,725 B2 | 7/2017 | Wilcox et al. |
| 9,726,330 B2 | 8/2017 | Wilcox et al. |
| 9,773,760 B2 | 9/2017 | Keller et al. |
| 9,786,639 B2 | 10/2017 | Bergmann et al. |
| 9,791,110 B2 | 10/2017 | Hu et al. |
| 9,798,072 B2 | 10/2017 | Wilcenski et al. |
| 9,815,424 B2 | 11/2017 | Oku et al. |
| 9,818,919 B2 | 11/2017 | Lowes et al. |
| 9,835,317 B2 | 12/2017 | Yuan et al. |
| 9,869,432 B2 | 1/2018 | Keller et al. |
| 9,952,372 B2 | 4/2018 | Wilcox et al. |
| 10,042,106 B2 | 8/2018 | Wilcox et al. |
| 10,278,250 B2 | 4/2019 | McBryde et al. |
| 10,527,585 B2 | 1/2020 | Kuhnen et al. |
| 2005/0243243 A1 | 11/2005 | Koganezawa |
| 2006/0114690 A1 | 6/2006 | Iki et al. |
| 2008/0232107 A1 | 9/2008 | Hsu |
| 2011/0199774 A1* | 8/2011 | Shinohara ............ G02B 6/0018 359/599 |
| 2011/0242837 A1 | 10/2011 | Cornelissen et al. |
| 2011/0310633 A1* | 12/2011 | Morgan ............... H01L 31/0547 362/558 |
| 2012/0113676 A1* | 5/2012 | Van Dijk .............. G02B 6/0078 362/606 |
| 2013/0039090 A1* | 2/2013 | Dau ....................... F21V 7/0033 362/217.05 |
| 2014/0091332 A1* | 4/2014 | Medendorp, Jr. .... G02B 6/0076 257/88 |
| 2014/0192550 A1 | 7/2014 | De Zwart et al. |
| 2014/0211496 A1* | 7/2014 | Durkee ..................... F21S 8/04 362/555 |
| 2014/0268790 A1 | 9/2014 | Chobot et al. |
| 2015/0003092 A1 | 1/2015 | Gebauer |
| 2016/0282550 A1 | 9/2016 | Lee et al. |
| 2017/0231066 A1 | 8/2017 | Roberts et al. |
| 2018/0024289 A1 | 1/2018 | Fattal |

OTHER PUBLICATIONS

Non-Final Office Action for U.S. Appl. No. 16/369,138, dated Apr. 3, 2020, 11 pages.
Final Office Action for U.S. Appl. No. 16/369,138, dated Sep. 18, 2020, 12 pages.
Advisory Action for U.S. Appl. No. 16/369,138, dated Nov. 24, 2020, 3 pages.
Non-Final Office Action for U.S. Appl. No. 16/369,138, dated Jan. 27, 2021, 12 pages.
Final Office Action for U.S. Appl. No. 16/369,138, dated May 17, 2021, 13 pages.
Advisory Action for U.S. Appl. No. 16/369,138, dated Aug. 27, 2021, 3 pages.
Notice of Allowance for U.S. Appl. No. 16/369,138, dated Oct. 8, 2021, 10 pages.

* cited by examiner

LIGHTING DEVICES HAVING OPTICAL WAVEGUIDES FOR CONTROLLED LIGHT DISTRIBUTION

RELATED APPLICATIONS

This application is a continuation-in-part of U.S. patent application Ser. No. 16/392,978, filed Apr. 24, 2019, which is a division of U.S. patent application Ser. No. 15/192,979, now U.S. Pat. No. 10,317,608, filed Jun. 24, 2016. U.S. patent application Ser. No. 15/192,979 is a continuation-in-part of International Patent Application No. PCT/US2014/30017, filed Mar. 15, 2014. U.S. patent application Ser. No. 15/192,979 is further a continuation-in-part of U.S. patent application Ser. No. 14/485,609, filed Sep. 12, 2014, now U.S. Pat. No. 9,952,372, which claims the benefit of U.S. Provisional Patent Application Ser. No. 62/005,965, filed May 30, 2014, U.S. Provisional Patent Application Ser. No. 62/025,436, filed Jul. 16, 2014, and U.S. Provisional Patent Application Ser. No. 62/025,905, filed Jul. 17, 2014. U.S. patent application Ser. No. 15/192,979 is further a continuation-in-part of U.S. patent application Ser. No. 14/657,988, now U.S. Pat. No. 9,709,725, filed Mar. 13, 2015, which claims the benefit of U.S. Provisional Patent Application Ser. No. 62/005,965, filed May 30, 2014, U.S. Provisional Patent Application Ser. No. 62/025,436, filed Jul. 16, 2014, and U.S. Provisional Patent Application Ser. No. 62/025,905, filed Jul. 17, 2014. U.S. patent application Ser. No. 15/192,979 is further a continuation-in-part of U.S. Design patent application Ser. No. 29/496,754, now U.S. Des. Pat. No. D764,091, filed Jul. 16, 2014. U.S. patent application Ser. No. 15/192,979 is further a continuation-in-part of U.S. patent application Ser. No. 15/060,354, now U.S. Pat. No. 9,835,317, filed Mar. 3, 2016. U.S. patent application Ser. No. 15/192,979 is further a continuation-in-part of U.S. patent application Ser. No. 15/060,306, now U.S. Pat. No. 9,841,154, filed Mar. 3, 2016. U.S. patent application Ser. No. 15/192,979 further claims the benefit of U.S. Provisional Patent Application Ser. No. 62/301,559, filed Feb. 29, 2016, and U.S. Provisional Patent Application Ser. No. 62/301,572, filed Feb. 29, 2016, the disclosures of which are incorporated by reference herein in their entireties.

This application is a continuation-in-part of U.S. patent application Ser. No. 16/369,138, filed Mar. 29, 2019, the disclosure of which is hereby incorporated herein by reference in its entirety.

FIELD OF THE DISCLOSURE

The present disclosure relates to optical devices, and more particularly, to luminaries utilizing an optical waveguide.

BACKGROUND

An optical waveguide mixes and directs light emitted by one or more light sources, such as one or more light emitting diodes (LEDs). A typical optical waveguide includes three main components: one or more coupling elements or optics, one or more distribution elements, and one or more extraction elements. The coupling element(s) or optic(s) direct light into the distribution element(s) and condition the light to interact with the subsequent components. The one or more distribution elements control how light flows through the waveguide and have characteristics dependent on the waveguide geometry and material. The extraction element(s) determine how light is removed by controlling where and in what direction the light exits the waveguide.

In some applications such as roadway, street, or parking lot lighting, it may be desirable to illuminate certain regions surrounding a light fixture while maintaining relatively low illumination of neighboring regions thereof. For example, along a roadway, it may be preferred to direct light in an x-dimension parallel with the roadway while minimizing illumination in a y-dimension toward roadside houses. Alternatively, symmetrical 360-degree illumination may be desirable. In the further alternative, asymmetrical 360 illumination may also be desirable.

SUMMARY

Lighting devices having optical waveguides for controlled light distribution are provided. A lighting device includes a housing, a light emitter disposed in the housing, and a waveguide at least partially disposed in an opening of the housing. The waveguide includes a light input surface defining coupling features, wherein the light emitter is disposed adjacent the light input surface and emits light into the coupling features. The waveguide further includes a light transmission portion disposed between the light input surface and a light extraction portion, wherein light from the light emitter received at the light input surface propagates through the light transmission portion toward the light extraction portion. The waveguide further includes the light extraction portion, which comprises at least one light redirection feature and at least one light extraction feature that cooperate to generate a controlled light pattern exiting the lighting device.

According to one aspect, a lighting device comprises a body of optically transmissive material exhibiting a total internal reflection characteristic, the body further comprising a light input surface for receiving light, a light extraction portion spaced from the light input surface, a light transmission portion disposed between the light input surface and the light extraction portion, and at least one light deflection surface for deflecting light toward the light extraction portion. Further in accordance with this aspect the light extraction portion comprises a first extraction surface for extracting light deflected by the at least one light deflection surface out of the body and a second extraction surface for extracting light other than light deflected by the at least one light deflection surface out of the body.

According to another aspect, a lighting device comprises a body of optically transmissive material exhibiting a total internal reflection characteristic, the body further comprising a light input surface for receiving light in a first direction, a light extraction portion spaced from the light input surface, and a light transmission portion at least partially surrounding the light extraction portion and disposed between the light input surface and the light extraction portion. Further in accordance with this aspect, the light extraction portion comprises at least two spaced surfaces for directing light out of the body in a second direction comprising a directional component opposite the first direction.

According to still another aspect, a lighting device comprises a body of optically transmissive material exhibiting a total internal reflection characteristic, the body further comprising a light input surface for receiving light in a first direction, a light extraction portion spaced from the light input surface, and a light transmission portion disposed between the light input surface and the light extraction portion. Further regarding this aspect, the body comprises a width dimension, a length dimension, and a thickness dimension wherein the light extraction portion comprises first and second light reflecting surfaces disposed in a first thickness portion of the body and first and second light extraction surfaces disposed in a second thickness portion of the body for receiving light reflected off the first and second light reflecting surfaces and for directing light out of the body in a second direction comprising a directional component opposite the first direction.

According to yet another aspect, a lighting device comprises a body of optically transmissive material exhibiting a total internal reflection characteristic, the body further comprising a light input surface for receiving light in a first direction, a light extraction portion spaced from the light input surface, and a light transmission portion disposed between the light input surface and the light extraction portion. Further, in accordance with this aspect, the light extraction portion comprises a light extraction feature including a surface for directing light out of the body in a second direction comprising a directional component opposite the first direction and a portion for directing light out of the body in a direction comprising a directional component along the first direction.

According to another aspect, a luminaire comprises a body of optically transmissive material exhibiting a total internal reflection characteristic, the body further comprising a light input surface for receiving light in a first direction, a light extraction portion spaced from the light input surface, and a light transmission portion at least partially surrounding the light extraction portion. Further regarding this aspect, the body comprises a width dimension, a length dimension, and a thickness dimension wherein the light input surface is disposed on one side of the light extraction portion and the light extraction portion comprises a light extraction feature for extracting light through a light output surface in exit directions comprising directional components along the first direction and opposite the first direction. Further still in accordance with this aspect, a luminaire housing comprises a mounting apparatus that mounts the body in an orientation such that the length and width extend in substantially horizontal directions and the thickness dimension extends in a substantially vertical direction.

According to another aspect, a luminaire comprises a body of optically transmissive material exhibiting a total internal reflection characteristic, the body further comprising a light input surface for receiving light in a first direction, a light extraction portion spaced from the light input surface, and a light transmission portion disposed between the light input surface and the light extraction portion and at least partially surrounding the light extraction portion. Further according to this aspect, the body comprises a width dimension, a length dimension, and a thickness dimension wherein the light input surface is disposed on one side of the light extraction portion and the light extraction portion comprises a light extraction feature for extracting light through a light output surface in exit directions comprising directional components along the first direction and opposite the first direction. Still further regarding this aspect, a luminaire housing comprising a mounting apparatus that mounts the body in an orientation such that at least one of the length and width dimensions has a substantially vertical directional component and the thickness dimension extends in a substantially horizontal direction.

According to yet another aspect, a lighting device comprises a body of optically transmissive material exhibiting a total internal reflection characteristic, the body further comprising a light input surface for receiving light in a first direction from at least one LED, a light extraction feature comprising a light extraction surface and a light reflecting surface, and a light redirection feature configured to receive light from said input surface. Also, according to this aspect, the light reflection surface of the light extraction feature is configured to receive light from the light redirection feature and reflect the light from the light redirection feature to the light extracting surface for extraction from the body in a second direction comprising a directional component opposite the first direction. Still further according to this aspect, the light reflection surface of the light extraction feature is configured to extract light other than the light from the light redirection feature from the body in a direction comprising a directional component along the first direction.

Other aspects and advantages of the present invention will become apparent upon consideration of the following detailed description and the attached drawings wherein like numerals designate like structures throughout the specification.

In some embodiments, a waveguide comprises a light coupling portion having a first surface and a second surface. A plurality of LEDs emits light into the first surface of the light coupling portion. A light emitting portion has a third surface and a fourth surface. The light emitting portion is disposed adjacent the light coupling portion such that the third surface is disposed adjacent the second surface. A light transmission portion optically couples the light coupling portion to the light emitting portion.

A light extraction feature may be provided for extracting light through the fourth surface. The light extraction feature may be on the fourth surface. The light extraction feature may comprise at least one of indents, depressions, facets or holes extending into the fourth surface. The light extraction feature may comprise at least one of bumps, facets or steps rising above the fourth surface. The light coupling portion may have substantially the same area as the light emitting portion. The light coupling portion may have substantially the same footprint as the light emitting portion. The light coupling portion may be substantially coextensive with the light emitting portion. The first surface, the second surface, the third surface and the fourth surface may be substantially parallel to one another. The fourth surface may be a light emitting surface and the first surface may be disposed substantially parallel to the fourth surface where the plurality of LEDs may be spaced over the first surface. The light transmission portion may be substantially annular. Light may be directed radially inwardly from the light transmission portion into the light emitting portion. A second light transmission portion may optically couple the light coupling portion to the light emitting portion.

In some embodiments, a waveguide comprises a light coupling portion having a first interior surface and a first exterior surface where the first exterior surface comprises a plurality of light coupling features. A plurality of LEDs emits light into the light coupling features. A light emitting portion has a second interior surface and a second exterior surface where the second exterior surface defines a light emitting surface. The light emitting portion is disposed adjacent the light coupling portion such that the first interior surface is disposed adjacent the second interior surface. A light transmission portion optically couples the light coupling portion to the light emitting portion.

The light coupling portion and light emitting portion may be separate components connected at an interface. A light extraction feature may extract light through the second exterior surface. The light extraction feature may comprise at least one of indents, depressions, facets or holes extending into the fourth surface and bumps, facets or steps rising above the fourth surface. A footprint of the light coupling portion may be substantially the same or less than a footprint of the light emitting portion. The light coupling portion may be made of a first material and the light emitting region may be made of a second material where the first material is different than the second material. The light emitting portion may be made of glass and the light coupling portion may be made of at least one of acrylic and silicone. A second light transmission portion may optically couple the light coupling portion to the light emitting portion.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
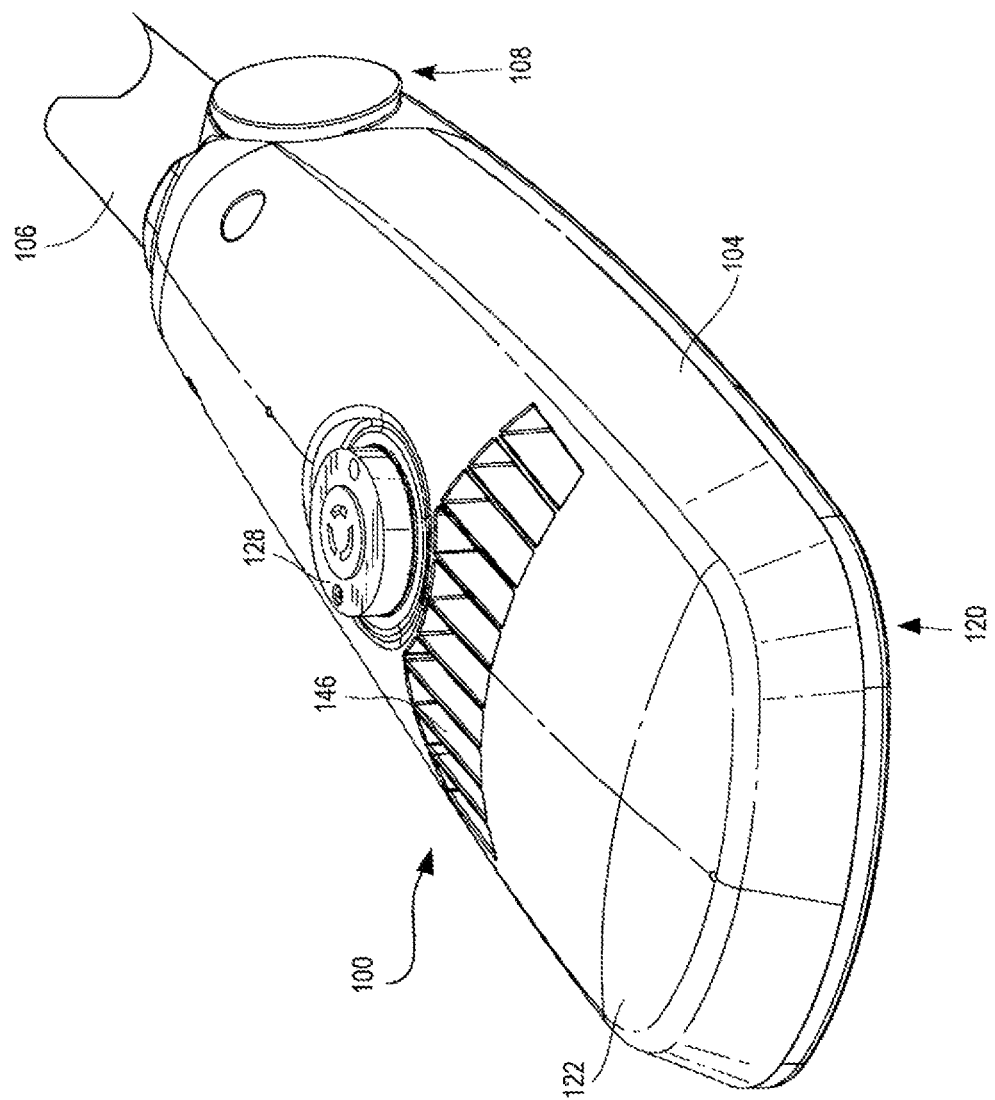
FIG. 1 is an isometric view from above of a luminaire.
Figure 2:
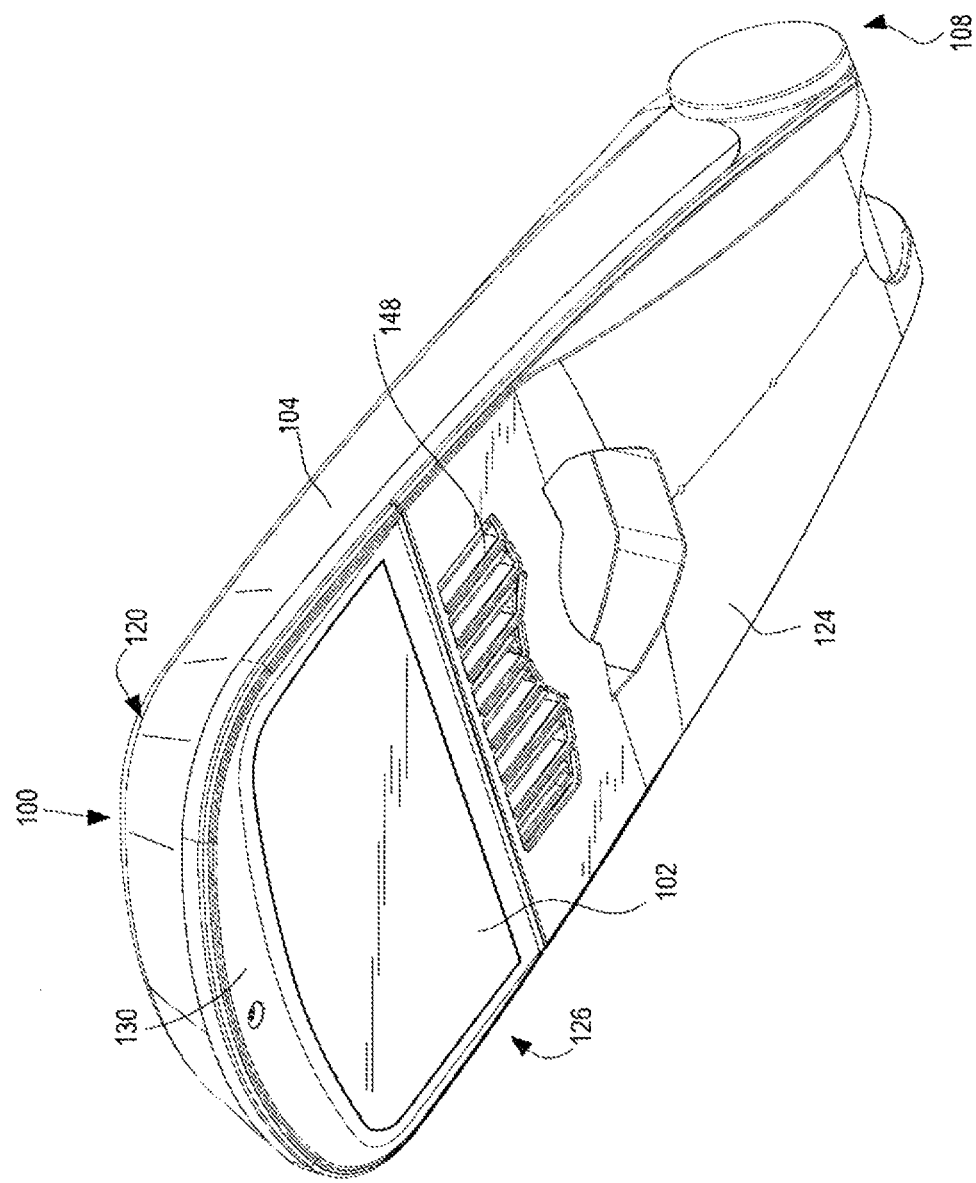
FIG. 2 is an isometric view from below of the luminaire of FIG. 1.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring to FIGS. 1-5, an embodiment of a lighting device in the form of a luminaire 100 that utilizes an optical waveguide is illustrated. FIGS. 1-5 illustrate an embodiment of the luminaire 100. The embodiments disclosed herein are particularly adapted for use in general lighting applications, for example, as an outdoor roadway (including a driveway) or parking lot luminaire, or as any other indoor or outdoor luminaire. Embodiments of the luminaire 100 may comprise any one of a number of different embodiments of waveguide bodies 102. Accordingly, the housing and generally mechanical components of the luminaire 100 are described in detail once herein, while the waveguide body embodiments 102 are separately described. Further, post top luminaire embodiments 300, 300a, 300b are described hereinbelow, each embodiment thereof also utilizing any of the embodiments of the waveguide bodies 102. Embodiments of the waveguide bodies 102 described herein may be interchangeably swapped one for another within the luminaire 100 and/or the post top luminaire(s) 300, 300*a*, 300*b*.

Figure 3:
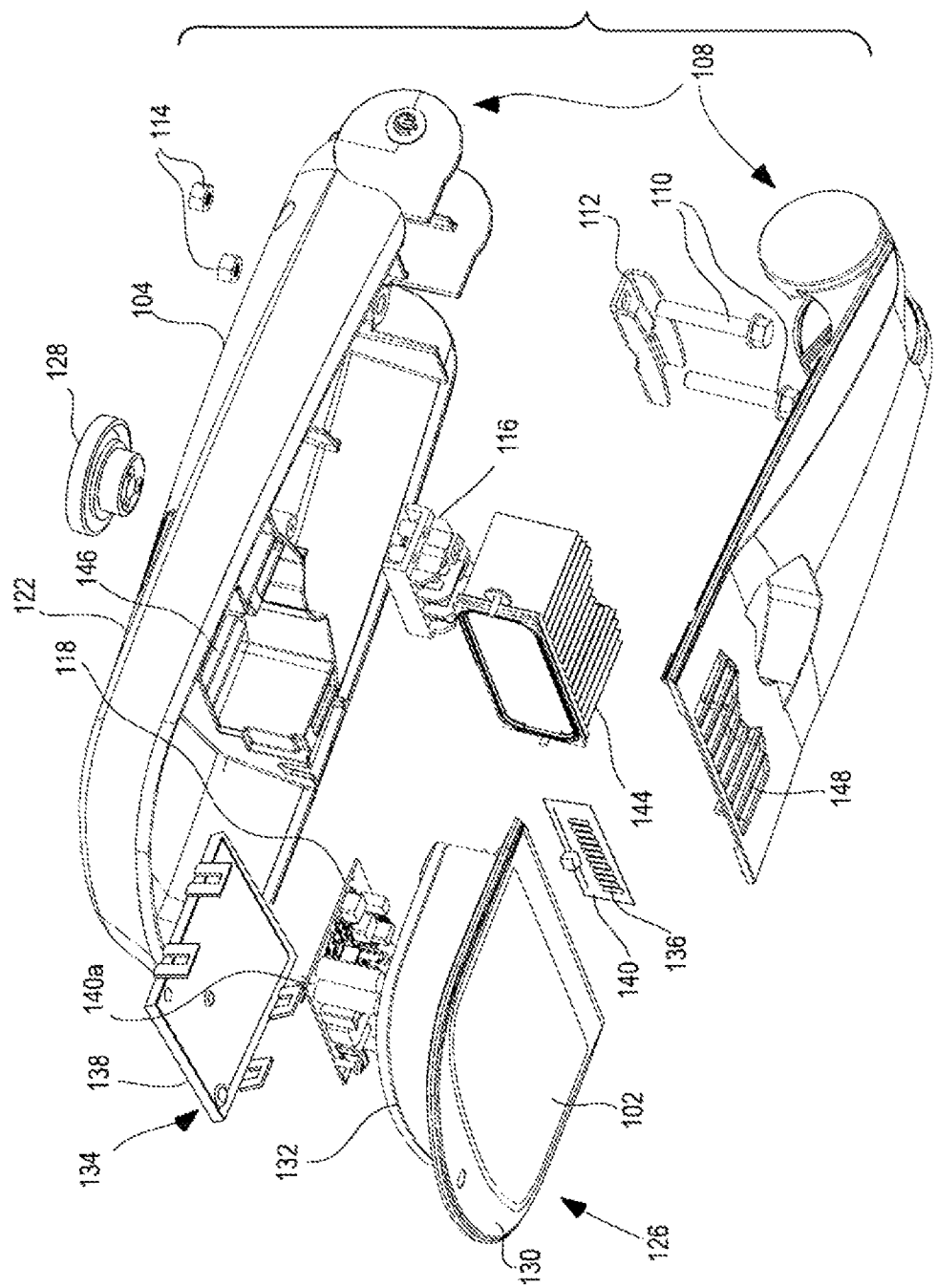
FIG. 3 is an exploded isometric view of the luminaire of FIG. 1.
Figure 4:
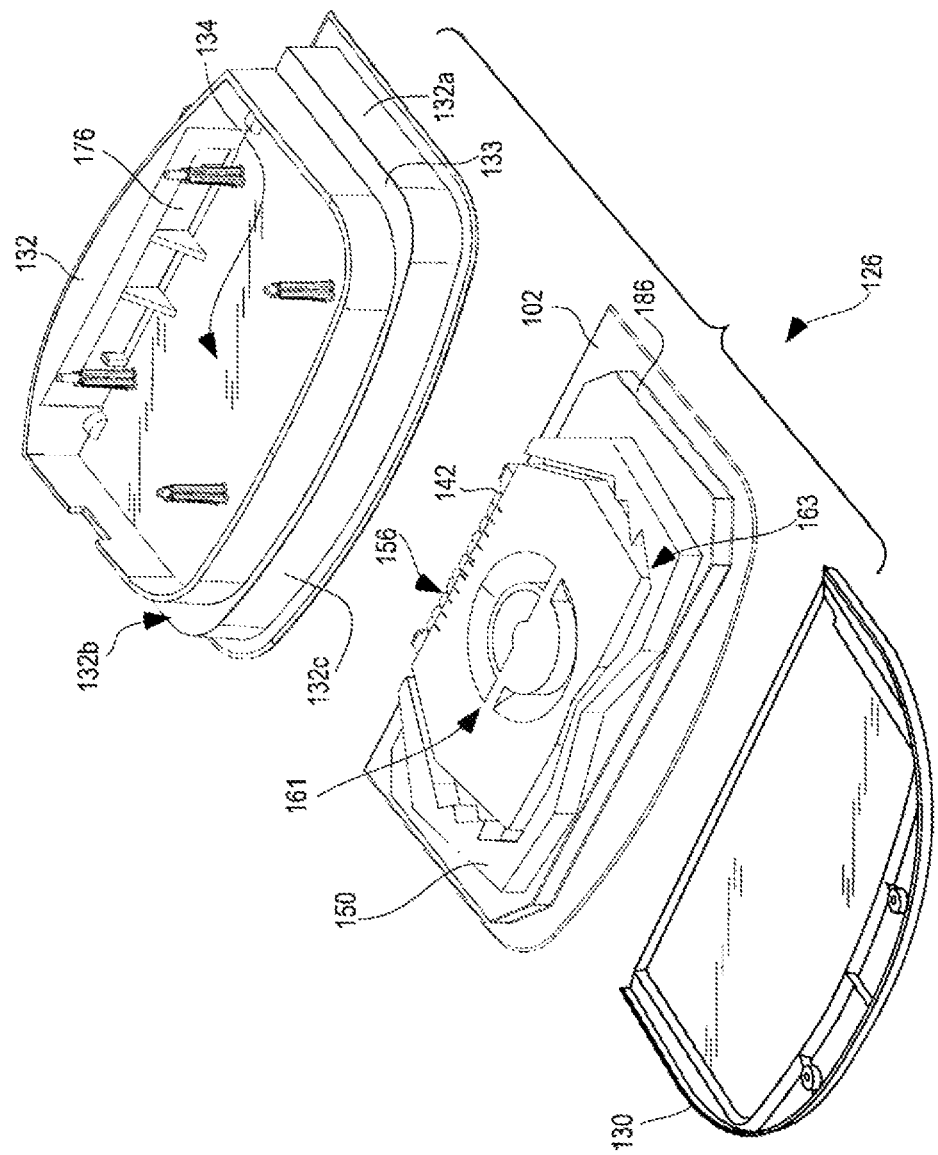
FIG. 4 is a partial exploded fragmentary isometric view from above of an optical assembly portion of FIG. 1.
Figure 5:
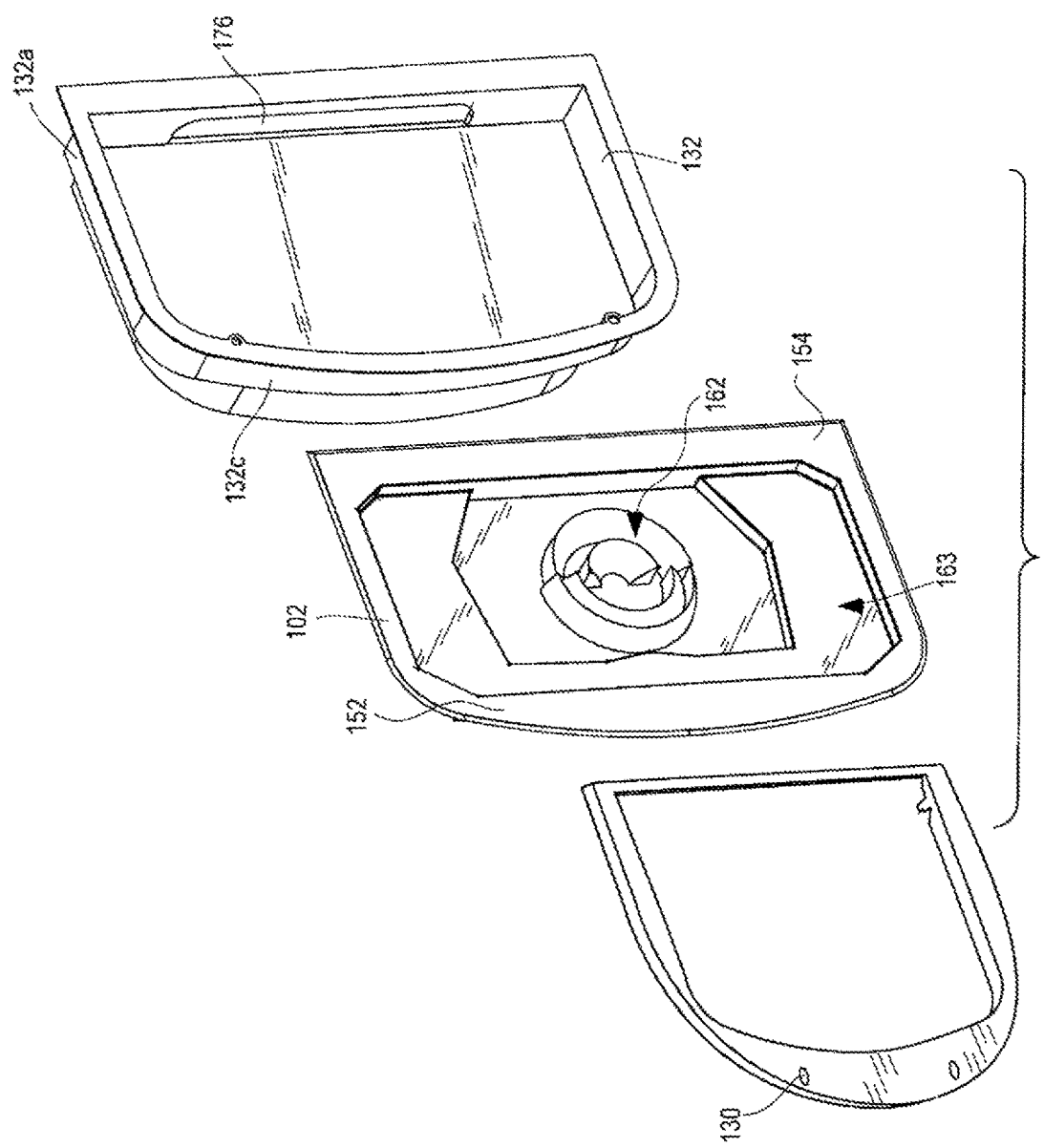
FIG. 5 is a partial exploded fragmentary isometric view from below of the optical assembly portion of FIG. 1.

The luminaire 100 includes a housing 104 adapted to be mounted on a stanchion or post 106. With reference to FIG. 3, the housing 104 includes a mounting portion 108 that is sized to accept an end of any of a number of conventional stanchions. Fasteners 110, such as threaded bolts, extend through apertures in side portions of fastening brackets 112 (only one of which is visible in FIG. 3) and are engaged by threaded nuts 114 disposed in blind bores in an upper portion of the housing 104. The stanchion 106 may be captured between the fastening brackets 112 and a lower surface of the upper portion of the housing to secure the luminaire 100 in a fixed position on the end of the stanchion 106. The housing 104 may alternatively be secured to the stanchion 106 by any other suitable means.

Referring to FIG. 3, electrical connections (i.e., line, ground, and neutral) are effectuated via a terminal block 116 disposed within the mounting portion 108. Wires (not shown) connect the terminal block 116 to an LED driver circuit 118 in the housing 104 to provide power thereto as noted in greater detail hereinafter.

Referring still to FIGS. 1-5, the luminaire 100 includes a head portion 120 comprising an upper cover member 122, a lower door 124 secured in any suitable fashion to the upper cover member 122, respectively, and an optic assembly 126 retained in the upper cover member 122. A sensor 128 may be disposed atop the mounting portion 108 for sensing ambient light conditions or other parameters and a signal representative thereof may be provided to the LED driver circuit 118 in the housing 104.

Figure 6:
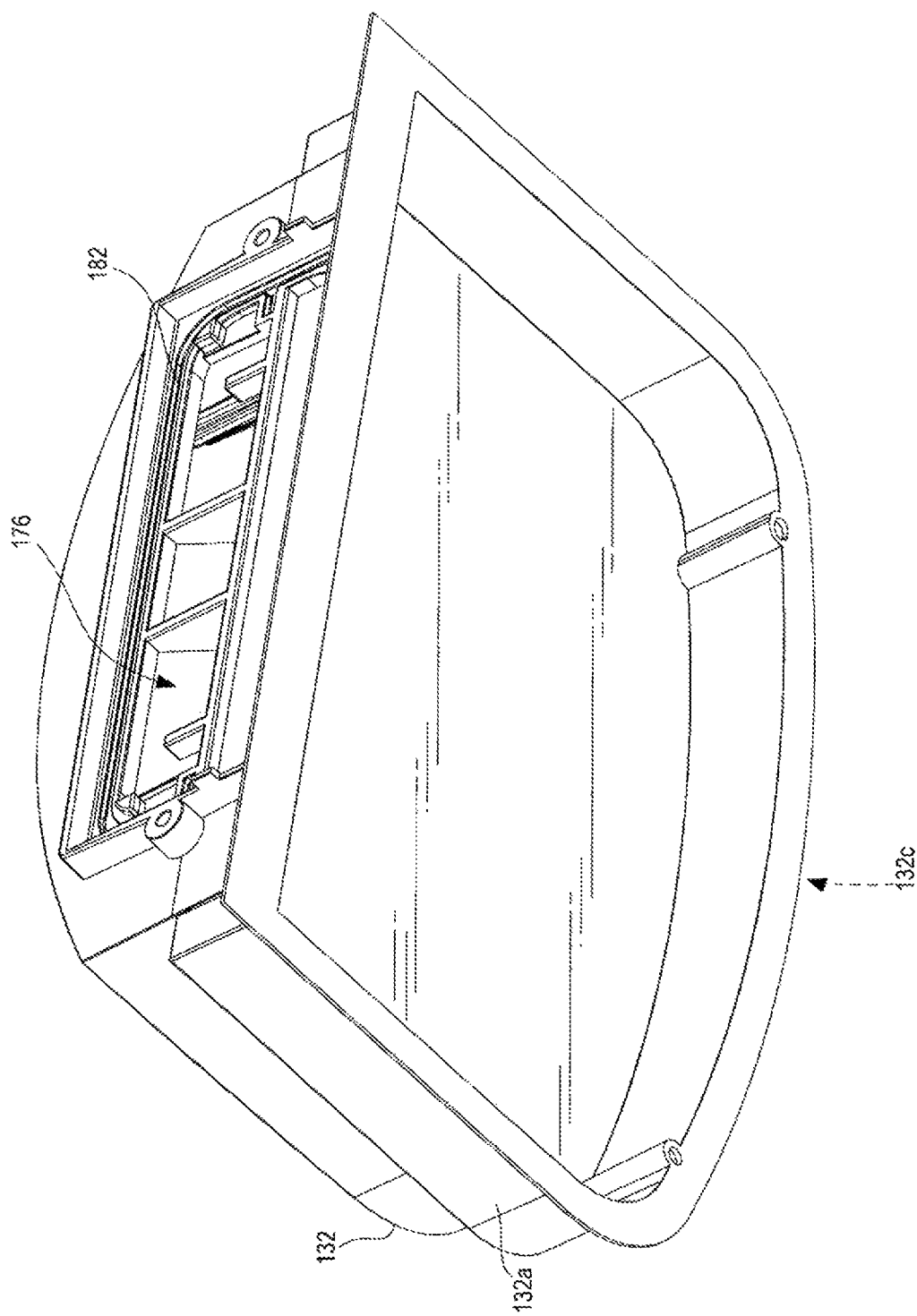
FIG. 6 is an isometric view from below of an embodiment of an optical enclosure.
Figure 7:
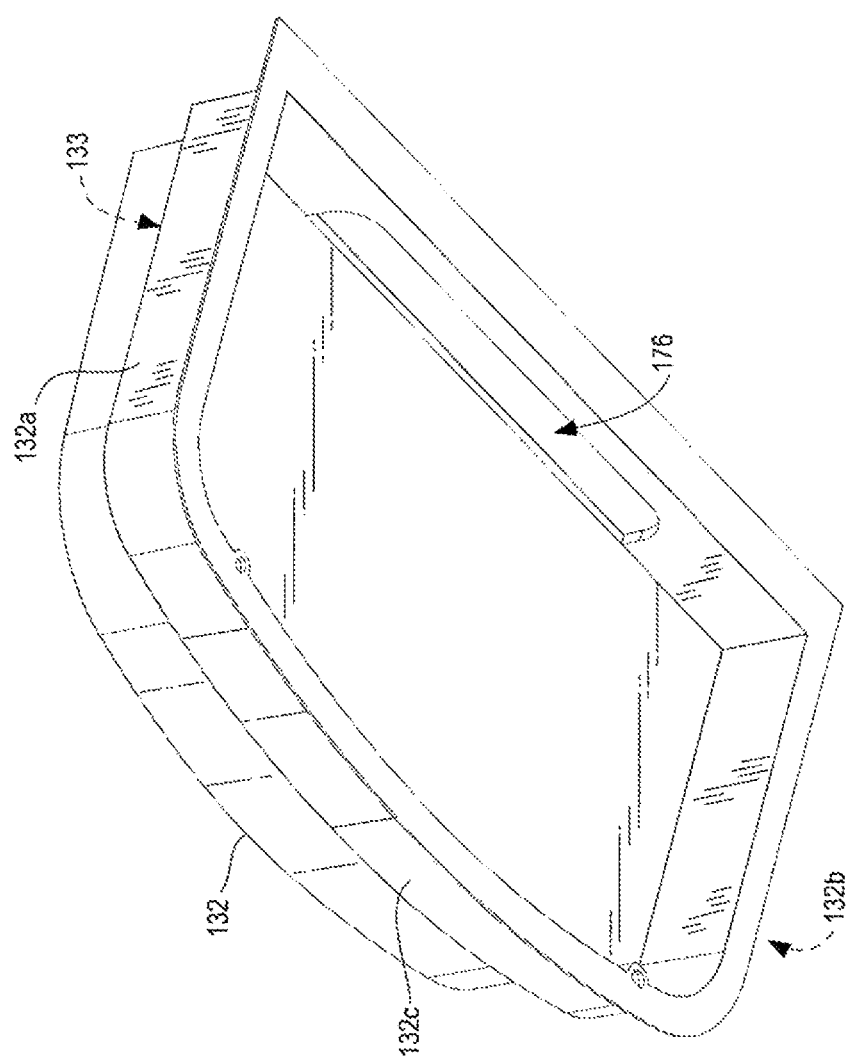
FIG. 7 is an isometric view from below of the optical enclosure of FIG. 6.
Figure 8:
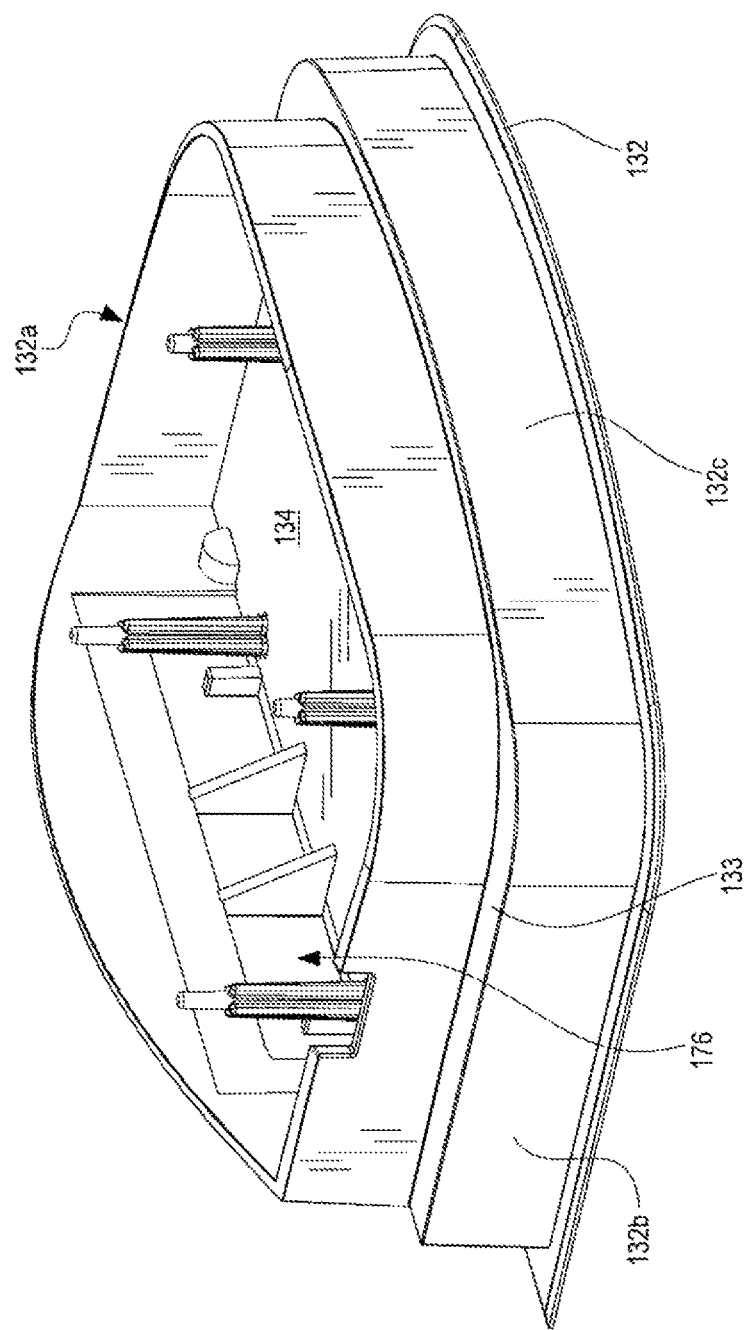
FIG. 8 is an isometric view from above of the optical enclosure of FIG. 6.

Referring next to FIGS. 3-5 and 8-10, the optic assembly 126 comprises an optical waveguide body 102 made of the materials specified hereinbelow or any other suitable materials, a surround member 130, and a reflective enclosure member 132. The interior of the reflective enclosure member 132 is flat, as shown in further views of the reflective enclosure member 132 in FIGS. 6-8. Referring once again to FIGS. 3-5 and 8-10, a circuit housing or compartment 134 with a cover is disposed atop the reflective enclosure member 132, and the driver circuit 118 is disposed in the circuit compartment 134. LED elements 136 are disposed on one or more printed circuit boards (PCBs) 140 and extend into coupling cavities or features 142 (FIGS. 15, 24, and 25) of the waveguide body 102, as noted in greater detail hereinafter. A heat exchanger 144 is disposed behind the one or more PCB(s) 140 to dissipate heat through vents that extend through the luminaire 100 and terminate at upper and lower openings 146, 148. In addition, the terminal block 116 is mounted adjacent the heat exchanger 144 and permits electrical interconnection between the driver circuit 118 and electrical supply conductors (not shown).

The LED elements 136 receive suitable power from the driver circuit 118, which may comprise a SEPIC-type power converter and/or other power conversion circuits mounted on a further printed circuit board 140*a*. The printed circuit board 140*a* may be mounted by suitable fasteners and location pins within the compartment 134 above the reflective enclosure member 132. The driver circuit 118 receives power over wires that extend from the terminal block 116.

Referring next to FIGS. 11-15, an embodiment of the optical waveguide body 102 includes a top surface 150, a bottom surface 152 forming a part of a substrate 154, and a light coupling portion 156 comprising at least one, and, more preferably, a plurality of light input surfaces 164 defining coupling cavities or features 142 extending into waveguide body 126 from a coupling end surface 158. A total internal reflection section or interior transmission portion 206 is preferably disposed between the light input surface(s) 164 and a light extraction portion 163 and preferably at least partially surrounds the light extraction portion 163. Specifically, surface elements comprising a number of light reflection and redirection elements 161 (described below) are disposed atop the substrate 154 and define the top surface 150. Further surface elements comprising first and second depressed planar surfaces 160*a* and 160*b* are arranged such that the second surface 160*b* partially surrounds the first surface 160*a*, and a plurality of curved light refraction and extraction features 162 (FIGS. 9, 10, 13 and 14) may be disposed on the bottom surface 152. Alternatively, the bottom surface 152 may be textured or smooth and/or polished, or some combination thereof. LED elements (see FIG. 15) 136 comprising individual LED light sources are disposed in or adjacent each of the plurality of light coupling cavities 142 as described in greater detail below.

The substrate 154 may be integral with the surface elements disposed on either the top surface 150 or bottom surface 152, or one or more of the surface elements may be separately formed and placed on or otherwise disposed and retained relative to the substrate 154, as desired. The substrate 154 and some or all of the surface elements may be made of the same or different materials. Further, some or all portions of some or all of the embodiments of the waveguide body 102 is/are made of suitable optical materials, such as one or more of acrylic, air, polycarbonate, molded silicone, glass, cyclic olefin copolymers, and a liquid (including water and/or mineral oils), and/or combinations thereof, possibly in a layered arrangement, to achieve a desired effect and/or appearance.

The light developed by the LEDs 136 travels through the waveguide body 102 and is redirected down and out of the waveguide body 102 at varying angles by the redirection and reflection features 161 disposed on the top surface 150 to be described in detail below, and is emitted out the bottom or emission surface 152 of the waveguide body 102.

Figure 11:
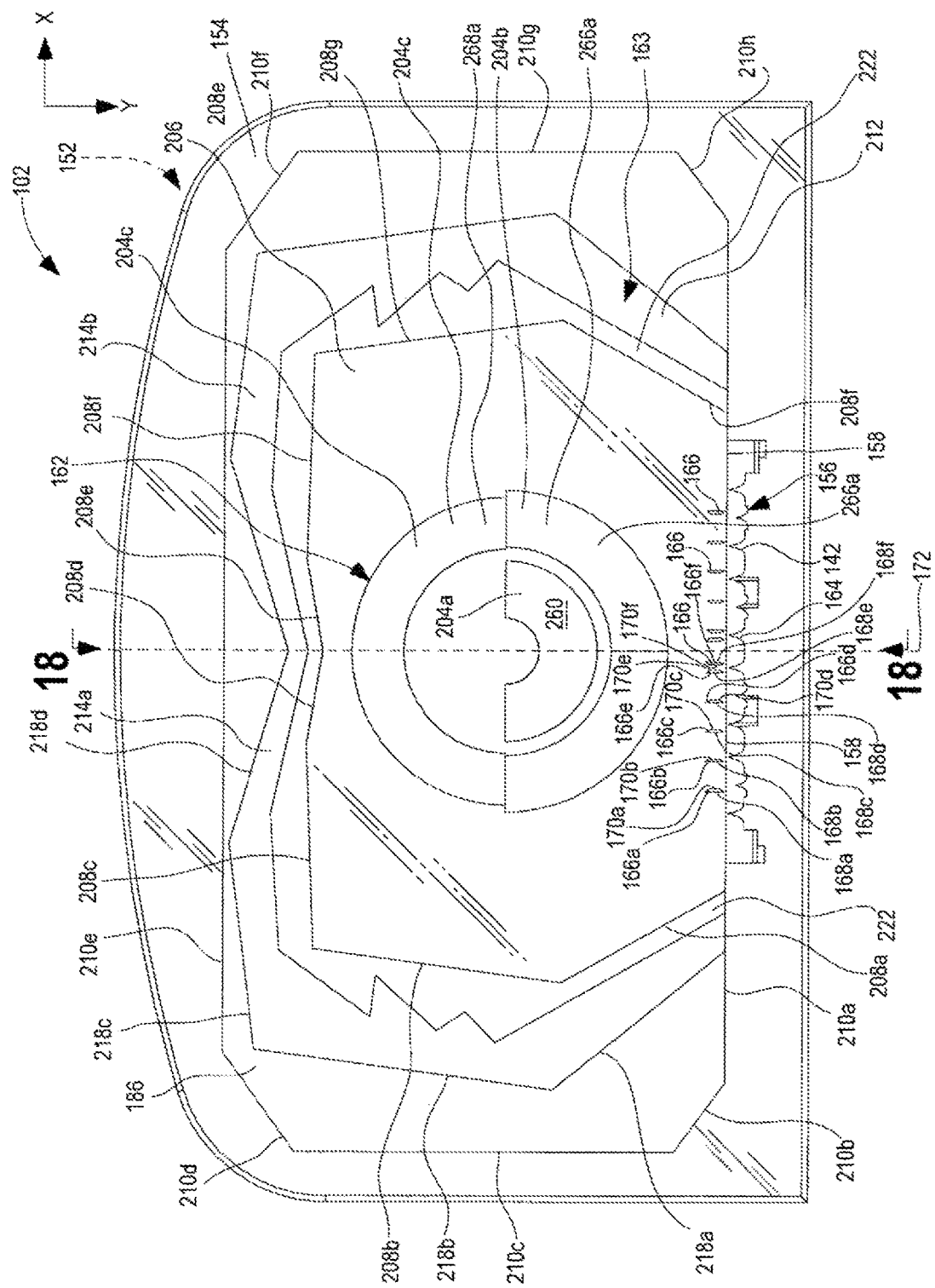
FIG. 11 is a plan view of a waveguide body.
Figure 13:
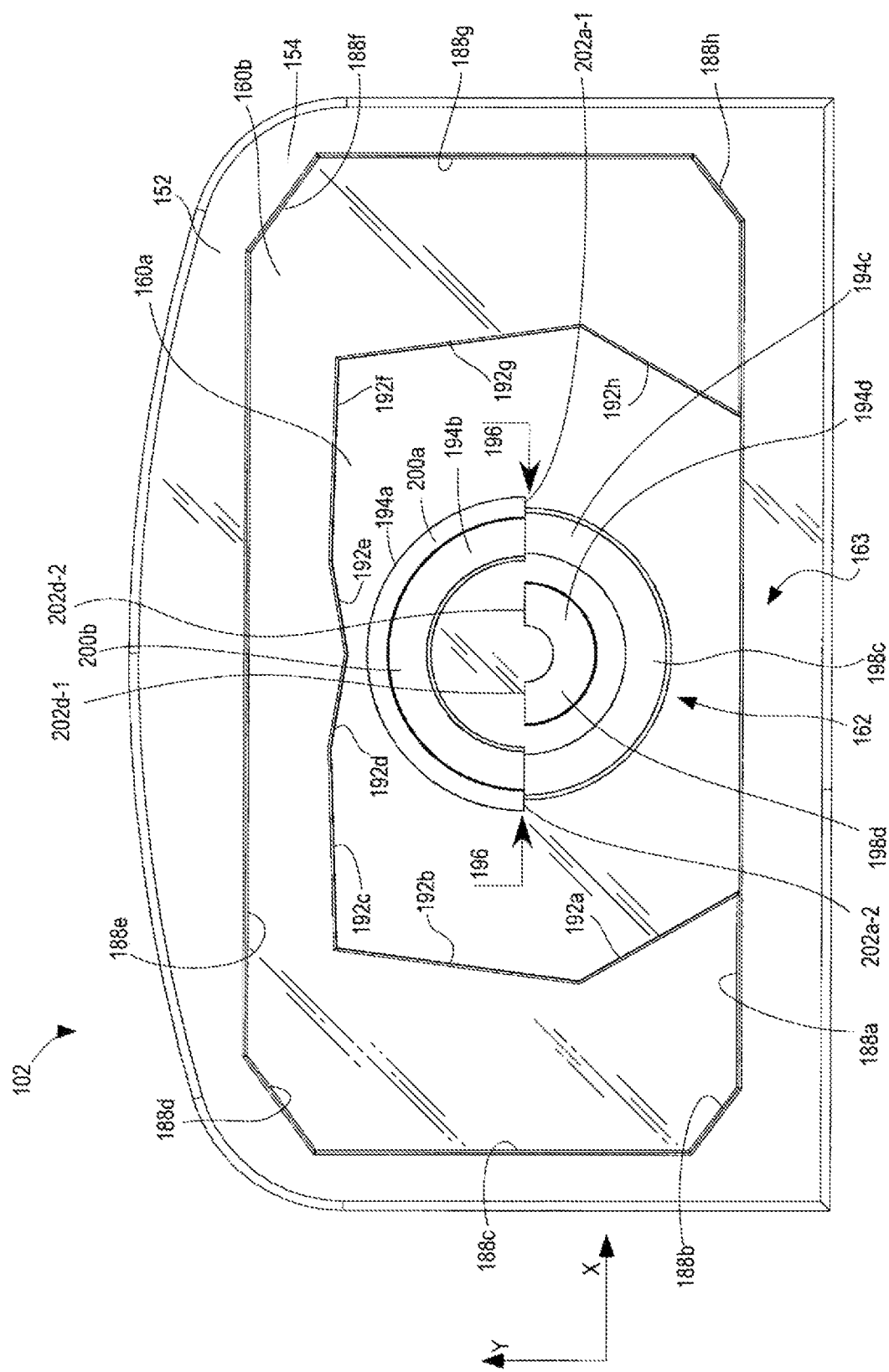
FIG. 13 is a bottom elevational view of the waveguide body of FIG. 11.

The curved light refraction and extraction features 162 on the bottom surface 152, which may comprise two pairs of curved concentric or eccentric ridges, each ridge terminating at a plane parallel to the width (i.e., the x-dimension as indicated in FIGS. 11 and 13) of the waveguide body 102, further facilitate light extraction and assist in extracting light at desirable angles relative the emission surface 152. It should be noted that there could be a different number (including zero) of bottom surface light refraction and extraction features 162, as desired. In any event, the Lambertian or other distributions of light developed by the LED elements 136 are converted into a distribution resulting in an illumination pattern having an extent in the x-dimension and a reach in the y-dimension perpendicular to the x-dimension.

Figure 16A:
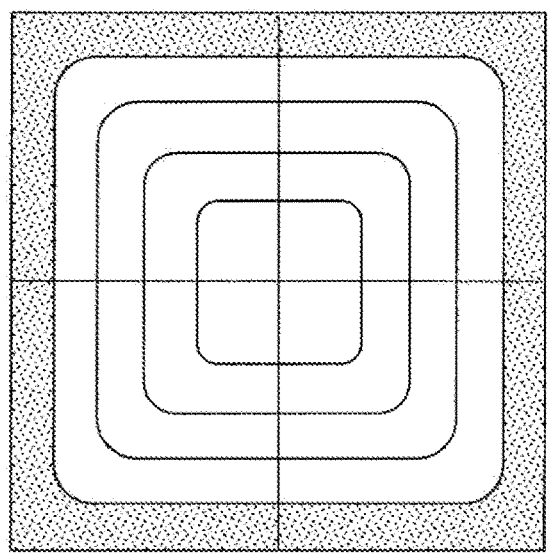
FIG. 16A is a diagram depicting an example Type 5 light distribution.
Figure 16B:
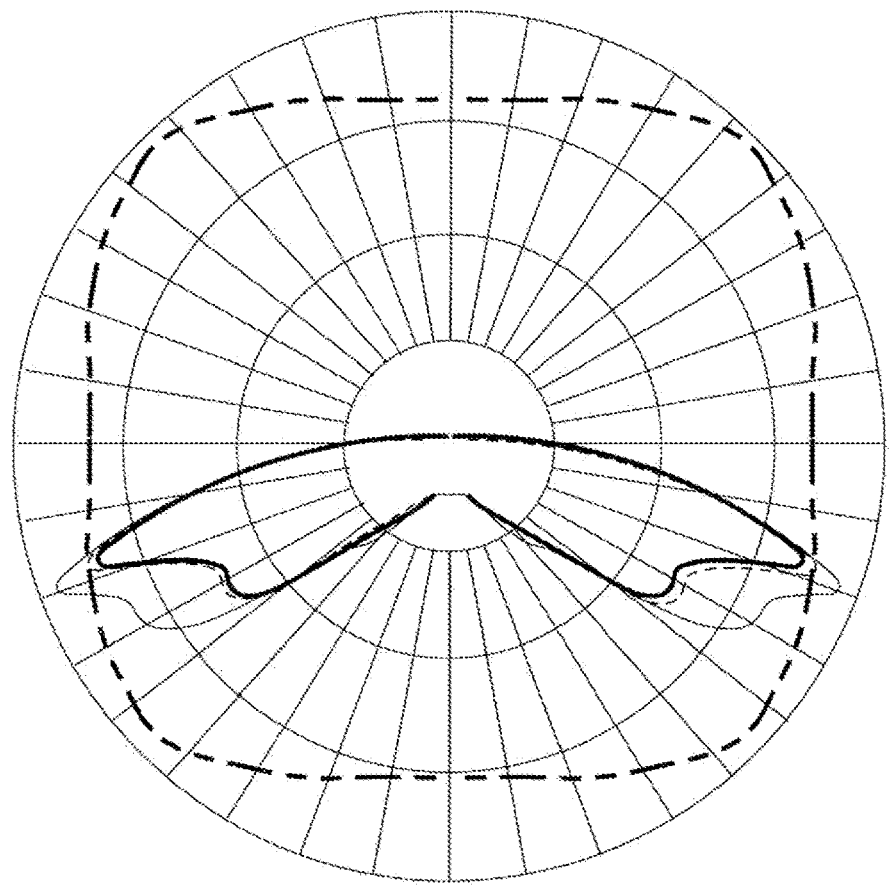
FIG. 16B is a light distribution intensity graph.
Figure 16C:
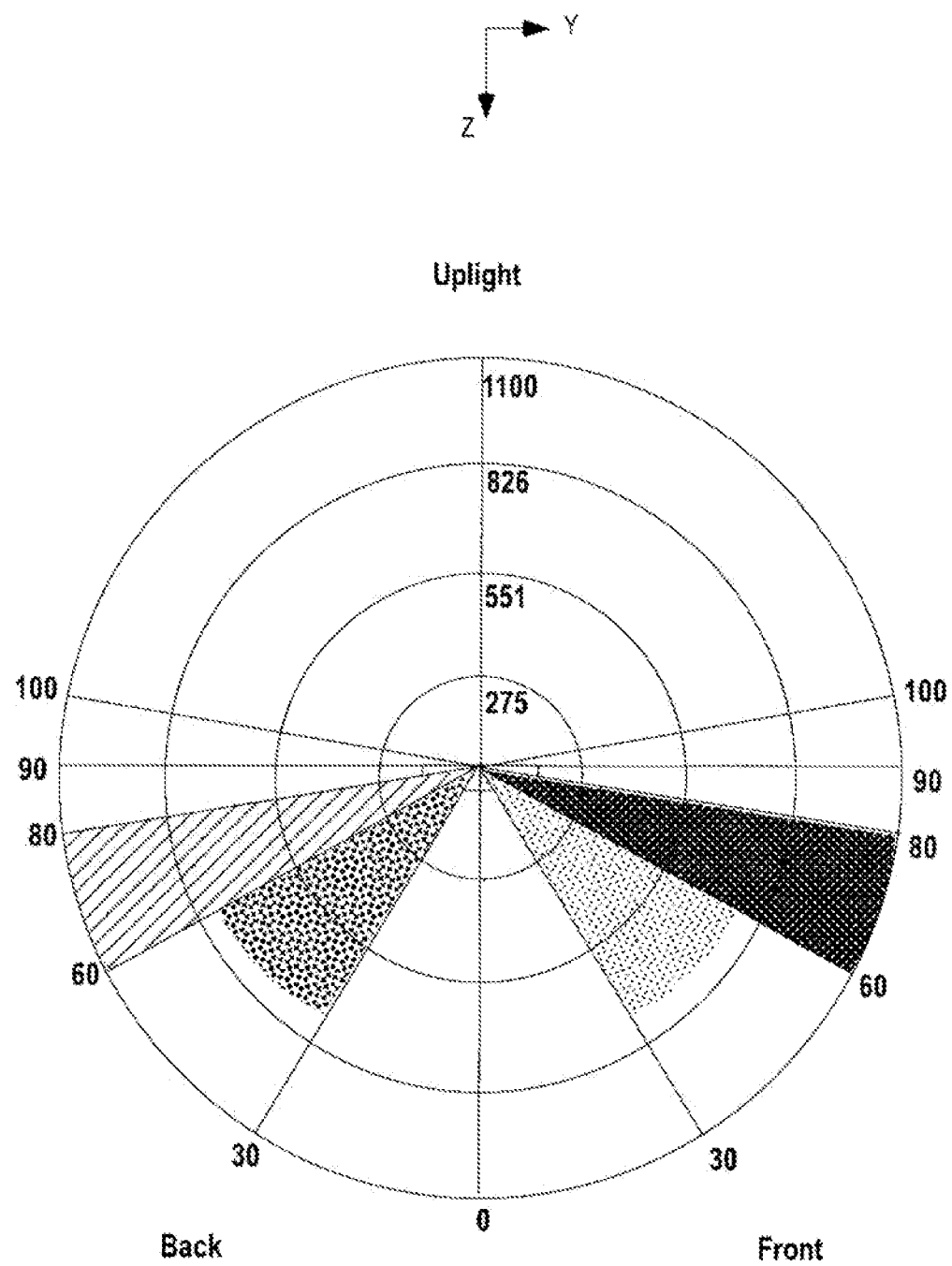
FIG. 16C is a chart depicting luminous flux of the light distribution of FIG. 16B.

The waveguide body 102 directs light developed by the LED element(s) 136 toward a desired illumination target surface, such as a roadway. The illumination pattern may or may not be offset in the y-dimension with respect to a center of the waveguide body 102, depending upon the design of the various elements of the waveguide body 102. The extent of the illumination pattern on the target surface in the x-dimension may be greater than the width of the waveguide body 102, although this need not necessarily be the case. Preferably, the extent of the illumination pattern on the target surface in the y-dimension and the x-dimension is substantially equal, thereby creating a uniform illumination pattern such as that shown in the light pattern diagram of FIG. 16A. FIG. 16B further depicts a light intensity chart showing that light is distributed according to a substantially even pattern with respect to the front and the back of the waveguide body 102 (i.e., along the y-axis). Further, FIG. 16C is a chart depicting luminous flux of the light distribution of FIG. 16B. Any of the embodiments of the luminaire 100 and/or post top luminaire 300, 300a, and 300b described herein may be used with any of the embodiments of the waveguide body 102 described hereinbelow to develop what is known in the art as a Type 5 or Type 5 Square lighting distribution. The Type 5 or Type 5 Square distribution may be preferable for general parking and/or area lighting applications. The Type 5 distribution typically has a relatively uniform illumination distribution that is generally symmetrical and circular. Alternatively, the Type 5 Square distribution has a relatively uniform square illumination distribution to provide a more defined edge for the distributed light, if suitable for a particular application. Alternatively, the embodiments may develop an asymmetric and/or offset light distribution, depending on the intended application.

As an example, the illumination pattern may be modified through appropriate modification of the light refraction and extraction features 162 on the bottom surface 152 and the light redirection or reflecting elements on the top surface 150. The waveguide bodies shown in the illustrated embodiments cause the illumination pattern on a target surface to be generally equal in extent in the y-dimension and the x-dimension, although this need not be the case. Thus, for example, the light distribution may be greater in the y-dimension than the distribution in the x-dimension, or vice versa. The overall brightness may be increased or decreased by adding or omitting, respectively, LED elements 136 and/or varying the power developed by the driver circuit 118 and delivered to the LED elements.

As should be apparent from the foregoing, the reflective enclosure member 132 is disposed above the waveguide body 102 opposite the substrate 154. The reflective enclosure member 132 includes a lower, interior surface that is coated or otherwise formed with a white or specular material. In example embodiments, the interior of the reflective enclosure member 132 is coated with Miro®™ brand reflector material, as marketed by ALANOD®™ GmbH & Co. KG of Ennepetal, Germany, or enhanced specular reflector (ESR). Further, one or more of the surfaces of the waveguide body 102 may be coated/covered with a white or specular material, e.g., outer surfaces of the light redirection or reflection features 161. Light that escapes (or which would otherwise escape) the upper surface 150 of the waveguide body 102 may be thus reflected back into the waveguide body 102 so that light is efficiently extracted out of the substrate 154. The lower surface of the reflective enclosure 132 may have other than a planar shape, such as a curved surface. In all of the illustrated embodiments, the light emitted out of the waveguide body 102 is preferably mixed such that point sources of light in the LED elements 136 are not visible to a significant extent and the emitted light is controlled and collimated to a high degree. Further, it is preferable that the emitted light be sufficiently mixed to promote even color distribution from different color LED elements 136 and/or uniformity of illumination distribution whether different color LEDs or monochromatic LEDs are used. Light mixing may be facilitated further by using curved surfaces that define one or more of the features 161, 162 as opposed to frustoconical or other surfaces that are not curved in the thickness dimension.

Figure 15:
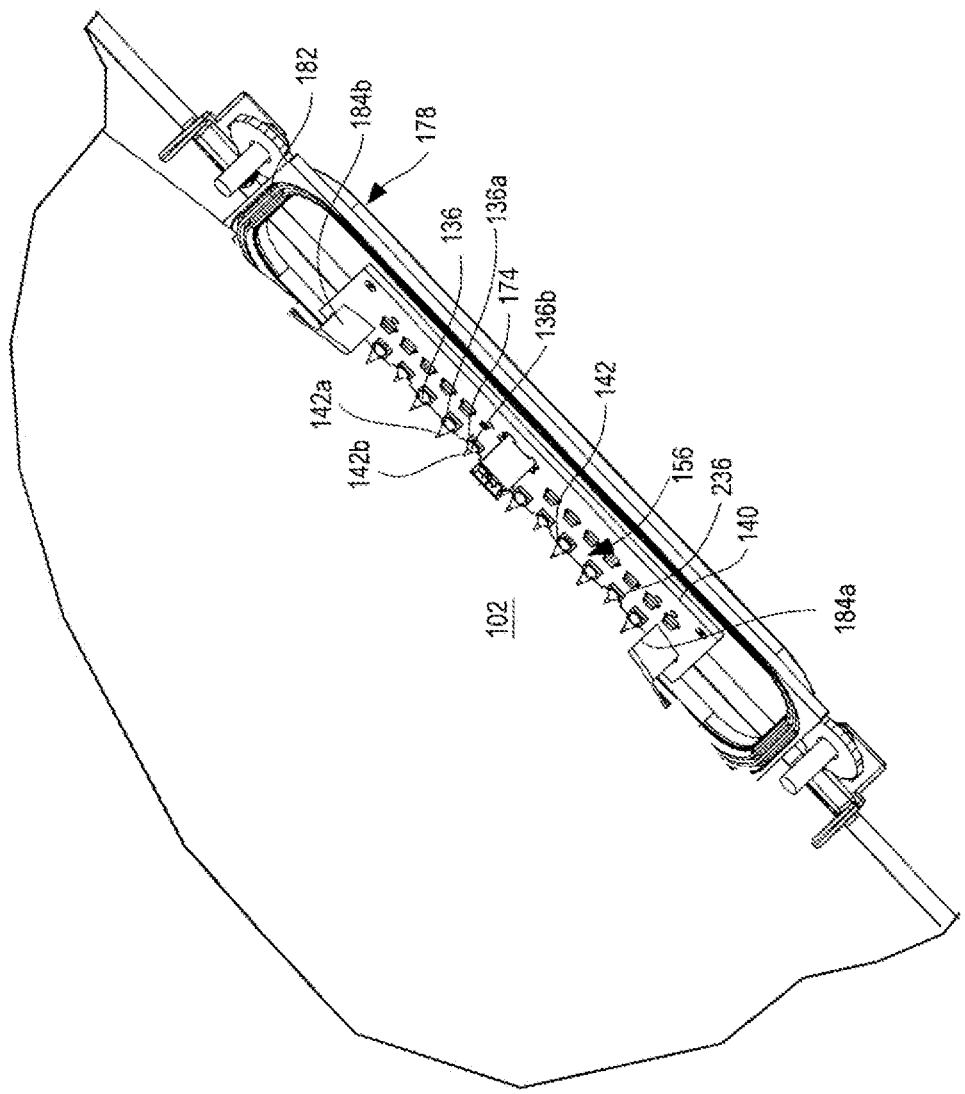
FIG. 15 is an isometric view from above of LED elements coupled to a waveguide body.
Figure 24:
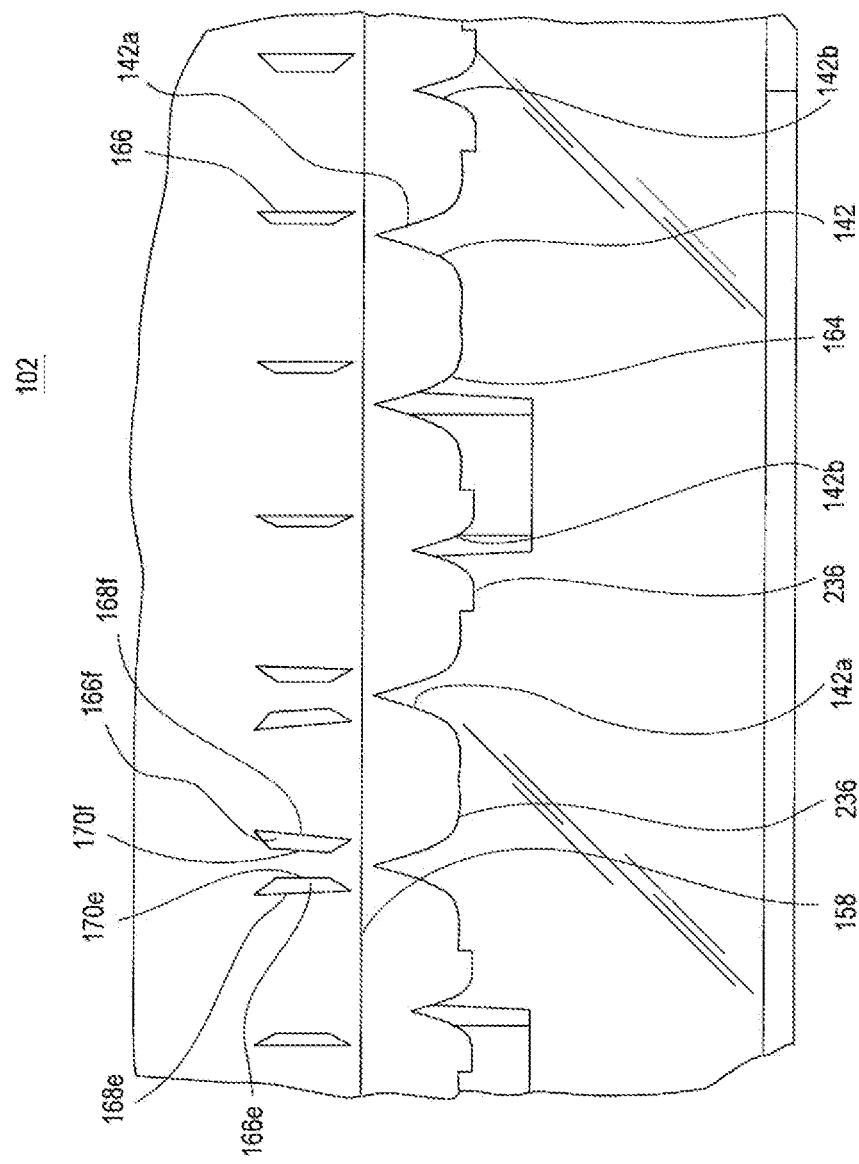
FIG. 24 is an enlarged fragmentary plan view of a parabolic coupling cavity entrance geometry.
Figure 25:
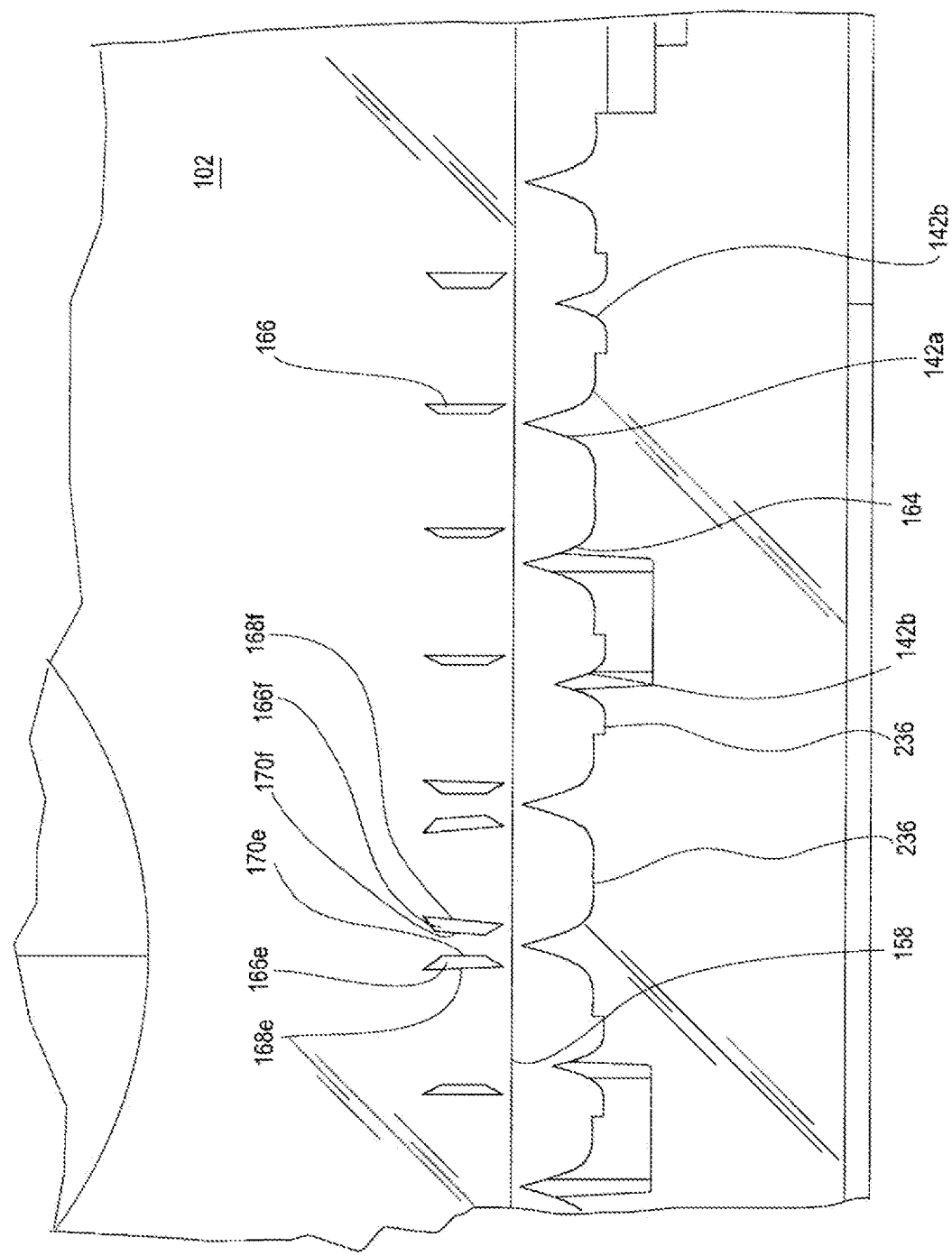
FIG. 25 is an enlarged fragmentary plan view of a wedge-shaped coupling cavity entrance geometry.

As seen in FIGS. 15, 24, and 25, each of the plurality of light coupling cavities 142 has an indentation-type shape, although variations in shape may be used to better manage the convergence or divergence of light inside the waveguide and/or to improve light extraction. Each light coupling cavity 142 is defined by the surface 164 that is substantially or generally parabolic or wedge-shaped in cross-section (as seen in a plan view transverse to the coupling end surface 158 and parallel to the top surface 150), as shown in such Figures.

Figure 23:
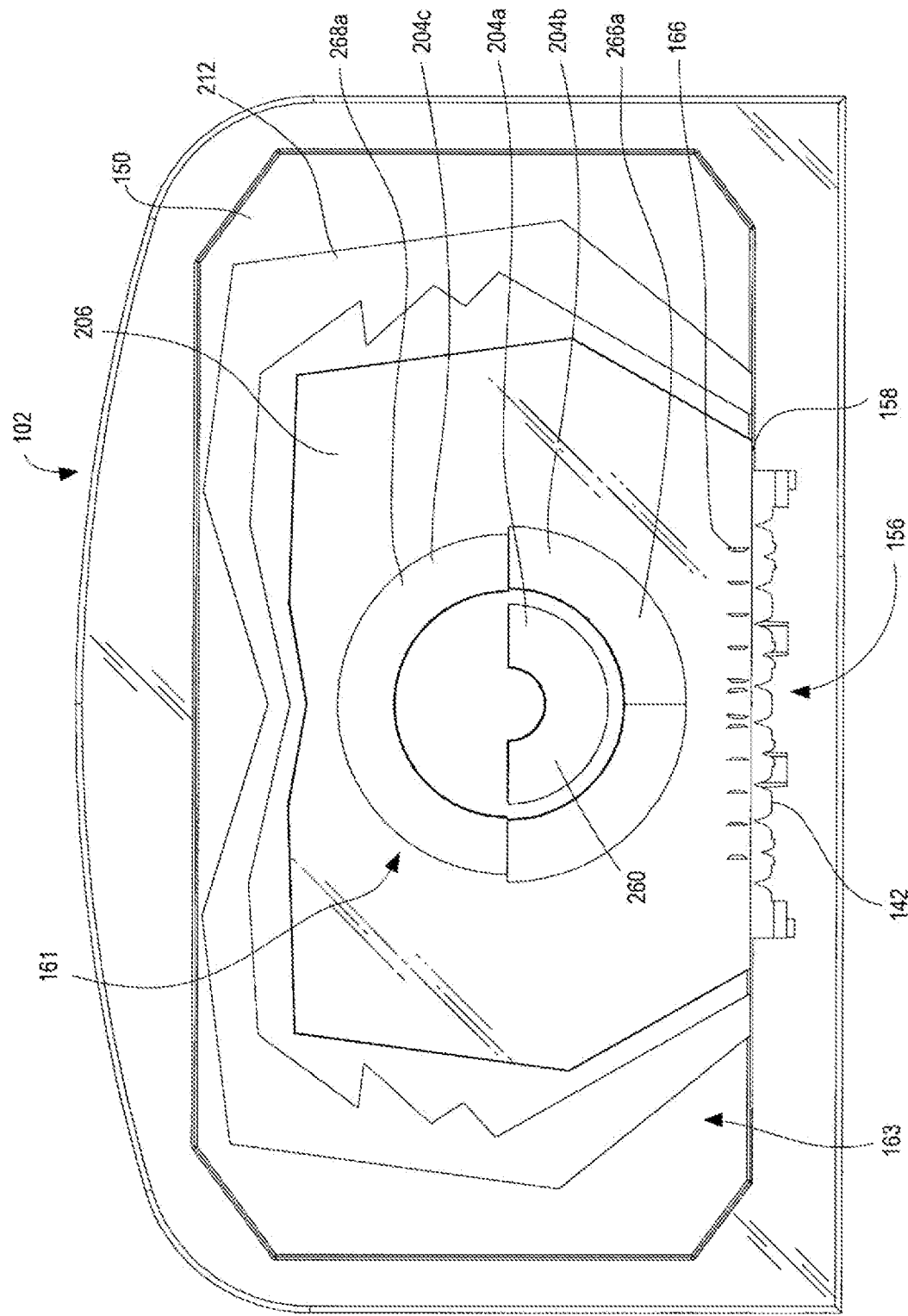
FIG. 23 is a plan view from above of an alternate embodiment of the waveguide body of FIG. 11.

FIG. 11 depicts an embodiment of the waveguide body 102 comprising coupling cavities 142 having a wedge-shaped entrance geometry. Coupling cavities 142 having a wedge-shaped entrance geometry are shown in enlarged detail in FIG. 25. Alternatively, FIG. 23 depicts an embodiment of the waveguide body 102 comprising coupling cavities 142 having a parabolic-shaped entrance geometry. Coupling cavities 142 having a parabolic-shaped entrance geometry are shown in enlarged detail in FIG. 24. The parabolic and wedge-shaped entrance geometries differ in shape at the terminal point of each coupling cavity 142. The wedge-shaped geometry of FIG. 25 has coupling cavities with wedge-shaped, sharp terminal points, while the parabolic geometry of FIG. 24 has coupling cavities with curved terminal points that approximate a parabolic curve in combination with the remaining surfaces 164 of each coupling cavity 142.

Each surface 164 defining each light coupling cavity 142 may be smooth, textured, curved, or otherwise shaped to affect light mixing and/or redirection. For example, each coupling surface 164 may include spaced bumps or other features that protrude at points along a top-to-bottom extent (i.e., along a z-dimension normal to an x-y plane) of each cavity 142 in such a way as to delineate discrete coupling cavities each provided for and associated with an individual LED element 136 to promote coupling of light into the waveguide body 102 and light mixing. Such an arrangement may take any of the forms disclosed in International Patent Application No. PCT/US14/30017, filed Mar. 15, 2014, incorporated by reference herein. Furthermore, each coupling cavity 142 may have a cylindrical prism or lens coupling surface 164 with a spline-like or flexible curve shape in cross-section along a z-dimension. The spline or flexible curve of the coupling cavity surface 164 may be designed so that light rays are separated in two primary directions while being collimated.

As seen in FIG. 15, LED elements 136 are disposed within or adjacent the plurality of coupling cavities 142 of the waveguide body 102. In FIG. 15, details of the redirection and reflection feature(s) 161 are omitted from the top surface 150. Each LED element 136 may be a single white or other color LED, or each may comprise multiple LEDs either mounted separately or together on a single substrate or package to form a module including, for example, at least one phosphor-coated or phosphor-converted LED, such as a blue-shifted yellow (BSY) LED, either alone or in combination with at least one color LED, such as a green LED, a yellow LED, a red LED, etc. The LED elements 136 may further include phosphor-converted yellow, red, or green LEDs. One possible combination of LED elements 136 includes at least one blue-shifted-yellow/green LED with at least one blue-shifted-red LED, wherein the LED chip is blue or green and surrounded by phosphor. Any combination of phosphor-converted white LED elements 136, and/or different color phosphor-converted LED elements 136, and/or or different color LED elements 136 may be used.

Alternatively, all the LED elements 136 may be the same. The number and configuration of LEDs 136 may vary depending on the shape(s) of the coupling cavities 142. Different color temperatures and appearances could be produced using particular LED combinations, as is known in the art. In one embodiment, each light source comprises any LED, for example, an MT-G LED incorporating True-White®™ LED technology or as disclosed in U.S. patent application Ser. No. 13/649,067, filed Oct. 10, 2012, the disclosure of which is hereby incorporated by reference herein. In embodiments, each light source comprises any LED such as the LEDs disclosed in U.S. Pat. No. 8,998,444, and/or U.S. Provisional Patent Application Ser. No. 62/262,414, filed Dec. 3, 2015, the disclosures of which are hereby incorporated by reference herein. In another embodiment, a plurality of LEDs may include at least two LEDs having different spectral emission characteristics. If desirable, one or more side emitting LEDs disclosed in U.S. Pat. No. 8,541,795, the disclosure of which is incorporated by reference herein, may be utilized inside or at the edge of the waveguide body 102. In any of the embodiments disclosed herein the LED elements 136 preferably have a Lambertian light distribution, although each may have a directional emission distribution (e.g., a side emitting distribution), as necessary or desirable. More generally, any Lambertian, symmetric, wide angle, preferential-sided, or asymmetric beam pattern LED(s) may be used as the light source(s).

The sizes and/or shapes of the coupling cavities 142 may differ or may all be the same. Each coupling cavity 142 extends into the waveguide body. However, an end surface 236 defining an open end of each coupling cavity 142 may not be coincident and may be offset with respect to a corresponding end surface of one or both adjacent coupling cavities. Thus, each of a first plurality of coupling cavities 142b has an opening at the end surface 236 thereof that is disposed farther from a center of the waveguide body 102 than corresponding openings of each of a second plurality of coupling cavities 142a. Furthermore, in the embodiment illustrated in FIGS. 15, 24, and 25, each of the first plurality of coupling cavities 142a has a depth that extends farther into the waveguide body 102 than each of the second plurality of coupling cavities 142b. The cavities 142a are therefore relatively larger than the cavities 142b. As seen in FIGS. 24 and 25, the relative sizes and openings of coupling cavities 142a and 142b may be retained for the parabolic and the wedge-shaped entrance geometries alike.

In the illustrated embodiment, relatively larger BSY LED elements 136a (FIG. 15) are aligned with the coupling cavities 142a, while relatively smaller red LED elements 136b are aligned with the coupling cavities 142b. The arrangement of coupling cavity shapes promotes color mixing in the event that, as discussed above, different color LED elements 136 are used and/or promotes illuminance uniformity by the waveguide body 106 regardless of whether multi-color or monochromatic LEDs are used. In any of the embodiments disclosed herein, other light mixing features may be included in or on the waveguide body 102. Thus, for example, one or more bodies of differing index or indices of refraction than remaining portions of the waveguide body 102 may extend into the waveguide body and/or be located fully within the waveguide body 102.

In particular embodiments, an example of a type of light mixing feature comprises the light mixing facets 166 shown in FIG. 11. The waveguide body 102 of FIG. 11 includes twelve facets 166 with six facets 166 on each side of a center line 172 extending along the y-dimension (at line 18-18) of the waveguide body 102. The facets 166 on each side of the center line 172 are arranged to form a mirror image of one another, therefore the facets on only one side of the waveguide body 102 will be described. The facets 166 are trapezoidal in shape such that each facet 166 has a base surface 168 and a second surface 170 parallel to the base surface 168.

Referring still to FIG. 11 and also to FIGS. 24 and 25, the embodiment therein includes five facets 166a-166e having respective base surfaces 168a-168e oriented away from the center line 172 while one facet 166f has the opposite orientation with the base surface 168f thereof oriented toward the center line 172. Likewise, second surfaces 170a-170f are opposite the base surfaces 166a-166f of the associated facet 166a-166f. The five facets 166a-166e are equally spaced away from the coupling end surface 158. The facet 166f having a contrary orientation is disposed in close proximity with facet 166e such that facets 166e and 166f form a pair of mirror-image facets that are disposed such that the second surfaces 170e, 170f of the paired facets 166e, 166f face one another. The base surfaces 168a-168e of the facets 166a-168e are preferably substantially parallel to one another. However, the base surface 168f of the facet 166f is angled slightly away from the parallel base surfaces 168a-168e of the other facets 166a-166e. Therefore, the base surfaces 168e, 168f and the second surfaces 170e, 170f of the paired facets 166e, 166f are angled slightly away from one another.

Referring again to FIG. 15, the LED elements 136 are preferably disposed in the illustrated arrangement relative to one another and relative to the plurality of light coupling cavities 142. The LED elements 136 may be mounted on one or more separate support structure(s) 174. In the illustrated embodiment of FIG. 15, the LED elements 136 are disposed on and carried by the metal-coated printed circuit board (PCB) 140. The PCB 140 is held in place relative to an associated opening 176 (see FIGS. 6, 7, 9, and 10) of the reflective enclosure member 132 by a holder assembly 178. The holder assembly 178 comprises a main holding member 180 and a gasket 182. The PCB 140 and the holder assembly 178 may be held in place relative to the waveguide body 102 by screws, rivets, etc. inserted through the PCB 140 and/or holder assembly 178 and passing into threaded protrusions 184a, 184b that extend out from the waveguide body 102 (see FIGS. 11 and 12). Further, screws or fasteners compress the main holding member 180 against the reflective enclosure member 132 with the gasket 182 disposed therebetween and the PCB 140 aligned with the associated opening 176. Thereby the LED elements 136 are held in place relative to the waveguide body 102 by both the compressive force of the holder assembly 178 and the screws, rivets, etc. inserted through the PCB 140 and passing into threaded protrusions 184a, 184b.

Referring again to FIGS. 3, 4, 5, 10, and 15, the waveguide body 102 is disposed and maintained within the reflective enclosure member 132 such that the plurality of coupling cavities 142 is disposed in a fixed relationship adjacent the opening 176 in the reflective enclosure 132 and such that the LED elements 136 are aligned with the coupling cavities 142 of the waveguide body 102. Each LED receives power from the LED driver circuit 118 or power supply of suitable type, such as a SEPIC-type power converter as noted above and/or other power conversion circuits carried by a circuit board 140a that may be mounted by fasteners and/or locating pins atop the reflective enclosure member 132.

Figure 9:
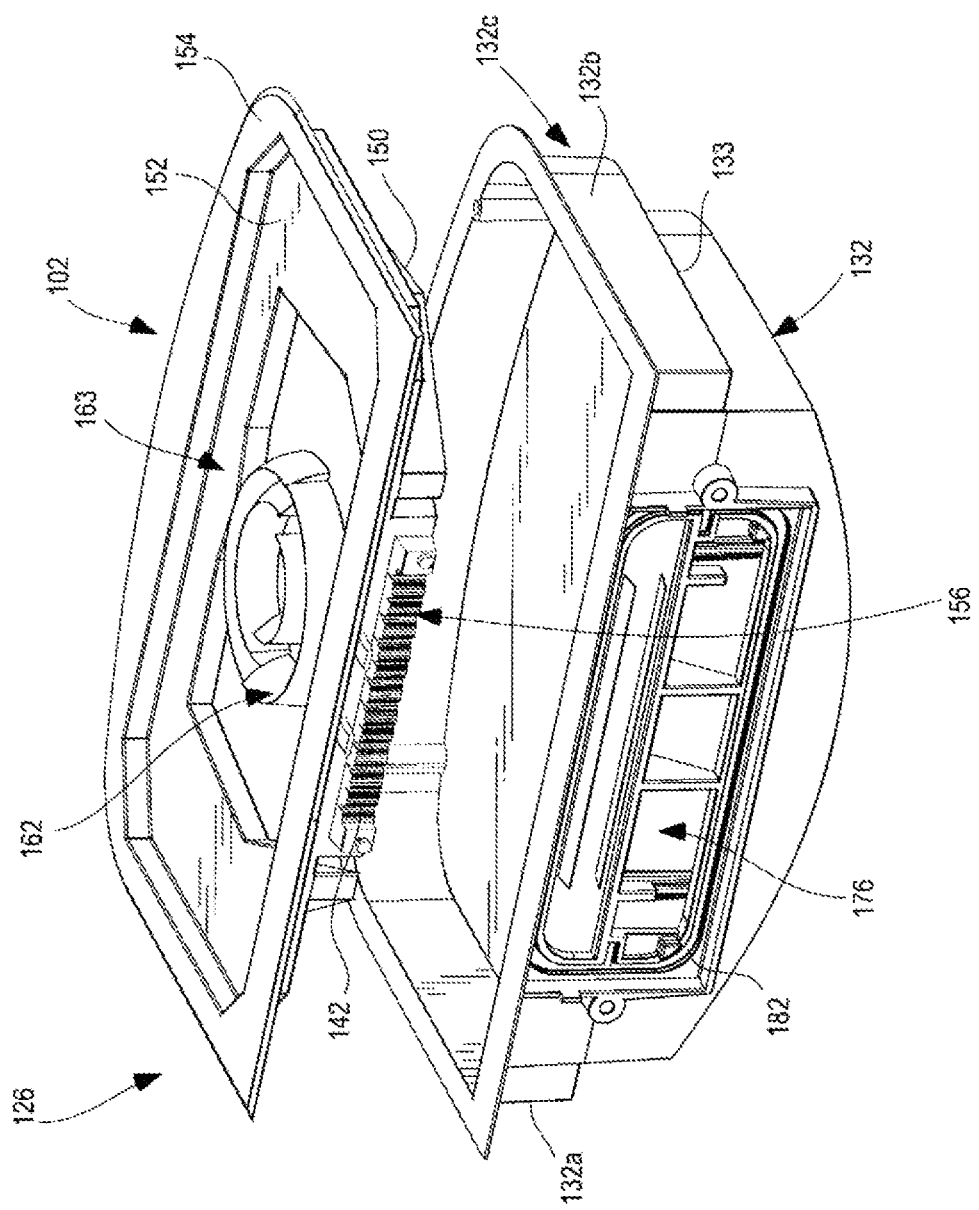
FIG. 9 is an exploded fragmentary isometric view from below of an optical assembly.
Figure 10:
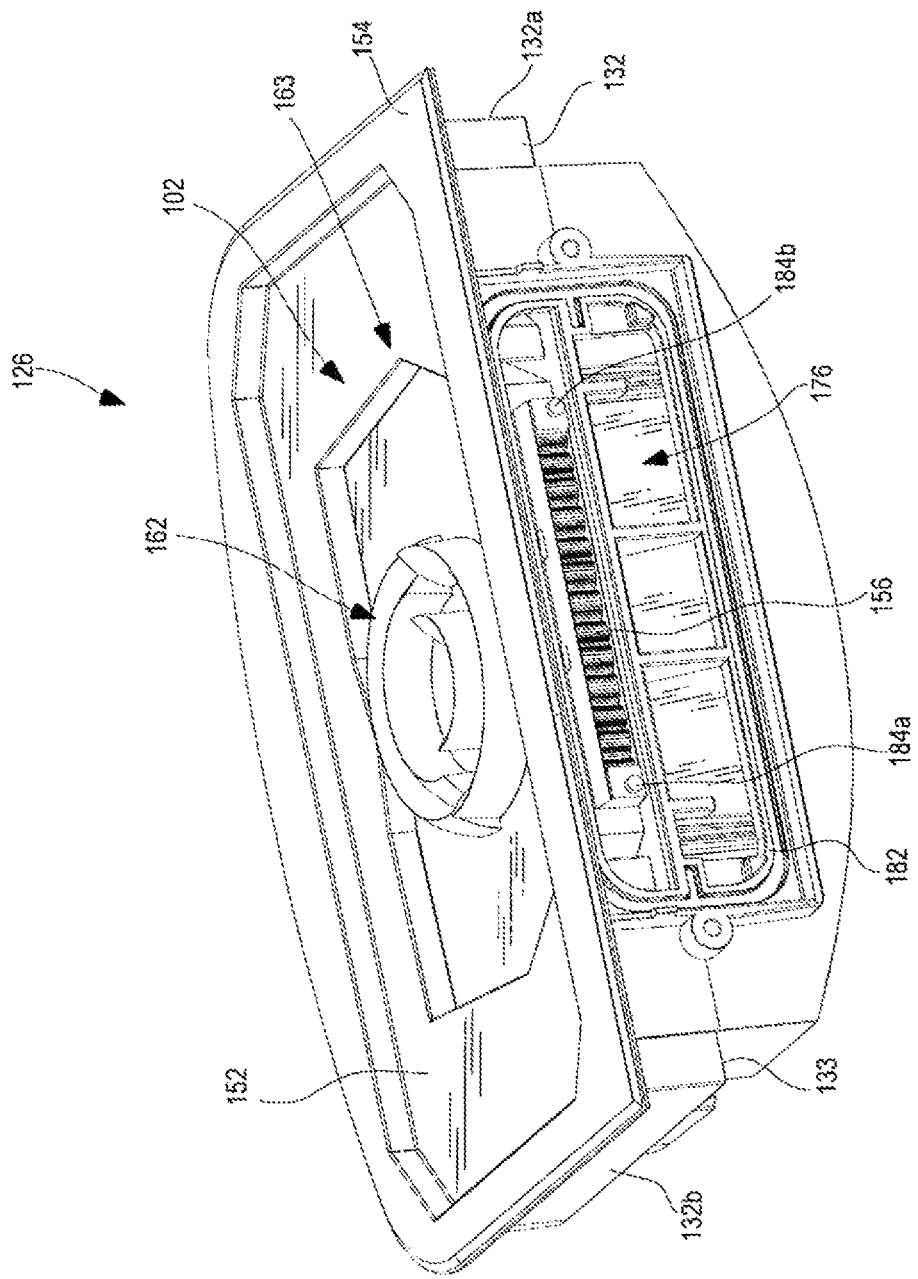
FIG. 10 is an isometric view from below of the optical assembly of FIG. 9.

FIGS. 4-10 illustrate the optic assembly 126 in greater detail. FIGS. 9 and 10 are inverted relative to the orientation of the optic assembly 126 within the luminaire 100. A process for fabricating the assembly 126 includes the steps of forming the waveguide body 102 using, for example, any suitable molding process such as described hereinafter, placing the reflective enclosure member 132 onto the waveguide body 102, and overmolding the surround member 130 onto the waveguide body 102 and/or the reflective enclosure member 132 to maintain the reflective enclosure member 132, the waveguide body 102, and the surround member 130 together in a unitary or integral fashion. The optic assembly 126 further includes an upper cover 138 (FIGS. 6-10) having a straight or linear surface 133 (FIGS. 4 and 8), left- and right-side surfaces 132a and 123b, respectively, (FIGS. 4-10) to interfit with the housing 104 shown in FIG. 8. However, a forward surface 132c may itself be curved and create a curved or filleted abutment where it meets each of the left- and right-side surfaces 132a and 132b. In an alternate embodiment of the luminaire 100, the reflective enclosure member 132 has a size and shape, such as including tapered or curved side surfaces, to receive closely the respective waveguide body 102 in a nesting fashion. The fitting of the optic assembly 126 and the gasket 182 with the enclosure member 132 provides a seal around the waveguide body 102. Such a seal may be watertight or otherwise provide suitable protection from environmental factors.

Any of the waveguide bodies disclosed herein may be used in the luminaire embodiments of FIGS. 1-5 and/or the post top embodiment of FIGS. 44-51, including the waveguide bodies of FIGS. 11-14 and 21-34. For example, embodiments of the luminaire 100 and/or post top 300 may incorporate the waveguide body 102 of a particular embodiment to achieve appropriate illumination distributions for desired output light illumination levels and/or other light distribution characteristics. The waveguide bodies of FIGS. 11-14 and 21-34 may be fabricated by a molding process, such as multilayer molding, that utilizes a tooling recess common to production of all three waveguide bodies, and by using a particular bottom insert in the tooling cavity unique to each of the three waveguide bodies. The insert allows for an interior section of each waveguide body 102 to have different extraction members and/or redirection elements while a bottom surface 152 and an outboard portion 186 of an upper surface 150 are common to the waveguides 102. A similar molding process may be utilized for the fabrication of the waveguide bodies 102 shown in FIGS. 13, 14, 30, and 34 as the waveguides shown herein also have identically shaped bottom surface 152 and outboard portion 186.

The different interior sections of the waveguides allow for the illumination distribution pattern produced by the waveguide body 102 to be varied. The varied illumination distribution patterns may be compliant with the American Institute of Architects lighting standards that are commonly known in the art. The boundaries of each illumination pattern on the illuminated surface are defined by the threshold of minimum acceptable lighting conditions, which depend on the illumination requirements, such as for a highway luminaire or parking lot luminaire. For example, an embodiment of the waveguide body 102 may provide an illumination pattern on a target surface having a relatively even, circular, or square with rounded corners light distribution having a diameter (in the case of a circular distribution) or a side-to-side extent (for a square distribution) of about one to about seven times the mounting height of the luminaire 100. In a typical parking lot configuration, the luminaire 100 is mounted 20-30 feet high. However, for high lumen applications, such as a luminaire replacing an incandescent bulb of approximately 750-10000 watts, the mounting height may instead be 30-40 feet, with a concomitant increase in power delivered to the LED elements to archive the desired intensity. In an example embodiment, the luminaire 100 is mounted at a height of 20 feet and the spacing ratio between luminaries is 7:1. Therefore, the width of the light distribution should cover at least 140 ft. Alternatively, for a mounting height of 40 feet and a spacing ratio of 7:1 between luminaries, the illumination width needed for desired light distribution may be 280 feet. The light distribution width may further be modified according to the spacing criteria for separating luminaries. Typical spacing ratios may be 4:1, 5:1, 6:1, and 7:1 to cover most area applications.

In an example embodiment, the luminaire 100 may have a maximum length ranging from about 400 mm to about 800 mm, preferably from about 500 mm to about 550 mm, a maximum width ranging from about 200 mm to about 500 mm, preferably from about 225 mm to about 275 mm, and a maximum height ranging from about 100 mm to about 200 mm, preferably from about 125 mm to about 150 mm. Moreover, the waveguide bodies 102 incorporated into the luminaire 100 and/or post top luminaire 300b may have a length along the y-direction ranging from about 75 mm to about 250 mm, preferably from about 125 mm to about 175 mm, a width along the x-direction ranging from about 150 mm to about 300 mm, preferably from about 200 mm to about 250 mm, and a height (i.e., thickness) ranging from about 5 mm to about 50 mm, preferably from about 15 mm to about 35 mm. The waveguide bodies 102 depicted in FIGS. 11-14 and 21-34 may be used in a luminaire having a lumen output ranging from about 3,000 lumens to about 32,000 lumens and, preferably, in luminaires having a lumen output between about 3,000 lumens and about 8,000 lumens. In a further example embodiment, the post top luminaries 300, 300a, 300b may have housings measuring approximately 375 mm×375 mm×450 mm up to about 450 mm×450 mm×525 mm, with lumen outputs preferably ranging from about 3,000 lumens to about 32,000 lumens. Moreover, the waveguide bodies 102a-102d incorporated into the post top luminaries 300a, 300b may have a length along the y-direction ranging from about 75 mm to about 250 mm, preferably from about 125 mm to about 150 mm, a width along the x-direction ranging from about 150 mm to about 300 mm, preferably from about 125 mm to about 175 mm, and a height (i.e., thickness) ranging from about 5 mm to about 50 mm, preferably from about 15 mm to about 35 mm.

Figure 14:
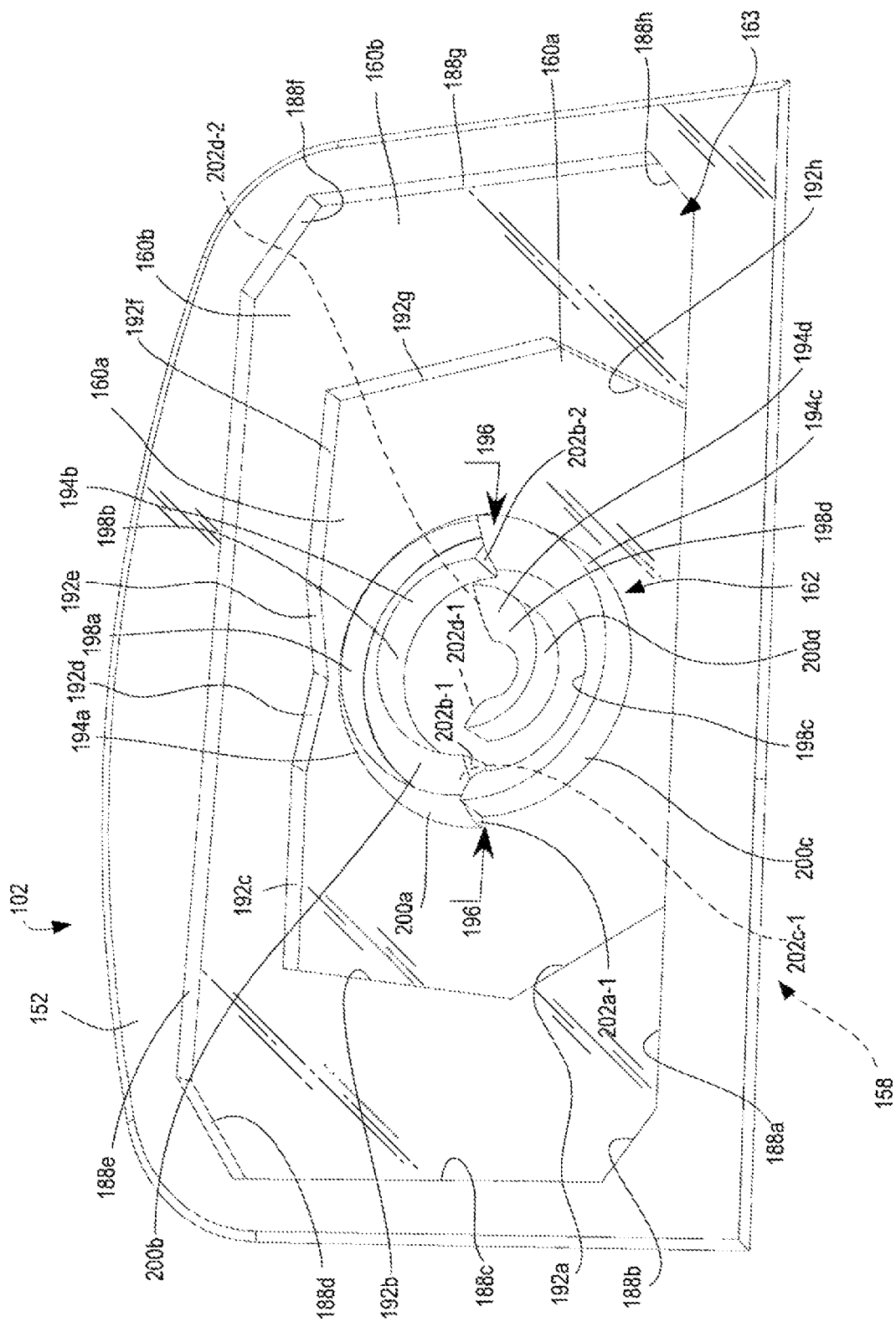
FIG. 14 is an isometric view from below of the waveguide body of FIG. 11.

The waveguide bodies 102 of FIGS. 11-14 and 21-34 include the bottom surface 152 and the outboard portion 186 of the top surface 150 as common to all such embodiments. The bottom surface 152 illustrated in FIGS. 13 and 14 is tray-shaped and includes the first and second depressed planar surfaces 160a, 160b. Second, outer depressed planar surface 160b has planar side surfaces 188a-188h disposed thereabout. An outer planar surface extends outwardly from and transverse to the side surfaces 188a-188h. The first depressed planar surface 160a is disposed within the second depressed planar surface 160b and is defined by planar side surfaces 192a-192h, 188a disposed thereabout. Planar side surface 188a comprises a side surface adjacent both the first and second depressed planar surfaces 160a, 160b.

Disposed within the first, inner depressed planar surface 160a are two sets of curved, partially or fully semi-circular, concentric or eccentric ridges 194a-194d, wherein each ridge terminates at a ridge meeting plane 196 that extends along lines 196-196 in FIGS. 13 and 14, parallel to the width (i.e., the x-dimension, as indicated in FIGS. 11 and 13) of the waveguide body 102. The ridge meeting plane 196 discussed below in describing the orientation of various waveguide body 102 features may instead be a particular line dividing the waveguide body 102, such line being substantially centered or offset from the center of the body 102 by a selected amount. The ridge meeting plane 196 is parallel to the coupling end surface 158. Alternatively, the ridges 194 may not terminate at a ridge meeting plane, but instead may terminate at ends that are spaced from one another.

The ridges 194a, 194b are disposed forward of the ridge meeting plane 196 while ridges 194c, 194d are disposed on a side of the ridge meeting plane 196 nearer the coupling end surface 158. Each ridge 194a-194d comprises an inner side surface 198a-198d, respectively, and an outer side surface 200a-200d, respectively. The ridge 194a is disposed outside and around the ridge 194b. More particularly, the outer ridge 194a is defined by the outer side surface 200a, which rises from the first depressed planar surface 160a. The ridge outer side surface 200a meets the ridge inner side surface 198a to form a wedge shape. The ridge inner side surface 198a is disposed adjacent the outer side surface 200b of the inner forward ridge 194b. Alternatively, the ridge inner side surface 198a may be adjacent the inner depressed planar surface 160a instead of abutting the outer side surface 200b of the inner forward ridge 194b. In such an embodiment, the inner forward ridge 194b has a diameter smaller than that shown in FIG. 14, and considerably smaller than outer forward ridge 194a. The outer side surface 200b meets the inner side surface 198b of the inner forward ridge 194b again to form a wedge shape. The inner side surface 198b of the inner forward ridge 194b then abuts the inner depressed planar surface 160a, as shown in FIG. 14.

The ridge 194c is disposed outside and around the ridge 194d nearer the coupling end surface 158 and in back of the ridge meeting plane 196. The back ridge 194c is defined by the outer side surface 200c, which rises from the first depressed planar surface 160a. The ridge outer side surface 200c meets the ridge inner side surface 198c to form a wedge shape. The ridge inner side surface 198c abuts the first depressed planar surface 160a. A portion of the first depressed planar surface 160a extends between the outer back ridge 194c and the inner back ridge 194d. The inner back ridge 194d is defined by the outer side surface 200d, which rises from the portion of the first depressed planar surface 160a extending between the outer and inner back ridges 194c, 194d. The outer side surface 200d meets the inner side surface 198d of the inner back ridge 194d to form a wedge shape. In the embodiment of FIGS. 13 and 14, the inner back ridge 194d has a diameter considerably smaller than that of the outer back ridge 194c, although the relative diameters thereof may be modified to achieve varying desired light distribution patterns.

Each of the ridges 194a-194d is curved in the width and length dimensions of the body 102 to form an arcuate ridge comprising a semi-circle about a central point on the first depressed planar surface 160a. In the embodiment of FIGS. 13 and 14 the semi-circular curved ridges 194a-194d form partial concentric circles. In alternate embodiments, the central point of one or more of the semi-circular curved ridges 194a-194d may be offset from the central point of one or more of the other semi-circular ridges 194a-194d. Thus, the curved ridges 194a-194d may be arranged in an eccentric pattern. In further alternate embodiments of the waveguide body 102, the curved ridges 194a-194d may be semi-elliptical, semi-parabolic, or another suitable arcuate or linear shape or combination of arcuate and/or linear shapes instead of semi-circular in shape.

As shown in FIG. 14, each of the curved ridges 194a-194d has two end surfaces 202a-1, 202a-2, 202b-1, 202b-2, 202c-1, 202c-2, 202d-1, 202d-2. Outer forward curved ridge 194a, inner forward curved ridge 194b, and outer back curved ridge 194c have end surfaces that are adjacent one another or, alternatively, meet such as to eliminate any interface therebetween. The end surface alignment is mirrored on left and right sides of the waveguide body, and hence, only one side will be described herein. The end surface 202a-1 of the outer forward ridge 194a is parallel with and adjacent the end surface 202b-1 of the inner forward ridge 194b. The end surface 202c-1 of the outer back ridge 194c faces and partially abuts the end surfaces 202a-1, 202b-1. The end surface 202d-1 of the inner back ridge 194d does not abut or conjoin with another end surface.

In any of the embodiments described herein, any sharp corner may be rounded and have a radius of curvature of less than 0.6 mm. The geometry of the redirection features and reflection features may be altered to manipulate the illumination pattern produced by the waveguide body 102. Additionally, the redirection features may have the same or similar shapes as the reflection features, but may differ in size.

Figure 12A:
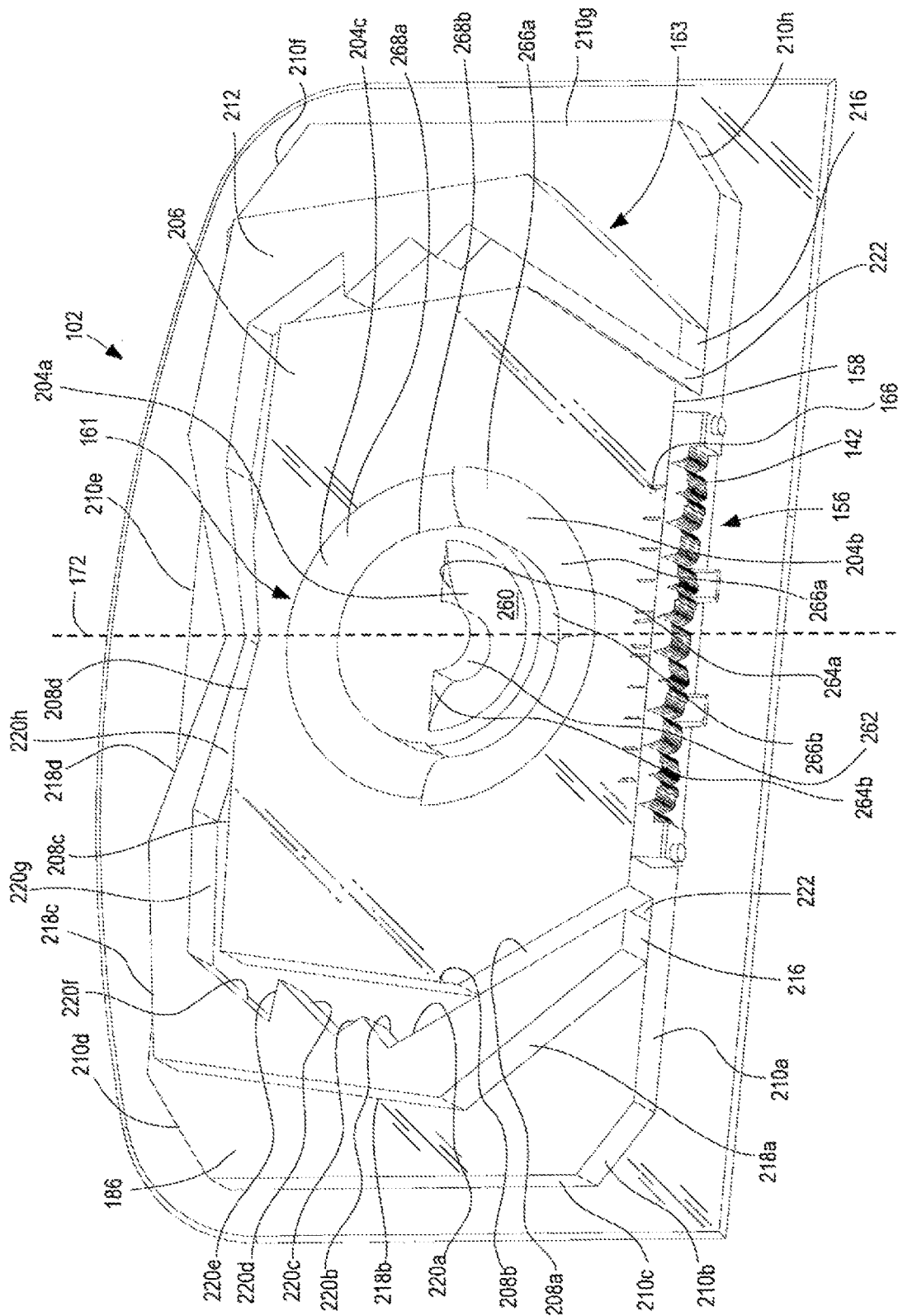
FIG. 12A is an isometric view from above-back of the waveguide body of FIG. 11.
Figure 12B:
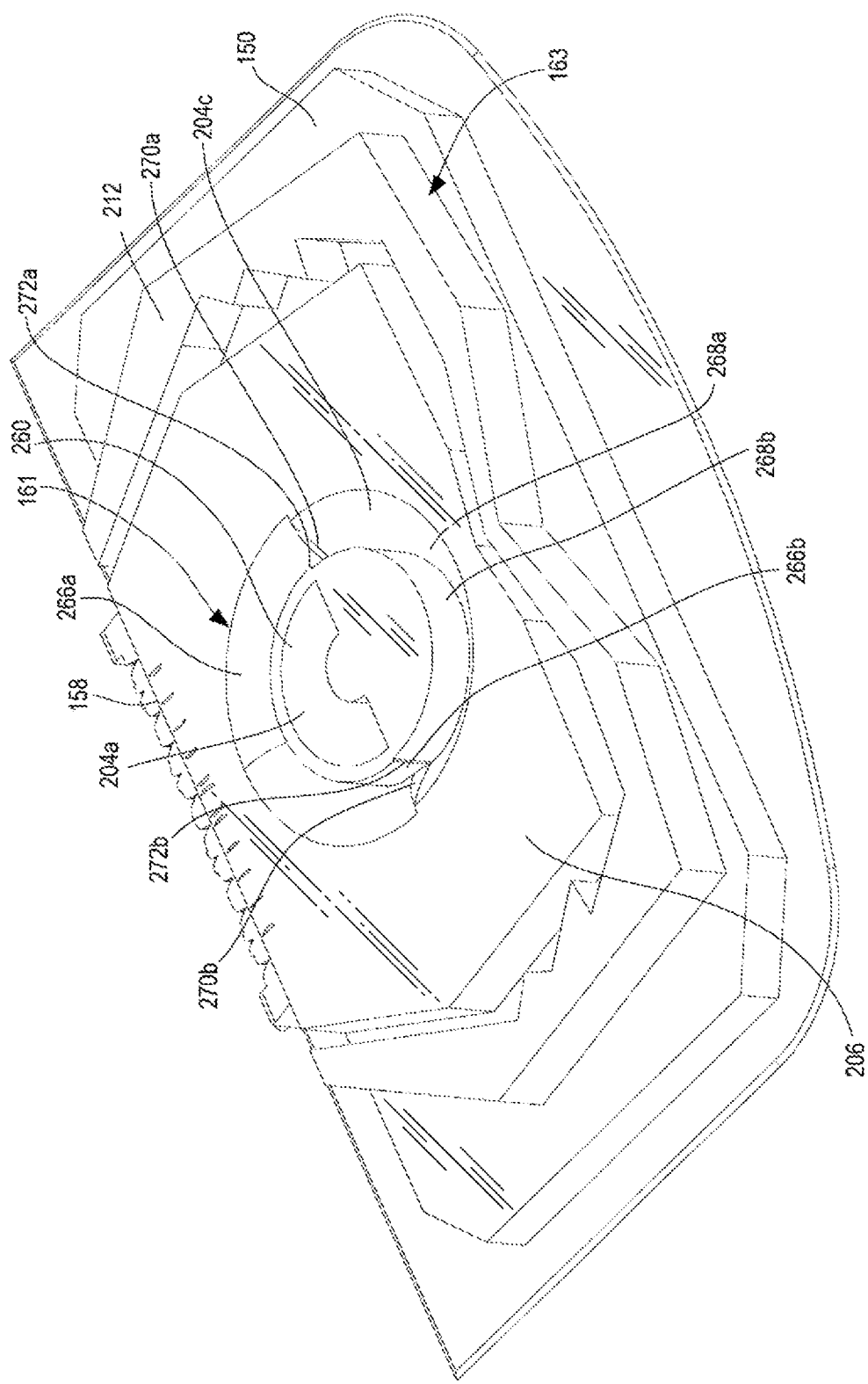
FIG. 12B is an isometric view from above-front of the waveguide body of FIG. 11.

Referring to FIGS. 11, 12A, and 12B, the outboard portion 186 of the upper surface 150 comprises first, second, and third arcuate redirection features 204a, 204b disposed within a raised interior transmission portion 206 itself having eight sidewalls 208a-208h. The eight sidewalls 208a-208h define the perimeter of the raised interior transmission portion 206 in conjunction with the coupling end surface 158. The interior transmission portion 206 is preferably (although not necessarily) symmetric about the center line 172. The interior transmission section 206 is disposed on the outboard portion 186 of the upper surface 150 such that the coupling end surface 158 of the interior transmission portion 206 is conjoined with side wall 210a defining a part of the outboard portion 186. Sidewall 210a along with sidewalls 210b-210h define the perimeter of the outboard portion 186.

As depicted in FIGS. 11, 12A, and 12B, further disposed on the outboard portion 186 is a recycling feature 212. The recycling feature 212 has two branches 214a, 214b arranged symmetrically about the interior transmission portion 206. The branches 214a, 214b are mirror images of one another on left and right sides of the center line 172, and hence, only the branch 214a will be described in detail herein. The branch 214a is defined by end surface 216. The end surface 216 is parallel and in the same plane as the sidewall 210a of the outboard portion 186. The recycling feature branch 214a has four outer sidewalls 218a-218d sequentially arranged at obtuse angles between each outer sidewall and the next. The outer sidewall 218d abuts the mirror image outer sidewall of the recycling feature branch 214b on a right side of the interior transmission portion 206. The outer sidewall 218d and the mirror image counterpart thereof meet proximal the center line 172 to form a v-shaped, indented light re-directing feature.

Still referring to FIGS. 11, 12A, and 12B, the branch 214a has eight inner side walls 220a-220h that are sequentially arranged in abutment one to the next from the end surface 216. The inner sidewalls 220b and 220c abut one another at an obtuse angle to create a wedge-shaped light re-directing feature. Further, the inner sidewalls 220d and 220e abut at an acute angle to former a relatively sharper wedge-shaped light re-directing feature. Further, the inner sidewall 220e abuts the inner sidewall 220f at an acute angle to form a v-shaped, indented light re-directing feature. The inner surface 220h meets a mirror image counterpart thereof proximal the centerline 172 of the waveguide body 102 to form a further wedge-shaped light re-directing feature having a relatively less sharp angle. In other embodiments, features and sidewalls may be identical, similar, and/or different from other sections and sidewalls, and the angles therebetween may be customized to suit a particular application and/or achieve desired illumination patterns.

The recycling feature 212 at least partially surrounds the interior transmission portion 206, but the sidewalls thereof do not abut the interior portion 206. Thus, an interior planar portion 222 of the outboard portion 186 is defined by the inner sidewalls 220a-220h as well as the sidewalls 208a-208h of the interior transmission portion 206. This interior planar portion 222 of the outboard portion 186 also at least partially surrounds the interior transmission portion 206. Light that enters the waveguide body 102 through the plurality of coupling cavities 142 along the coupling end surface 158 may be totally internally reflected by the sidewalls 208a-208h of the interior transmission portion 206 before approaching the arcuate redirection features 204a, 204b, 204c. However, as a matter of course, some light is not totally internally reflected and instead escapes laterally from the interior transmission portion 206. This escaped light may be totally internally reflected by one or more of the inner and outer sidewalls 220a-220h, 218a-218d of the recycling feature 212. The escaped light is redirected by total internal reflection off these surfaces back towards the interior transmission portion 206 for eventual extraction by the features thereof.

Referring to FIGS. 11, 12A, 12B, 17, 18, 22A, and 22B, the first redirection feature 204a is defined by four sidewalls 260, 262, 264a, 264b. The first sidewall 260 partially defines the extent of the first redirection feature 204a. The sidewall 260 comprises an arcuate surface curved in the length, width, and thickness dimensions (see FIGS. 18, 22A, and 22B). Further the sidewall 262 is straight in the thickness dimension but curved in the width and length dimensions to form a semi-circle as described above such that the central point thereof is coincident with the central point of the outer perimeter of the first sidewall 260. The first and second sidewalls 260, 262 may be concentric, or may be offset from one another. The sidewalls 264a, 264b define end surfaces of the overall indentation into the top surface 150 formed by the first redirection feature 204a. These sidewalls 264a, 264b may be straight in the length and width dimensions while being curved in the thickness dimension as shown in FIGS. 12A and 12B or instead may be curved in more than one dimension.

Referring still to FIGS. 11, 12A, 12B, 18, 22A, and 22B, the second redirection feature 204b is defined by two sidewalls 266a, 266b. The first sidewall 266a comprises an arcuate surface curved in the length, width, and thickness dimensions (see FIGS. 18, 22A, and 22B) and partially defines the extent of the second redirection feature 204b. Further sidewall 266b is straight in the thickness dimension but curved in the width and length dimensions as noted above to form a semi-circle such that the central point thereof is the same as the central point of the outer perimeter of the first sidewall 266a of the second redirection feature 204b. Like the first redirection feature 204a, the sidewalls 266a, 266b define generally an indentation into the top surface 150 of the waveguide body 102 and may be curved in one or more dimensions.

Still with reference to FIGS. 11, 12A, 12B, 18, 22A, and 22B, the third redirection feature 204c has an orientation opposite the first and second redirection features 204a, 204b. The third redirection feature 204c is defined by six sidewalls 268a, 268b, 270a, 270b, 272a, 272b. Similar to the arrangement of sidewalls 260, 266a of the previous two described redirection features, first sidewall 268a of the third redirection feature 204c is curved the length, width, and thickness dimensions (see FIGS. 18, 22A, and 22B). Further sidewall 268b is vertically straight in the thickness dimension but curved in the width and length dimensions to form a semi-circle as described above such that the central point thereof is coincident with the central point of the outer the first sidewall 268a of the third redirection feature 204c.

Referring now specifically to FIG. 12B, the reflection and redirection features 161 formed by the second and third extraction features 204b, 204c abut one another and form a continuous circular indentation in the top surface 150 of the waveguide body 102. However, the sidewalls 270a, 270b, 272a, 272b define a difference in depth (i.e., along the thickness dimension) between the second and third redirection features 204b, 204c. The outer sidewalls 270a, 270b face the coupling end surface 158. The sidewalls 266b, 268b have slightly different radii of curvature, with the surface 266b having a slightly greater radius of curvature than the surface 268b, resulting in the inner sidewalls 272a, 272b in the embodiment shown in FIGS. 12A and 12B being relatively small in side-to-side extent. However, the sidewalls 270a, 270b, 272a, 272b, may extend to a lesser or greater extent into the volume of the indentations formed by the second and third redirection features 204b, 204c to provide more or less definition between the two features so as to achieve desired illumination patterns.

Figure 17:
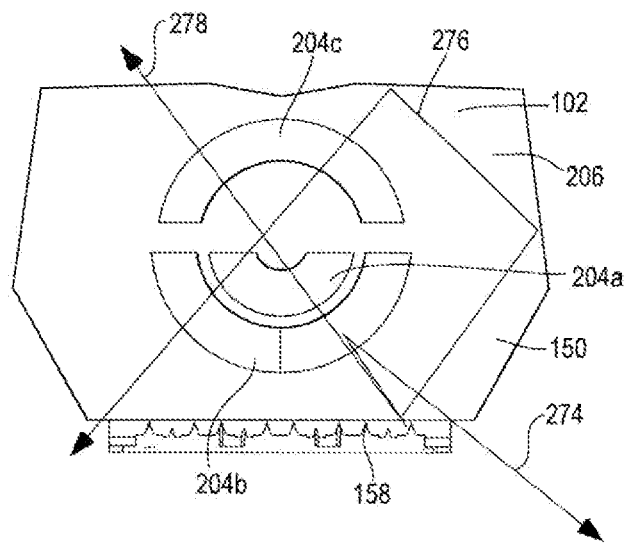
FIG. 17 is a plan view diagram depicting light rays traveling through a portion of a waveguide body.

Referring now to FIGS. 17, 18, 19, 20, and 21, ray trace diagrams depict how light may travel through the waveguide body 102 from the light coupling cavities 142. In FIG. 17, light that enters through the coupling cavities 142 is transmitted through the interior transmission section 206 by total internal reflection off of the sidewalls 208a-208h. Through this total internal reflection of light through the interior transmission portion 206, a portion of light rays 274 are supplied with a directional component opposite that of the light rays entering the waveguide body 102 at the coupling cavities 142. This allows some light to impinge on the redirection feature 204c from an angle that approaches an extracting surface of the sidewall 268b. However, another portion of light rays 274 is not transmitted about the interior transmission portion 206, but instead directly impinges incident on redirection sidewalls 260, 266a of the first and second redirection features 204a, 204b. The extraction portion 163 extracts light rays by changing directions of light rays through the combination of top and bottom features 161, 162. This aspect assists in light/color mixing of different color light from BSY and Red-Orange (RDO) LED elements 136a, 136b by dispersing light rays in individually different directions, relative to the entrance trajectory of light through the coupling cavities 142, by total internal reflection off of pairs of curved surfaces in the redirection and reflection features 161 and the extraction and refraction features 162.

From the foregoing, and as is evident by an inspection of the Figures, the redirection and reflection features 161 are disposed in a first (i.e., upper) thickness portion of the body 102, whereas the extraction and refraction features 162 are disposed in a second (i.e., lower) thickness portion of the body 102. The first and second thickness portion may be distinct (as illustrated) or not distinct.

Figure 18:
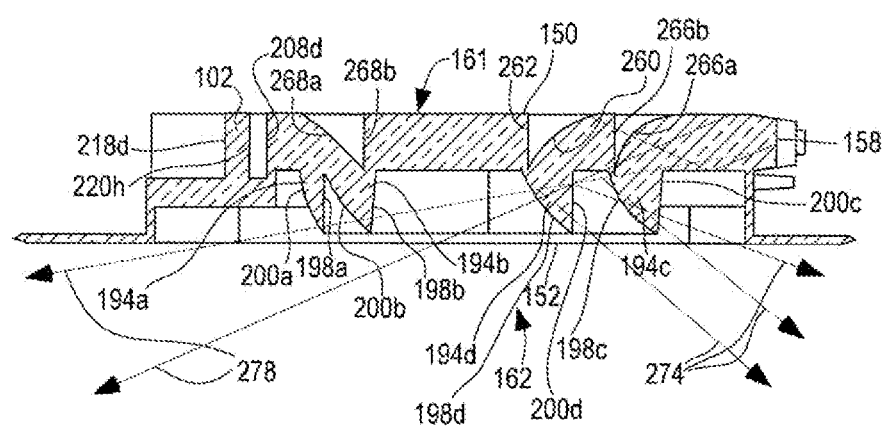
FIG. 18 is a cross-sectional view taken generally along the lines 18-18 indicated in FIG. 11.

FIG. 18 depicts the interaction between the surfaces of the bottom refraction and extraction features 162 and the reflection surfaces of the arcuate redirection and reflection features 161 on the top surface 150. As an example, light rays 274 entering through the coupling cavities 142 totally internally reflect off of the reflection sidewalls 260, 266a, of the redirection features 204a, 204b. Further in the illustrated example, the reflected light is incident on the curved reflection sidewalls 198c, 198d. The reflected light exits the waveguide body 102 through the bottom emission surface 152 at an angle back towards the coupling end surface 158 with a directional component opposite the general direction of light entering the waveguide body 102.

Figure 19:
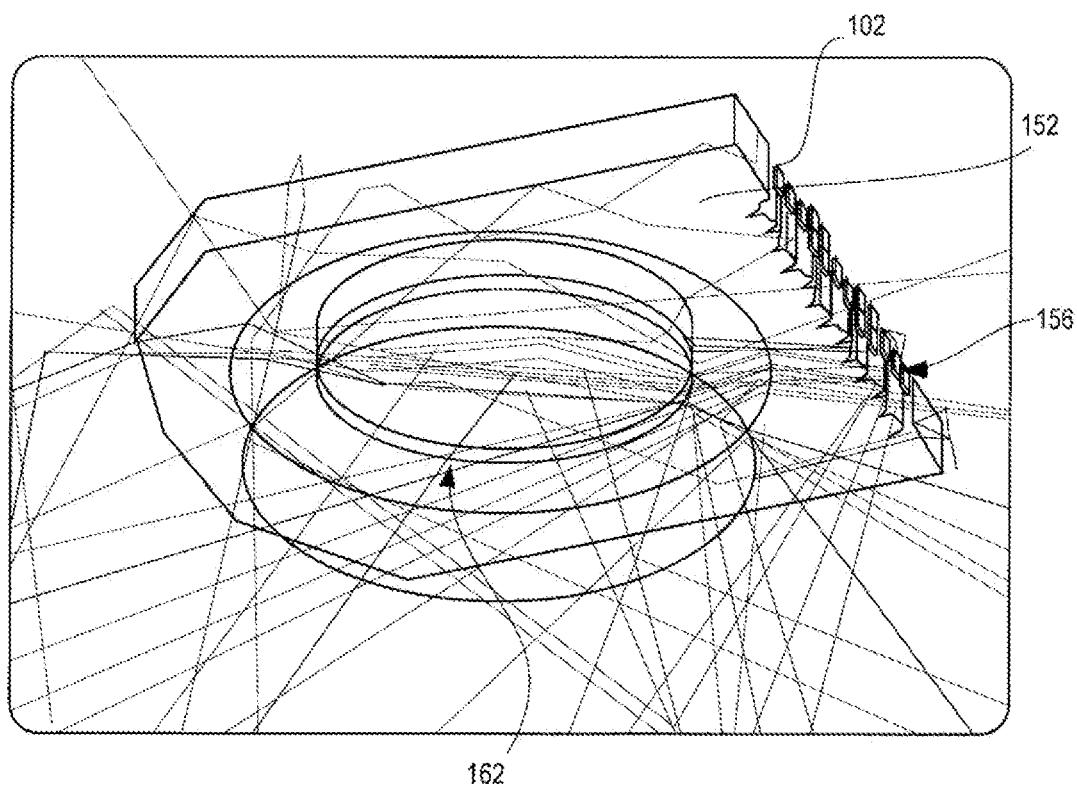
FIG. 19 is an isometric view from above of a ray trace diagram of a portion of a waveguide body.
Figure 20:
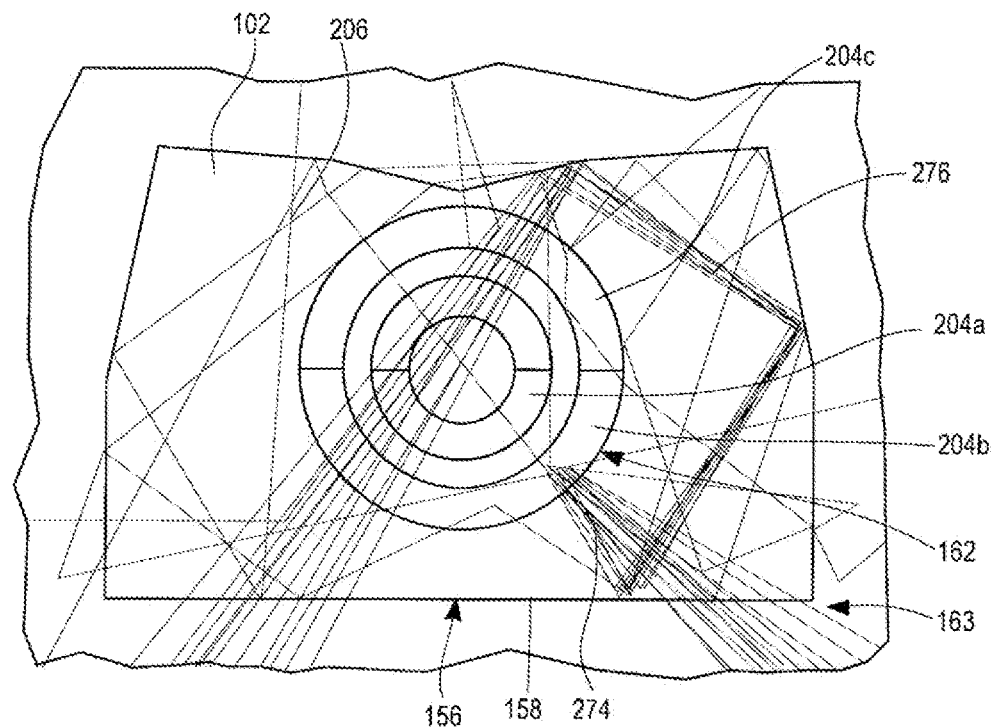
FIG. 20 is a plan view from above of a ray trace diagram of a portion of a waveguide body.
Figure 21:
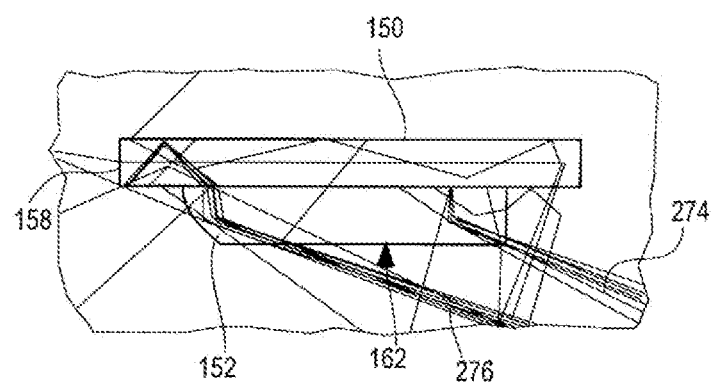
FIG. 21 is a side elevational view of the ray trace diagram of FIG. 20.

With further reference to FIG. 19, some light rays are not totally internally reflected by the top surface redirection features 204a, 204b. Instead, another portion of light rays 278 are transmitted through the interior transmission portion 206 until directly impinging on the sidewalls 198c, 198d, 200c, 200d of the curved ridges 194c, 194d. For this portion of light rays 278, the sidewalls 198c, 198d, 200c, 200d extract the light by refracting the light out of the bottom emission surface 152. The light rays 278 refracted out by the refraction and extraction features 162 of the bottom surface 152 are emitted at an angle forward and away from the coupling end surface 158 with a directional component along the general direction of light entering the waveguide body 102. In this capacity the refraction and extraction features 162 comprising curved ridges 194a, 194d perform extraction and refraction of light rays. Likewise, some light rays are transmitted through the interior transmission portion 206, perhaps reflecting on the sidewalls 208a-208h thereof or the sidewalls 220a-220h, 218a-218d of the recycling feature before impinging on the sidewalls 198a, 198b, 200a, 200b of the curved ridges 194a, 194b. For this portion of light rays, the sidewalls 198a, 198b, 200a, 200b extract the light by refracting the light out of the bottom, emission surface 152 at an emission angle forward and away from the coupling end surface 158 with a directional component along the general direction of light entering the waveguide body 102. Light rays may simply exit the waveguide body 102, or may exit and reenter the waveguide one or more times before finally exiting the waveguide body 102.

The various portions of light are extracted to produce an overall or cumulative desired illumination pattern. The configuration of the light refraction and extraction features 162, the light redirection features 204a, 204b, 204c, and the light redirecting sidewalls directs substantially all of the light out of the bottom surface 152 of the waveguide body 102. In alternative embodiments, additional subsets of LEDs elements 136 may be coupled into additional portions of the waveguide body 102 to be redirected, reflected, and extracted, or redirected to be extracted in a different portion of the waveguide body 102, or directly refracted without reflection and extracted to produce a composite or cumulative desired illumination pattern.

Figure 22A:
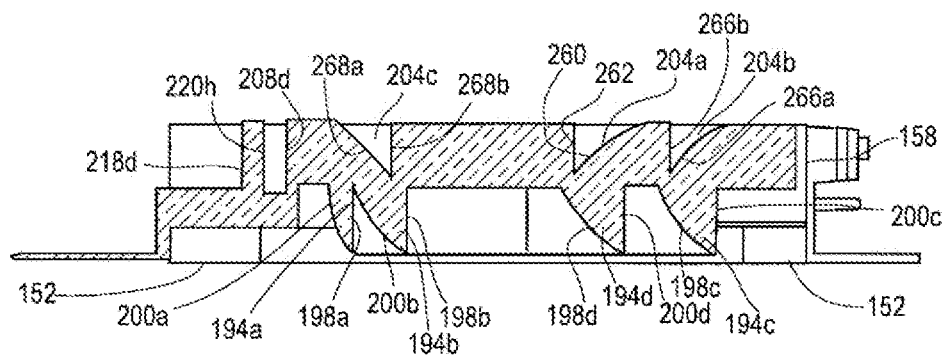
FIGS. 22A and 22B are cross-sectional views of embodiments of a waveguide body taken along lines corresponding to lines 18-18 of FIG. 11.
Figure 22B:
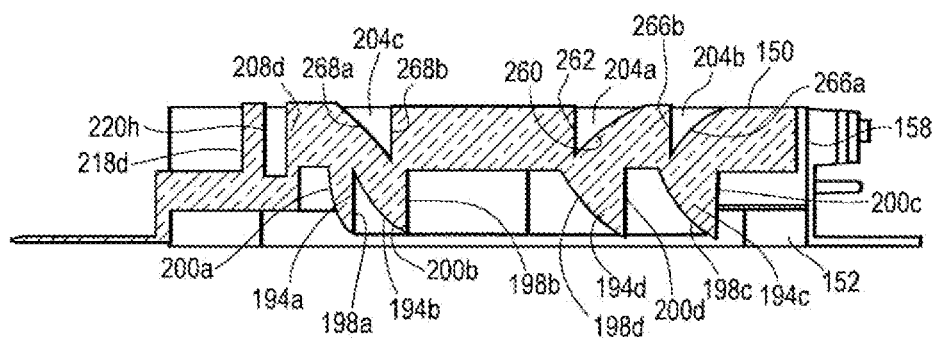

FIGS. 22A and 22B depict a cross-sectional view of the waveguide body shown in FIG. 11 taken from the center of the waveguide body 102 along the y-dimension at the line 18-18. FIG. 22A depicts a cross-sectional view taken along the same plane as FIG. 22B, but illustrates an embodiment having less optical material of the waveguide body 102 separating the surfaces of redirection features disposed on the top surface 150 and the curved bottom light refraction and extraction features 162. The thickness of material separating the top and bottom features may modify the angles at which light rays are refracted and/or reflected from the waveguide body 102 and emitted from the bottom surface 152.

Referring now to FIG. 23, an embodiment of the waveguide body 102 similar to that depicted in FIGS. 11-14 is shown. The embodiment of FIG. 23 has the top and bottom surfaces 150, 152 comprising identical or similar extraction, reflection, recycling, and other features and dimensions to the embodiment of the waveguide body 102 shown in FIGS. 11-14. However, the various features common to the waveguide body 102 shown in FIGS. 11-14 may instead be formed with the plurality of coupling cavities 142 having the parabolic entrance geometry as discussed herein. FIG. 24 shows a detailed view of a portion of the plurality of coupling cavities 142 having the parabolic entrance geometry. In contrast, FIG. 25 depicts an embodiment of the plurality of coupling cavities 142 wherein the coupling cavities 142 comprise the wedge-shaped geometry shown in the waveguide body 102 embodiment of FIGS. 11 and 12. Furthermore, the embodiments of the waveguide body 102 depicted in FIGS. 23-25 include the facets 166a-166e.

Figure 26A:
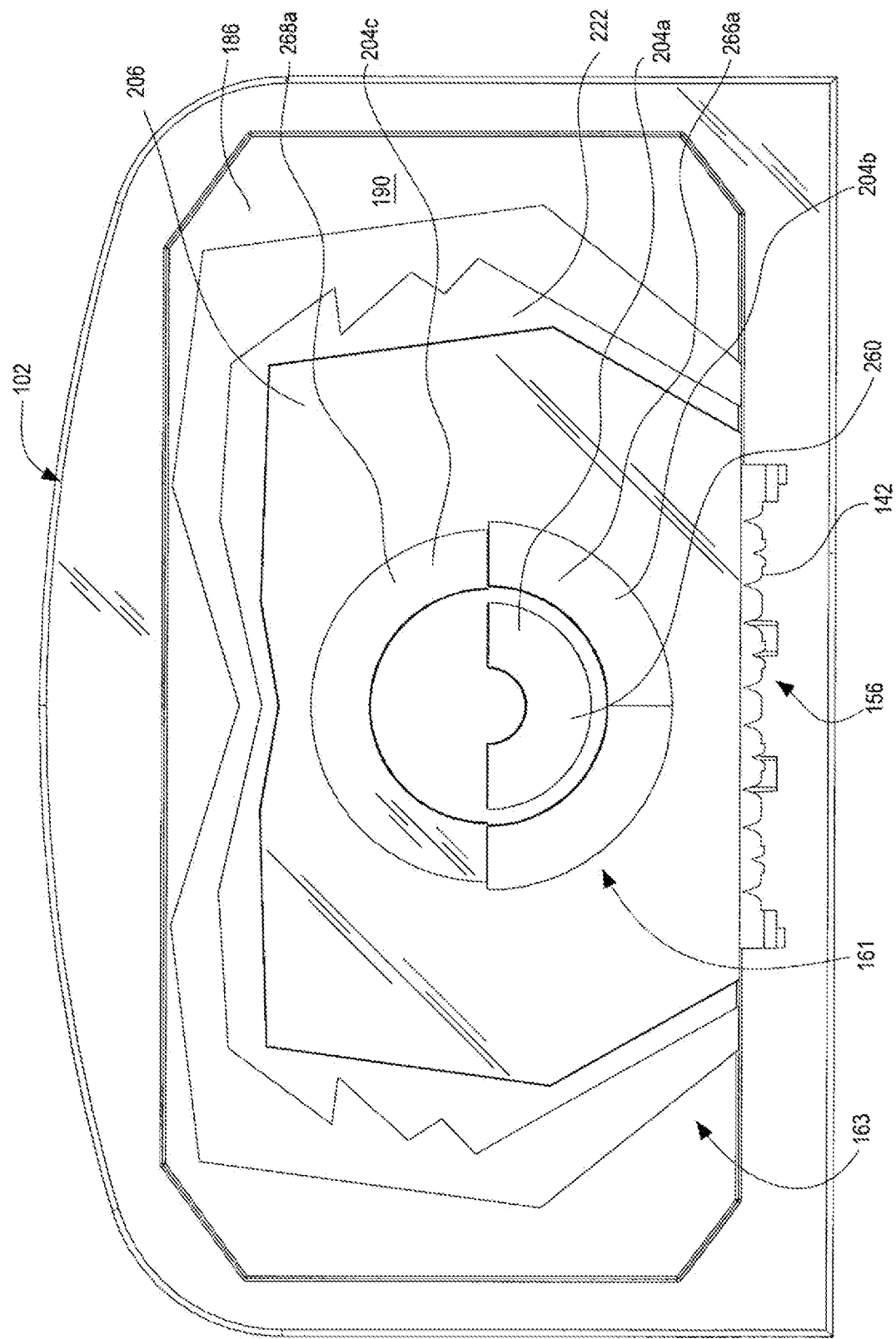
FIG. 26A is a plan view of an alternate embodiment of the waveguide body of FIG. 11.
Figure 26B:
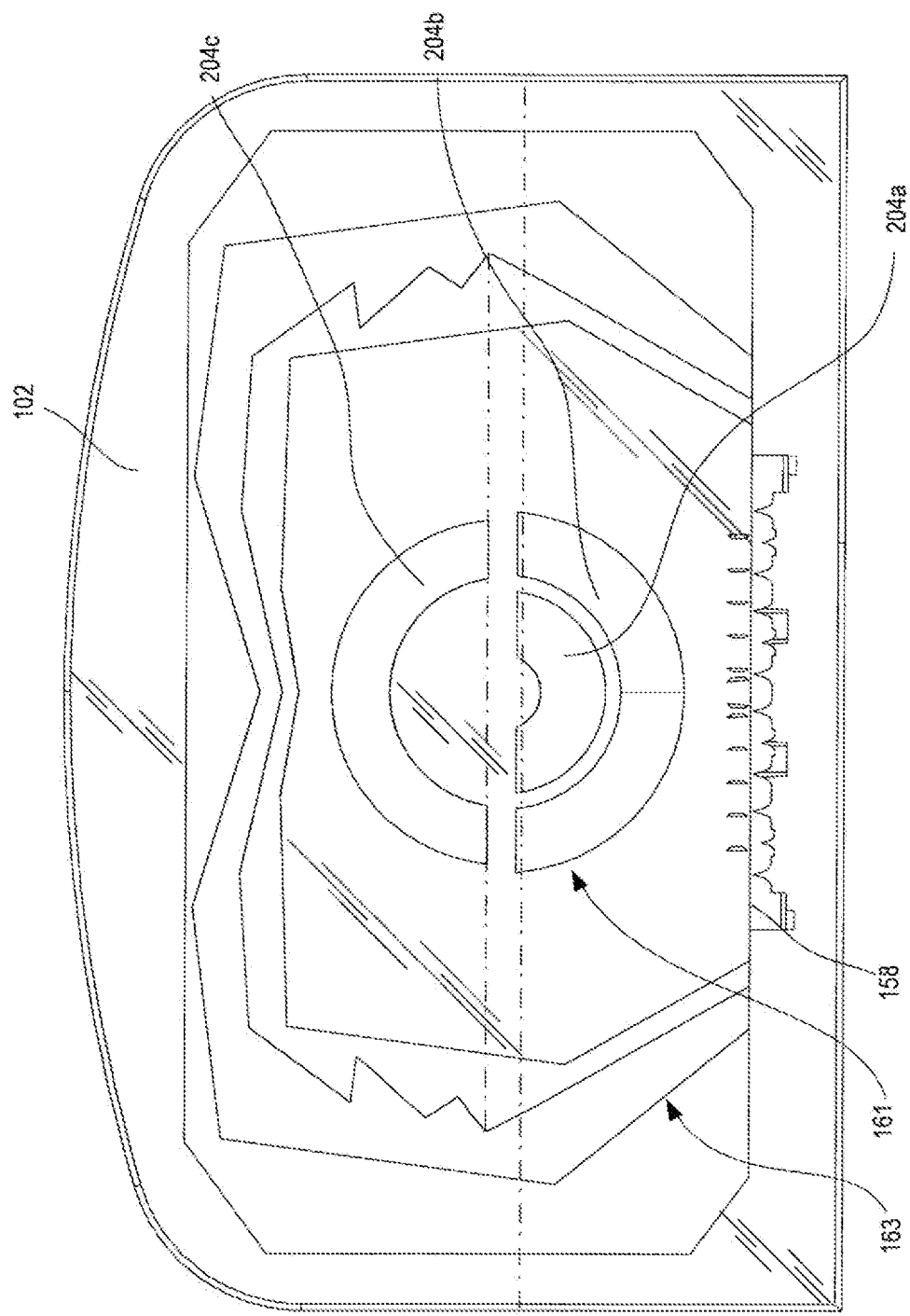
FIG. 26B is a plan view of an alternate embodiment of the waveguide body of FIG. 11.

Referring now to FIG. 26A, an alternate embodiment of the waveguide body 102 is shown. In this embodiment, the facets 166 of the embodiments depicted in FIGS. 11-14 and 23-25 are omitted. This embodiment relies on the geometry of the coupling cavities 142 and the internal operation of the light extraction, redirection, refraction, and reflection surfaces to achieve suitable light/color mixing. Further alternate embodiment shown in FIG. 26B includes a gap between the back redirection features 204a, 204b and the front redirection feature 204c.

Figure 27A:
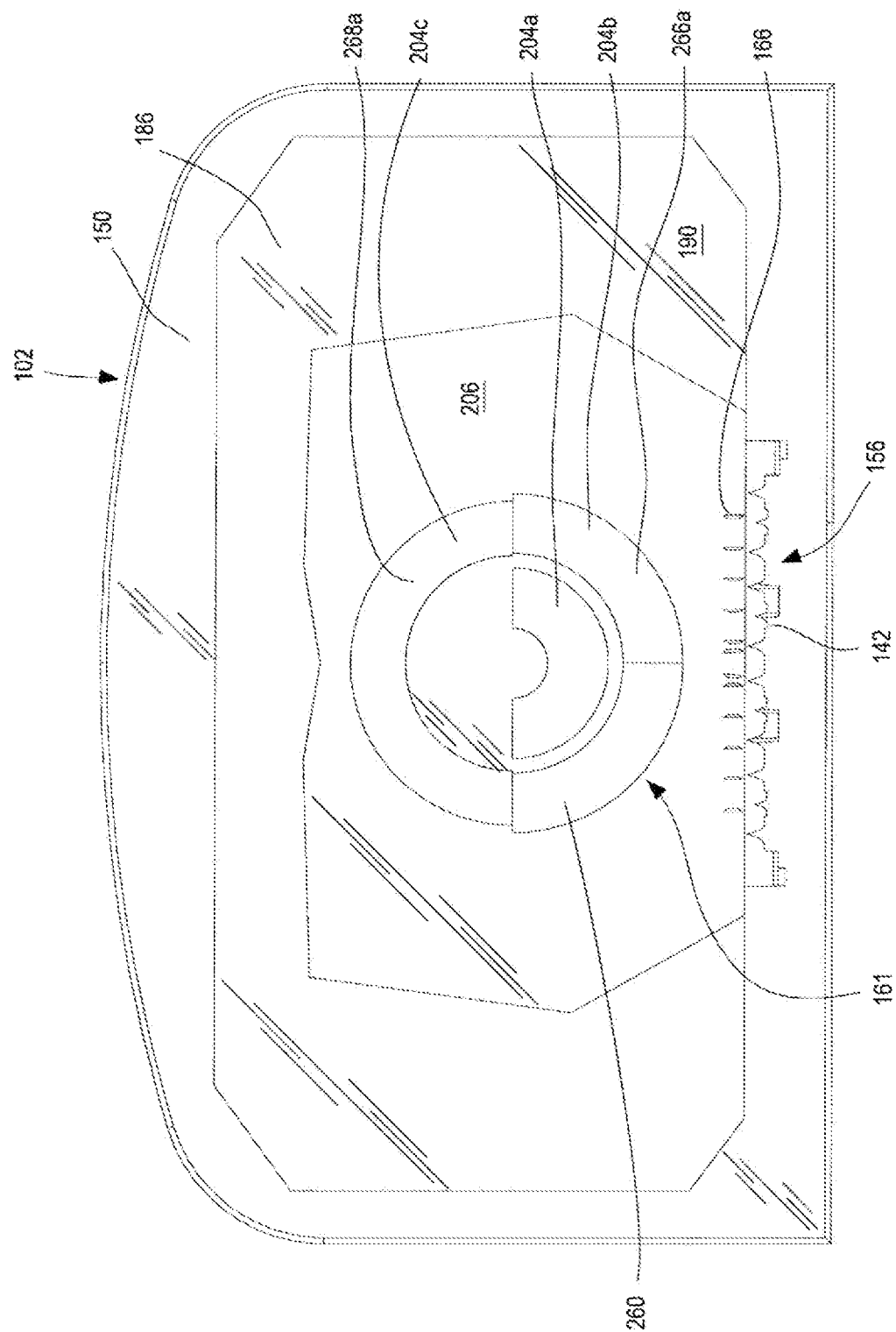
FIG. 27A is a plan view of an alternate embodiment of the waveguide body of FIG. 11.
Figure 27B:
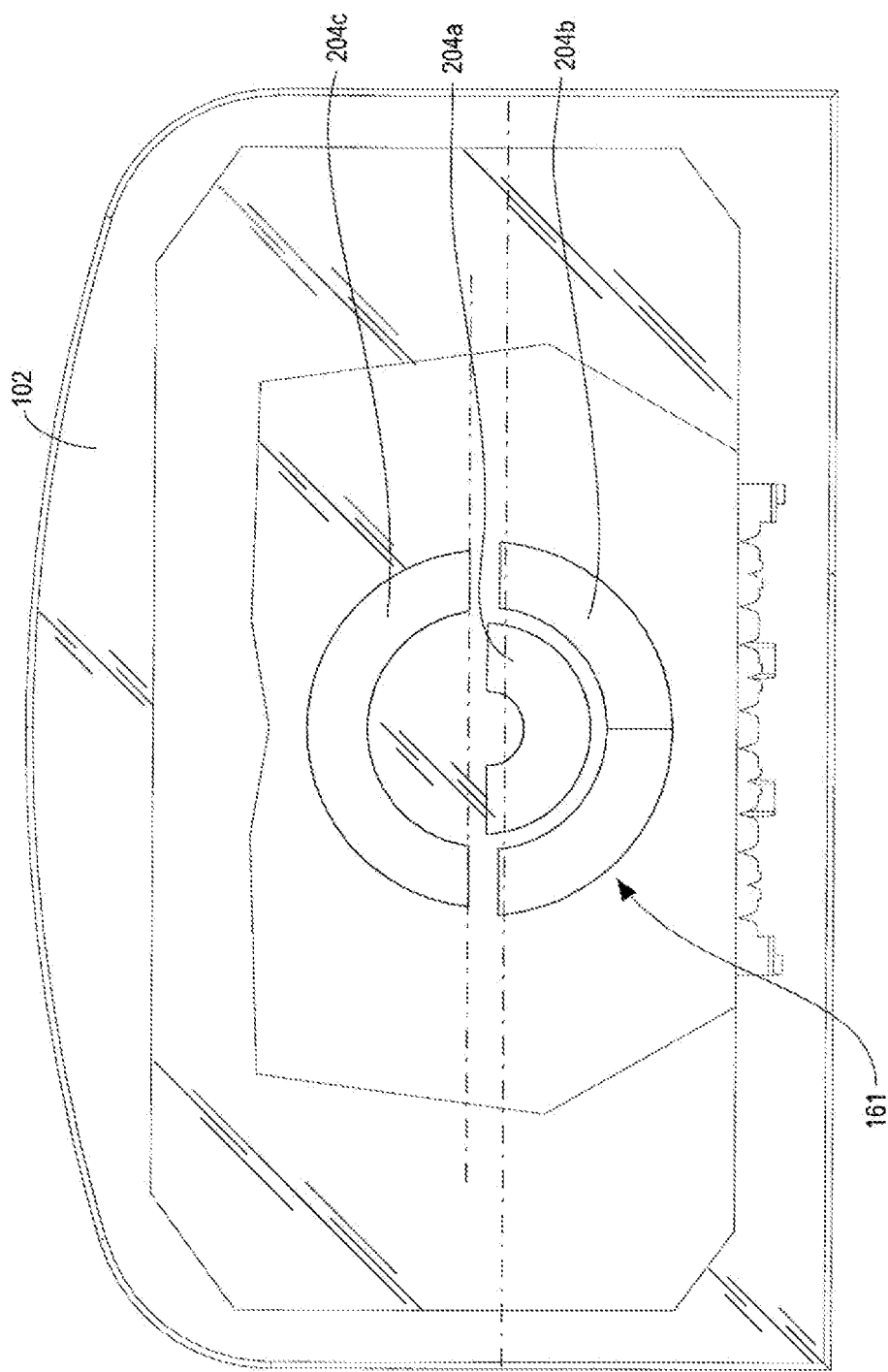
FIG. 27B is a plan view of an alternate embodiment of the waveguide body of FIG. 11.
Figure 28:
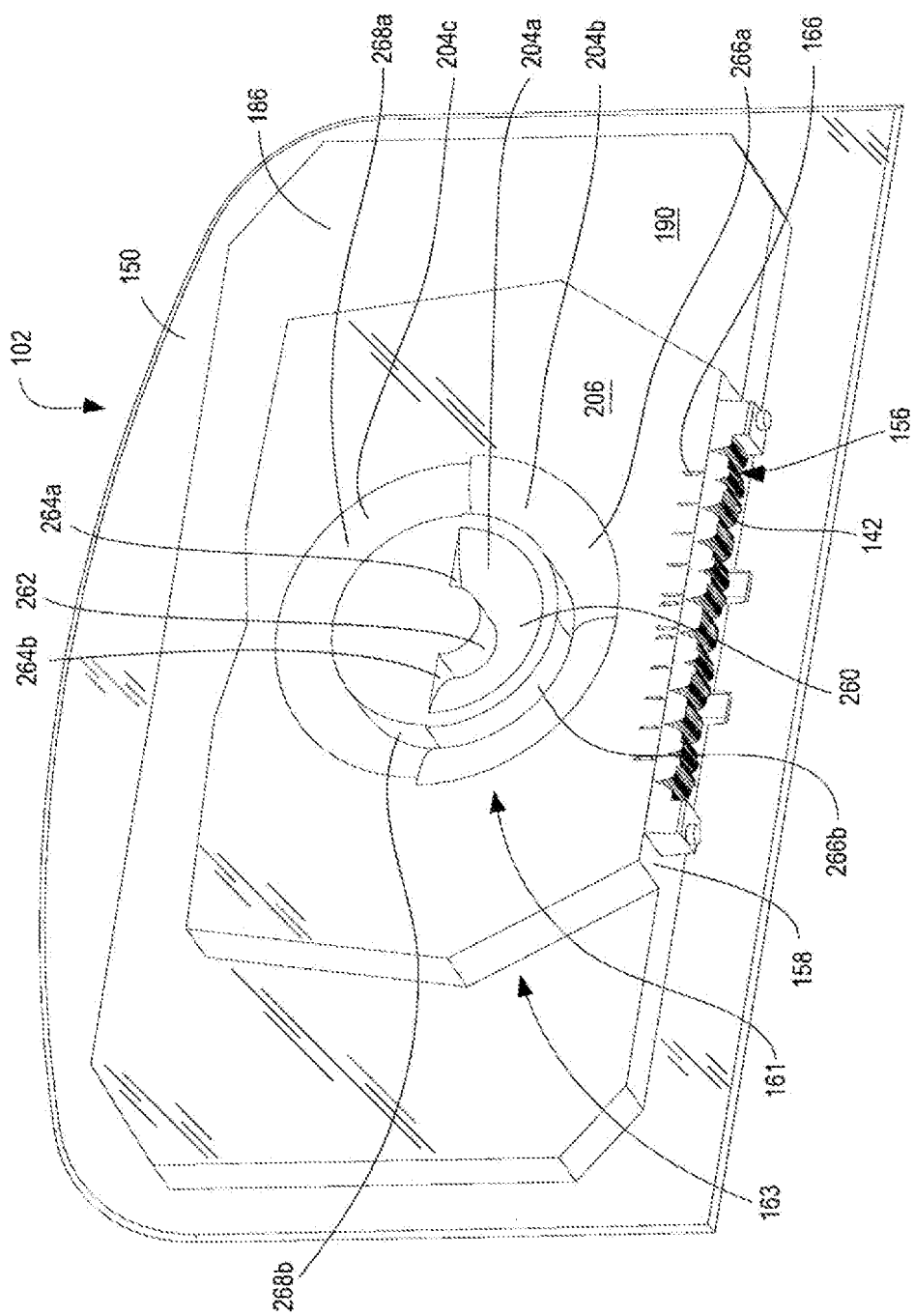
FIG. 28 is an isometric view from above of the waveguide body of FIG. 27A.
Figure 29:
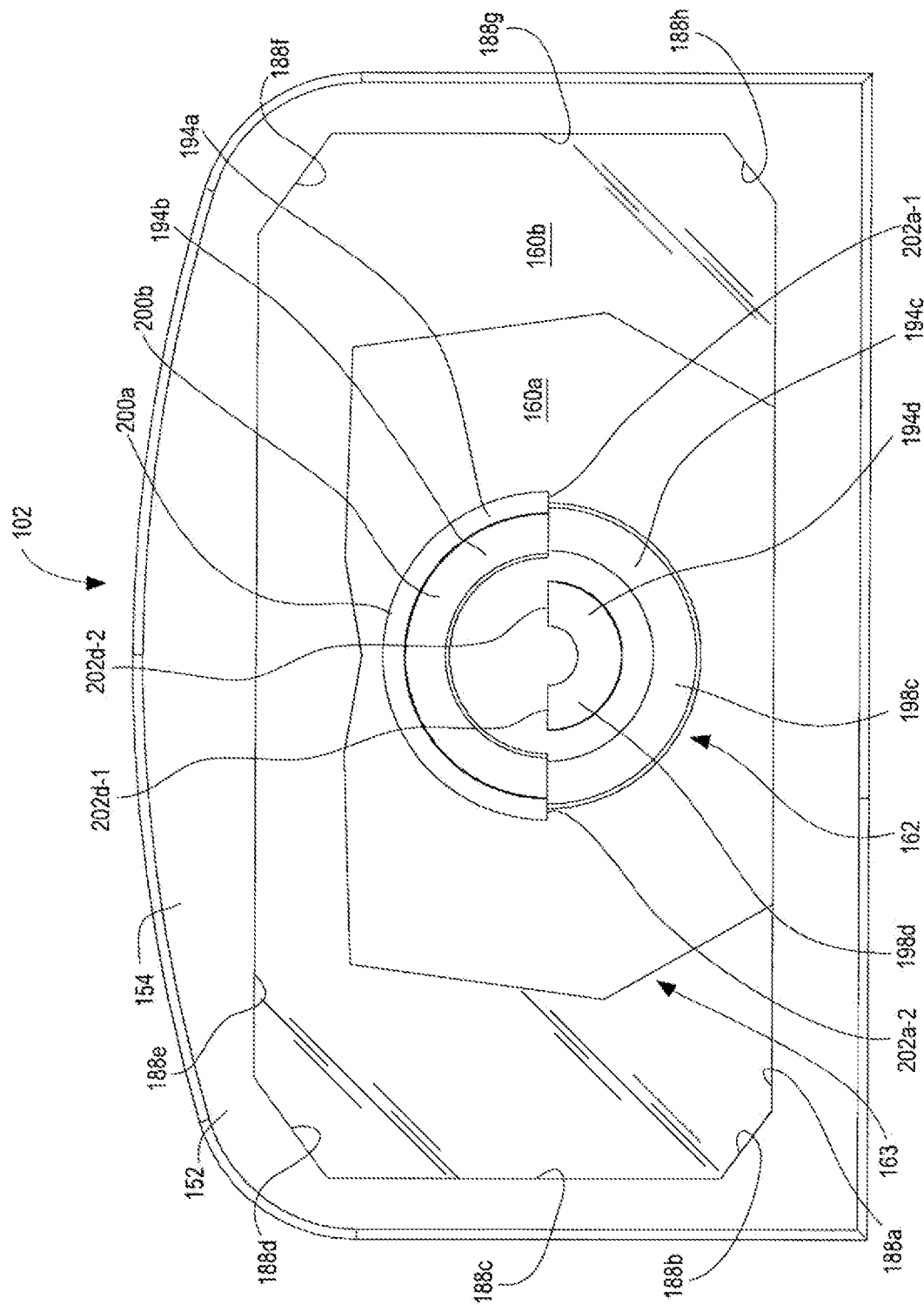
FIG. 29 is a bottom elevational view of the waveguide body of FIG. 27A.
Figure 30:
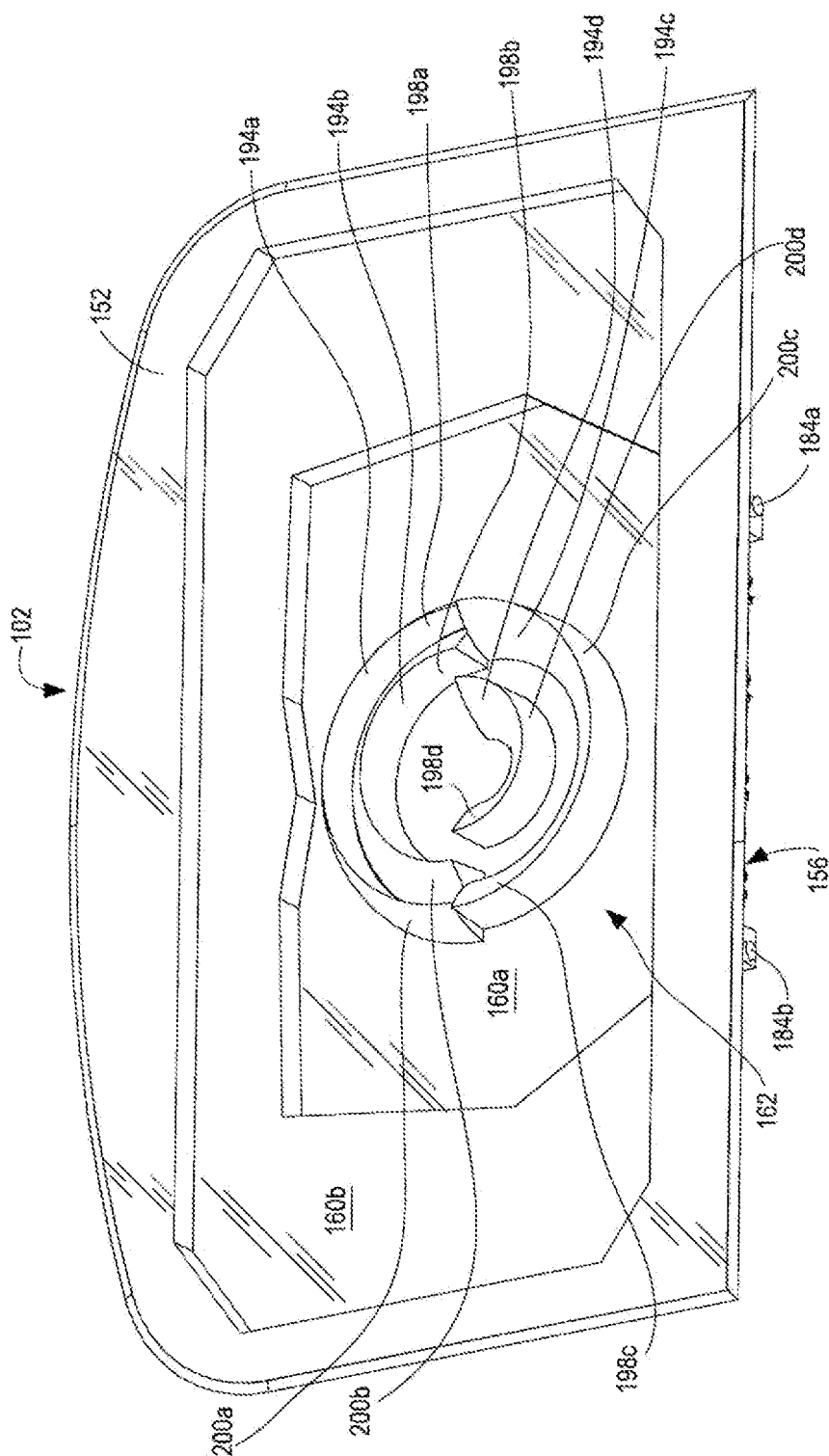
FIG. 30 is an isometric view from below of the waveguide body of FIG. 27A.

Referring next to FIGS. 27A-30, a further alternate embodiment of the waveguide body 102 is shown. In this embodiment, the facets 166 are included near the plurality of coupling cavities 142 and proximal the coupling end surface 158 for the purpose of light/color mixing within the waveguide body 102. However, the recycling feature 212 is omitted. As seen in FIGS. 27A and 28, the interior planar portion 222 of the outboard portion 186 is not delineated by the inner sidewalls 220a-220h of each recycling feature branch 214a, 214b. Instead, a planar surface 190 of the outboard portion 186 is defined by the sidewalls 210a-210h of the outboard portion 186 and further by the sidewalls 208a-208h of the interior transmission portion 206. Alternate embodiments of the waveguide body 102 with the recycling feature 212 omitted therefrom may include the facets 166 as depicted in FIGS. 27A and 28 or may instead also have the facets 166 omitted. Regardless of whether the recycling feature 212 and/or the facets 166 are omitted, the features of the bottom surface 152 seen in FIGS. 29 and 30 are similar or identical to the features of the bottom surface 152 described with reference to FIGS. 13 and 14 hereinabove. The alternate embodiment shown in FIG. 27B includes a gap between the back redirection features 204a, 204b and the front redirection features 204c. Further in this embodiment, the redirection feature 204a is offset with respect to the other redirection features 204b, 204c.

FIGS. 31-34 depict another alternate embodiment of the waveguide body 102 having modified features on the top surface 150. In this embodiment, additional material is added in and around the interior transmission portion 206 and the recycling feature 212. The branches 214a, 214b of the recycling feature 212 are merged with the interior transmission portion 206. This configuration is provided by shortening or omitting a portion of the interior planar portion 222 of the outboard portion 186 such that the coupling end surface 158 is conjoined with the end surface 216 of the recycling feature 212. This modification provides an additional sidewall 224 that defines the interior planar portion 212 nearer the coupling end surface 158. While the interior planar portion 222 does not fully separate the recycling feature 212 from the interior transmission portion 206, the interior planar portion 222 is now separated into identical left and right interior planar portions 222a, 222b. A connecting section 226 proximal the center line 172 of the waveguide body 102 is disposed between the interior planar portions 222a, 222b. The connecting section 226 provides an additional sidewall 228 to further define the interior planar portion 222a. The additional sidewalls 224 and 228 that further define the interior planar portion 222a have substantially identical mirror image counterparts on the opposite side of the center line 172 defining the interior planar portion 222b.

Figure 31:
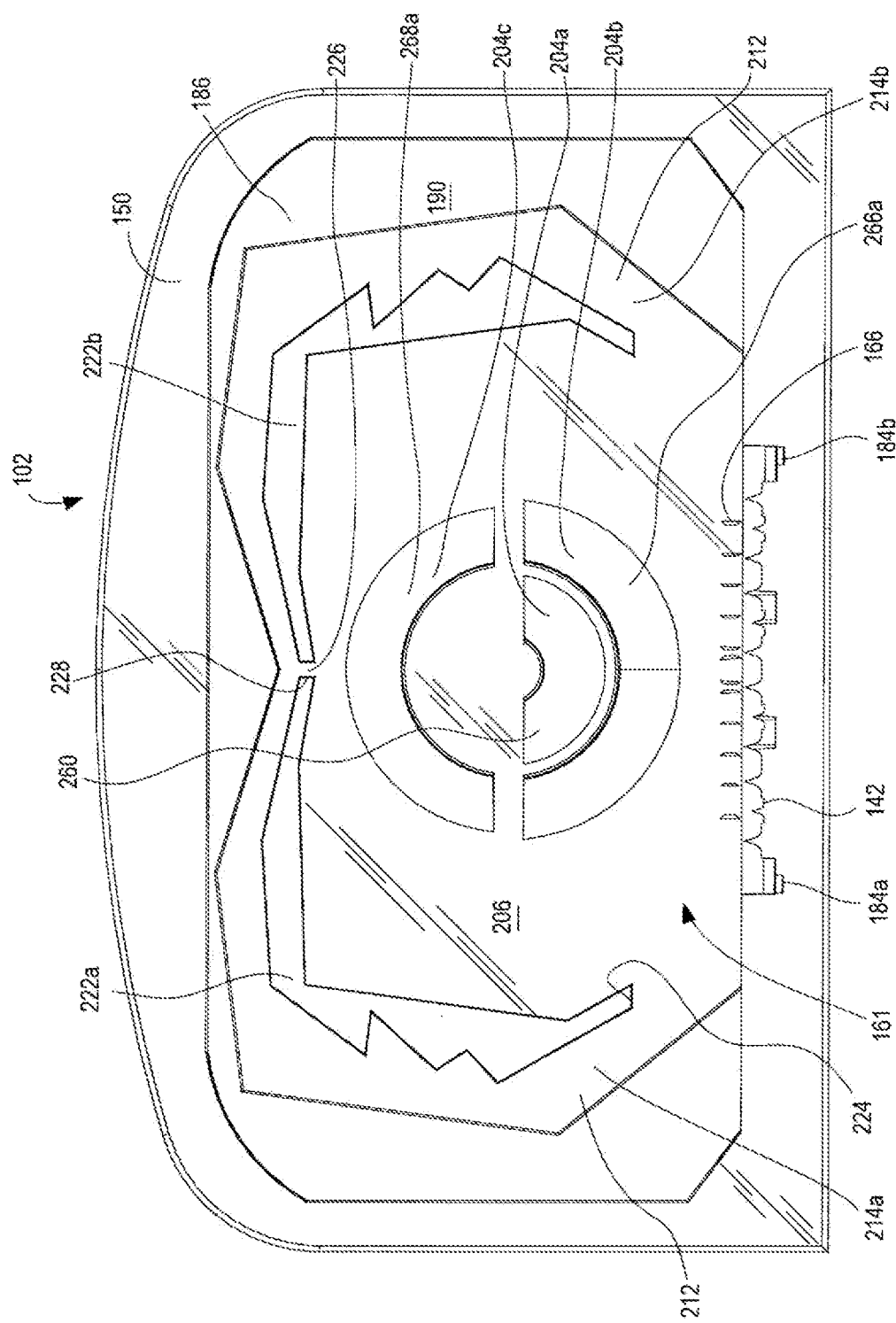
FIG. 31 is a plan view of an alternate embodiment of the waveguide body of FIG. 11.
Figure 32:
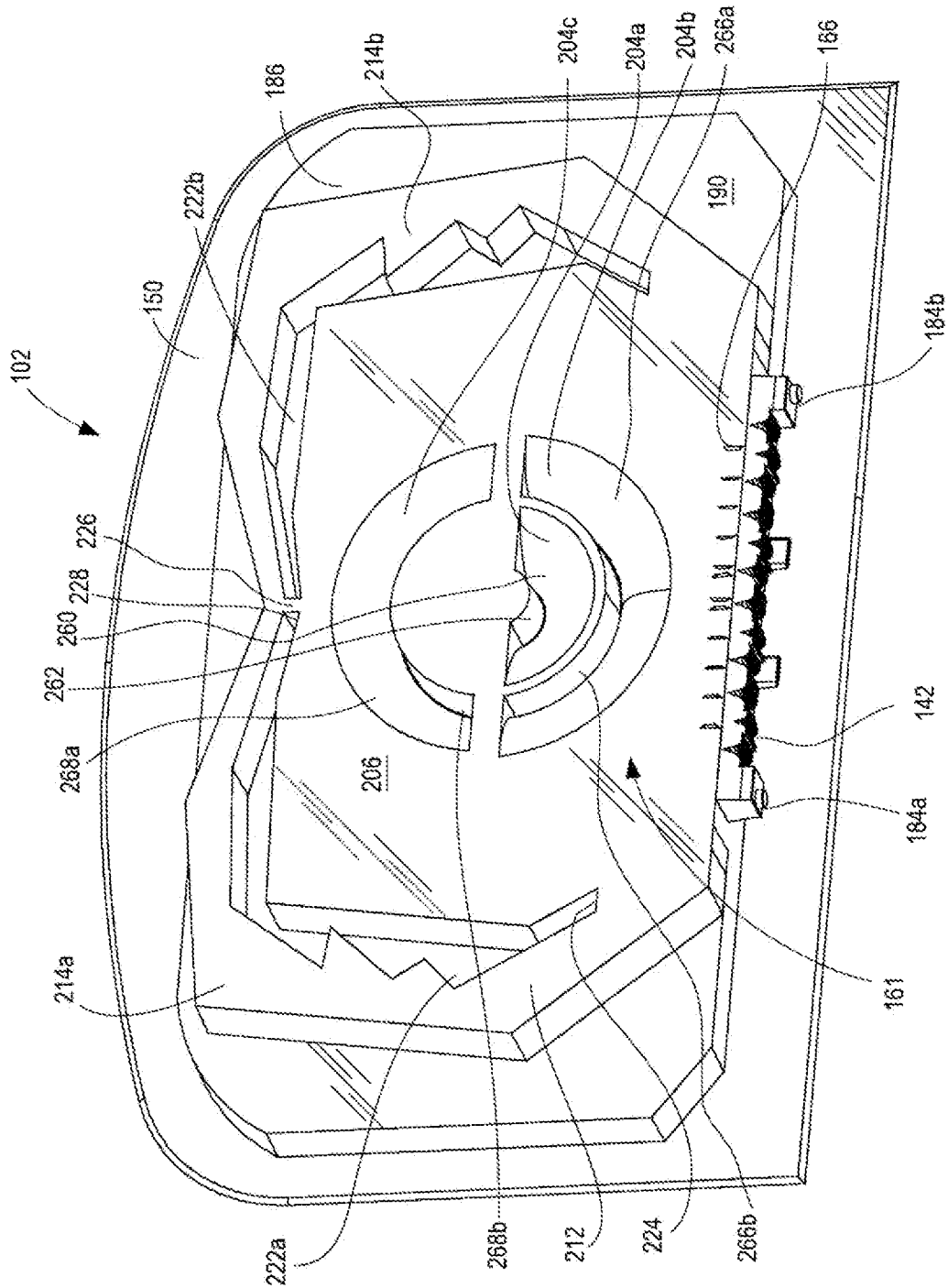
FIG. 32 is an isometric view from above of the waveguide body of FIG. 31.
Figure 33:
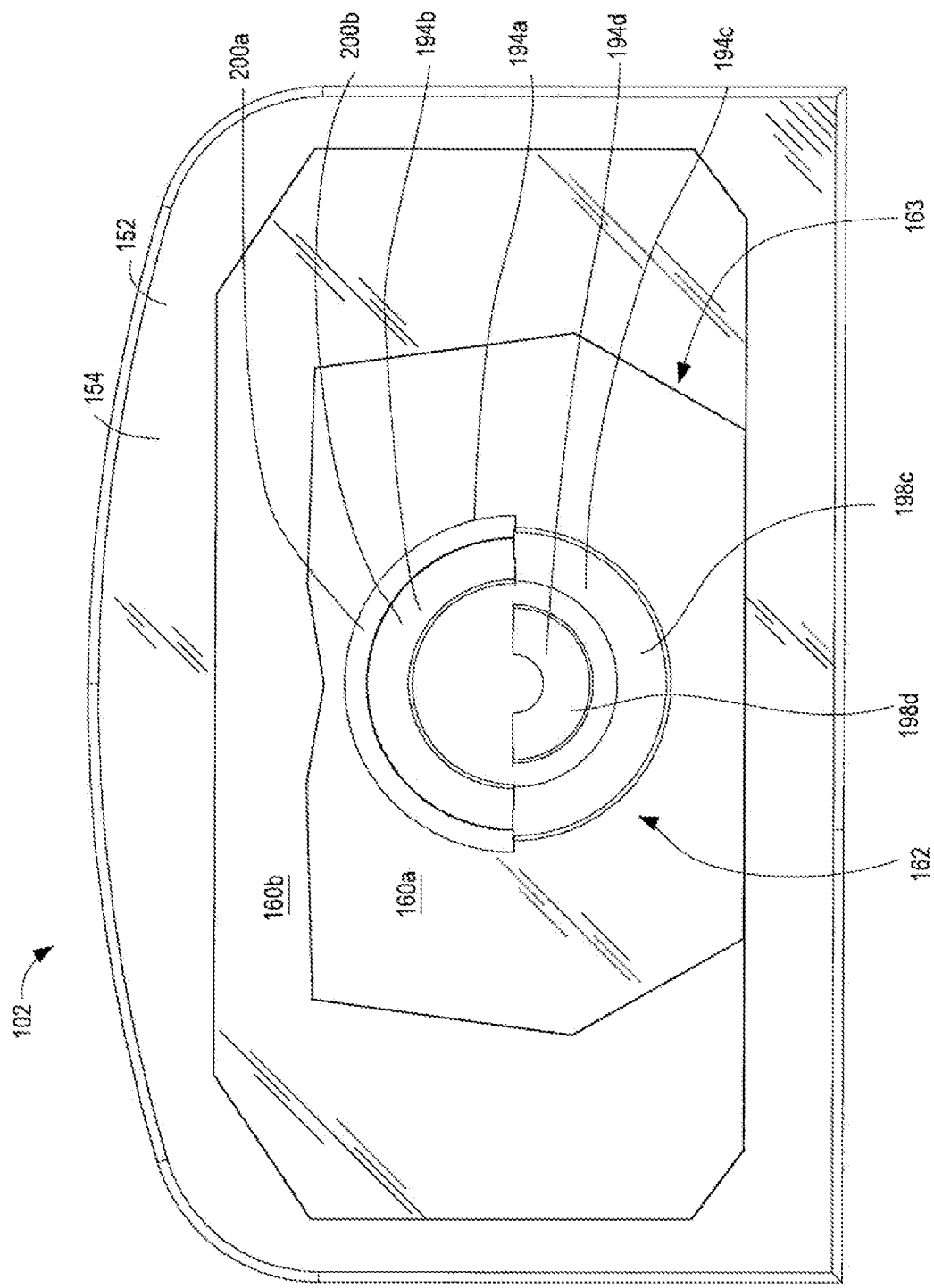
FIG. 33 is a bottom elevational view of the waveguide body of FIG. 32.
Figure 34:
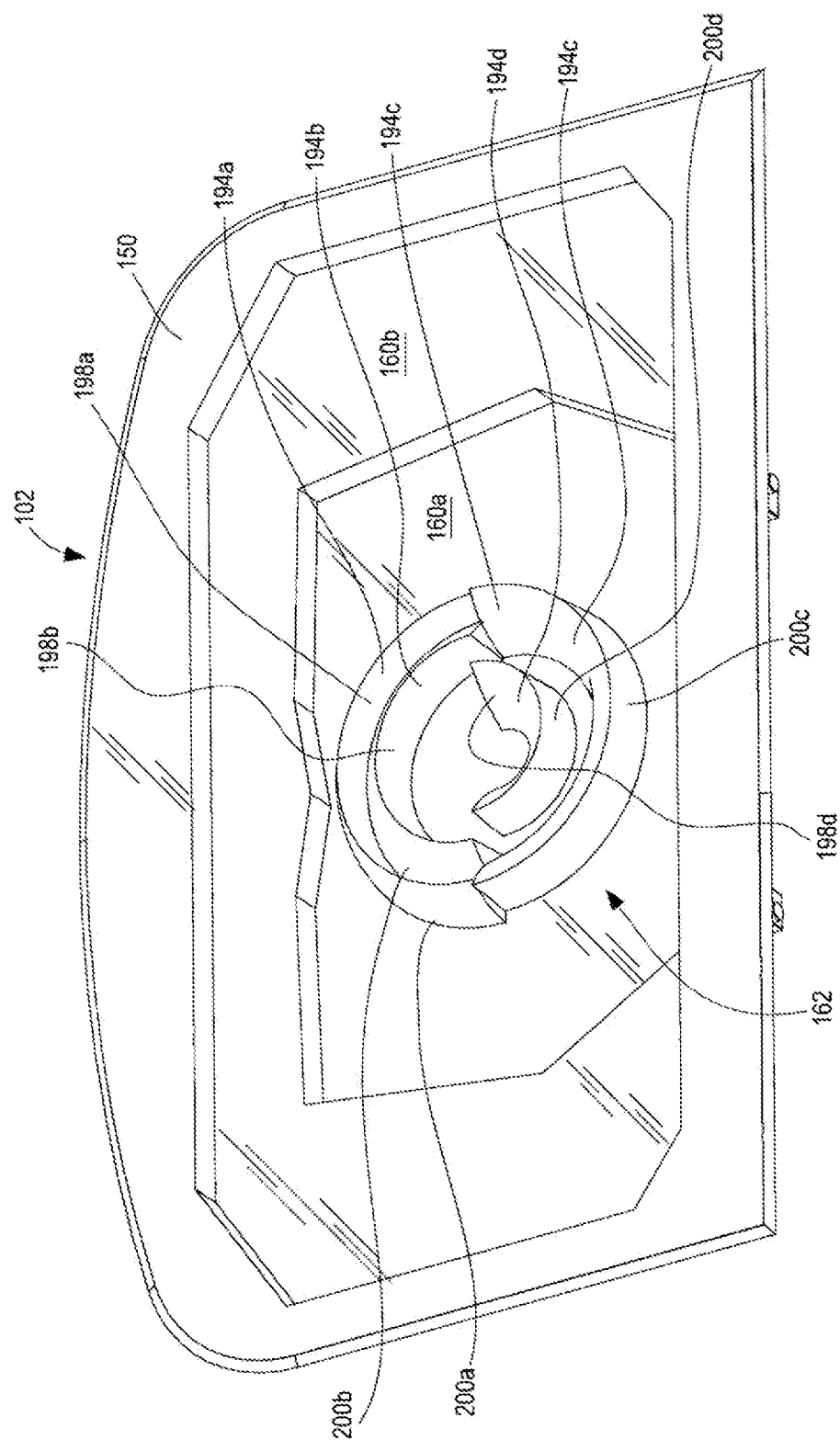
FIG. 34 is an isometric view from above of the waveguide body of FIG. 32.

This alternate embodiment of the waveguide body 102 may have parabolic or wedge-shaped entrance geometries of the coupling cavities 142 arranged along the coupling end surface 158. Further, this alternate embodiment may include the facets 166 near the coupling end surface 158, as seen in FIGS. 31 and 32, for additional color and light mixing, or the same may be omitted. FIGS. 33 and 34 depict the bottom surface 152 of the waveguide body 102 as substantially identical to the bottom surface 152 depicted previously and detailed with reference to FIGS. 13 and 14.

Figure 35:
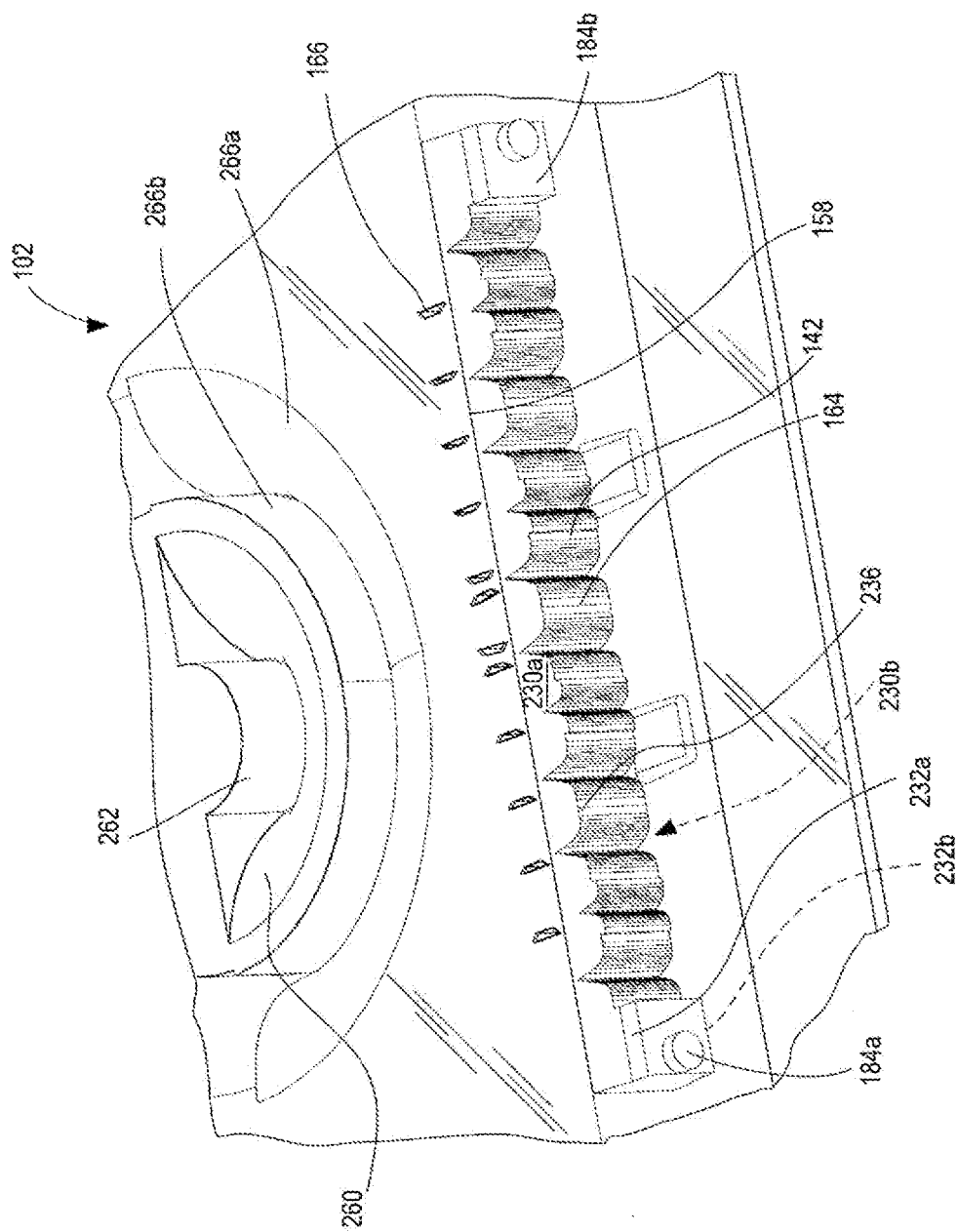
FIG. 35 is an enlarged, fragmentary, isometric view from above of a wedge-shaped coupling cavity entrance geometry of an embodiment of the waveguide body.
Figure 36:
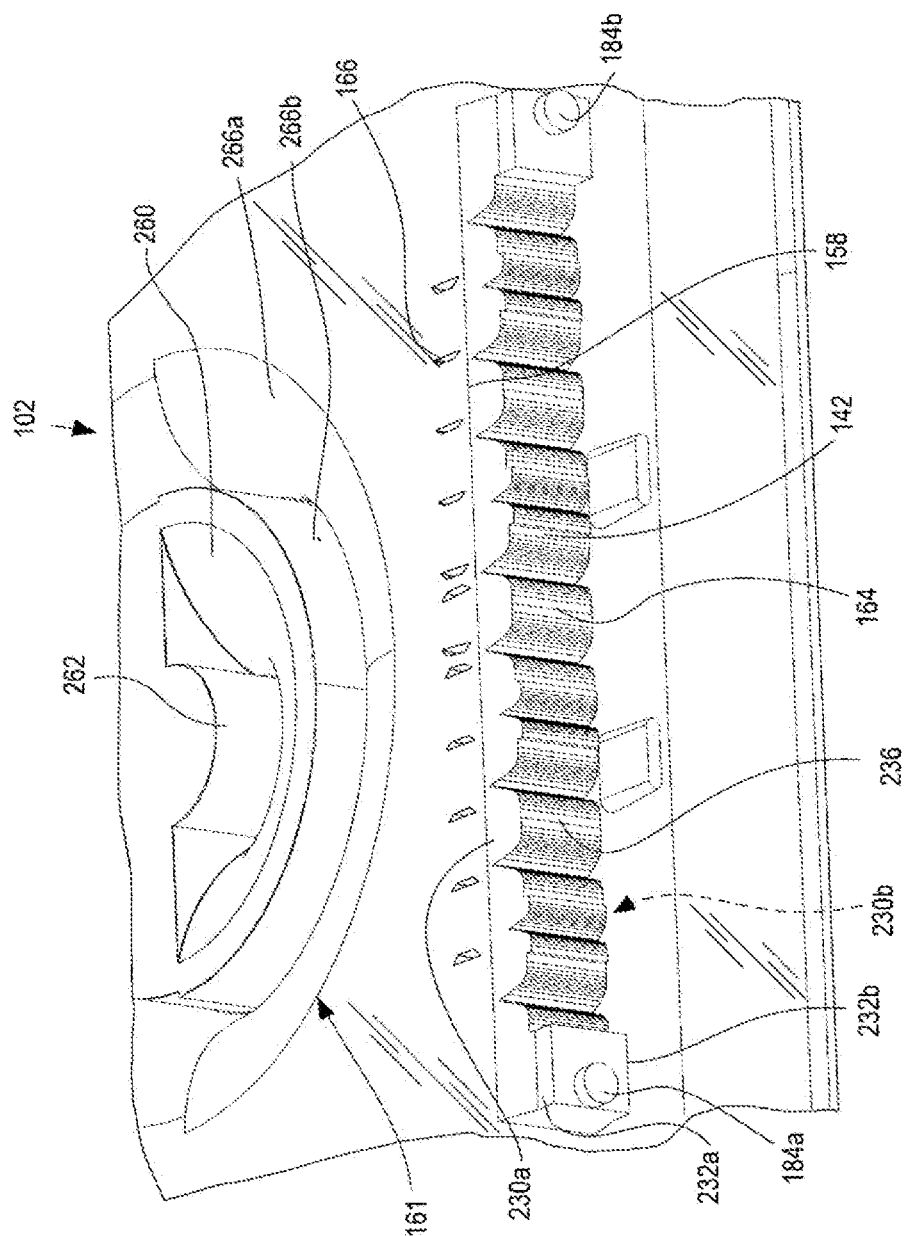
FIG. 36 is an enlarged, fragmentary, isometric view from above of a parabolic coupling cavity entrance geometry of an embodiment of the waveguide body.
Figure 37:
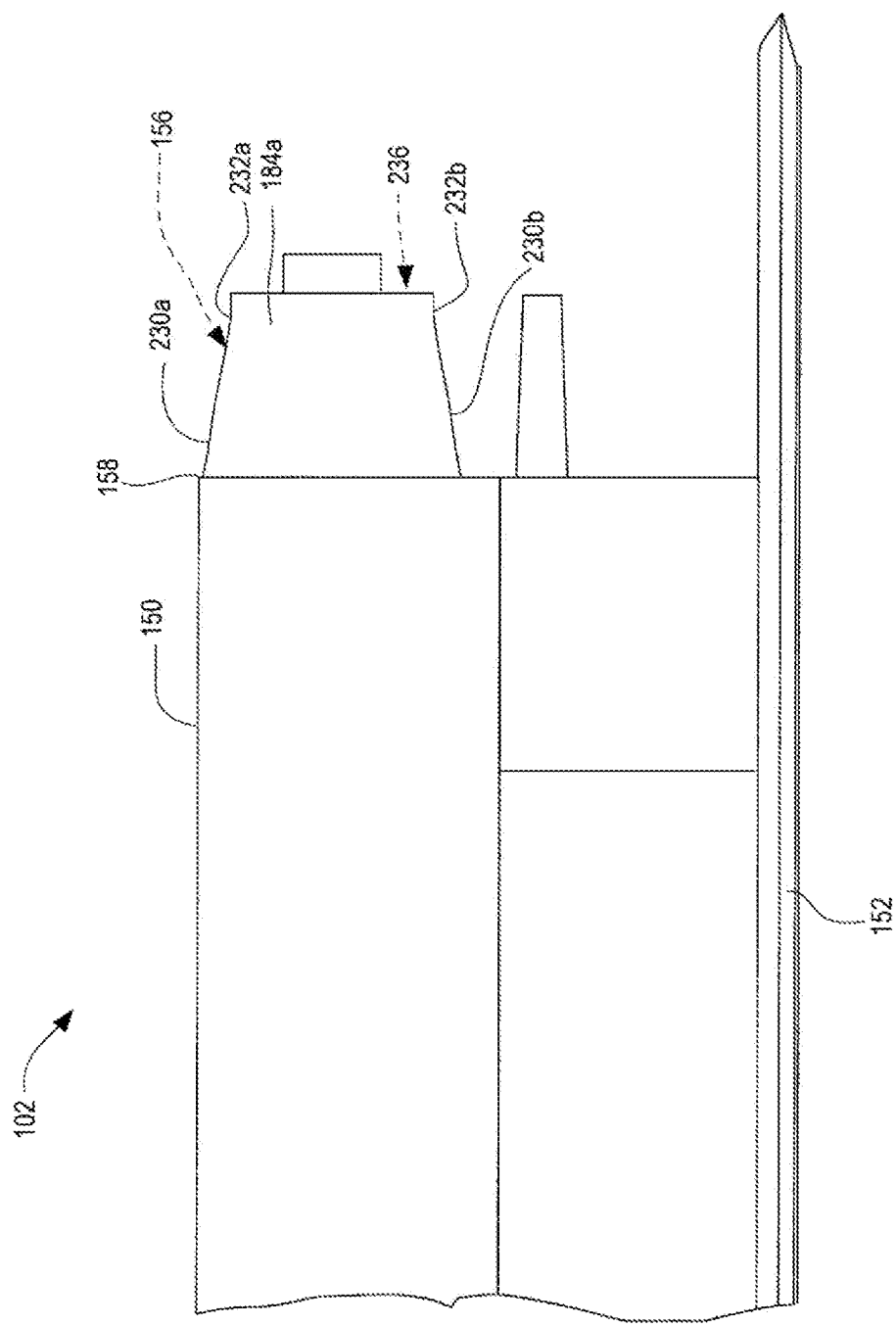
FIG. 37 is a side elevational view of the wedge-shaped coupling cavity entrance geometry of FIG. 35.
Figure 38:
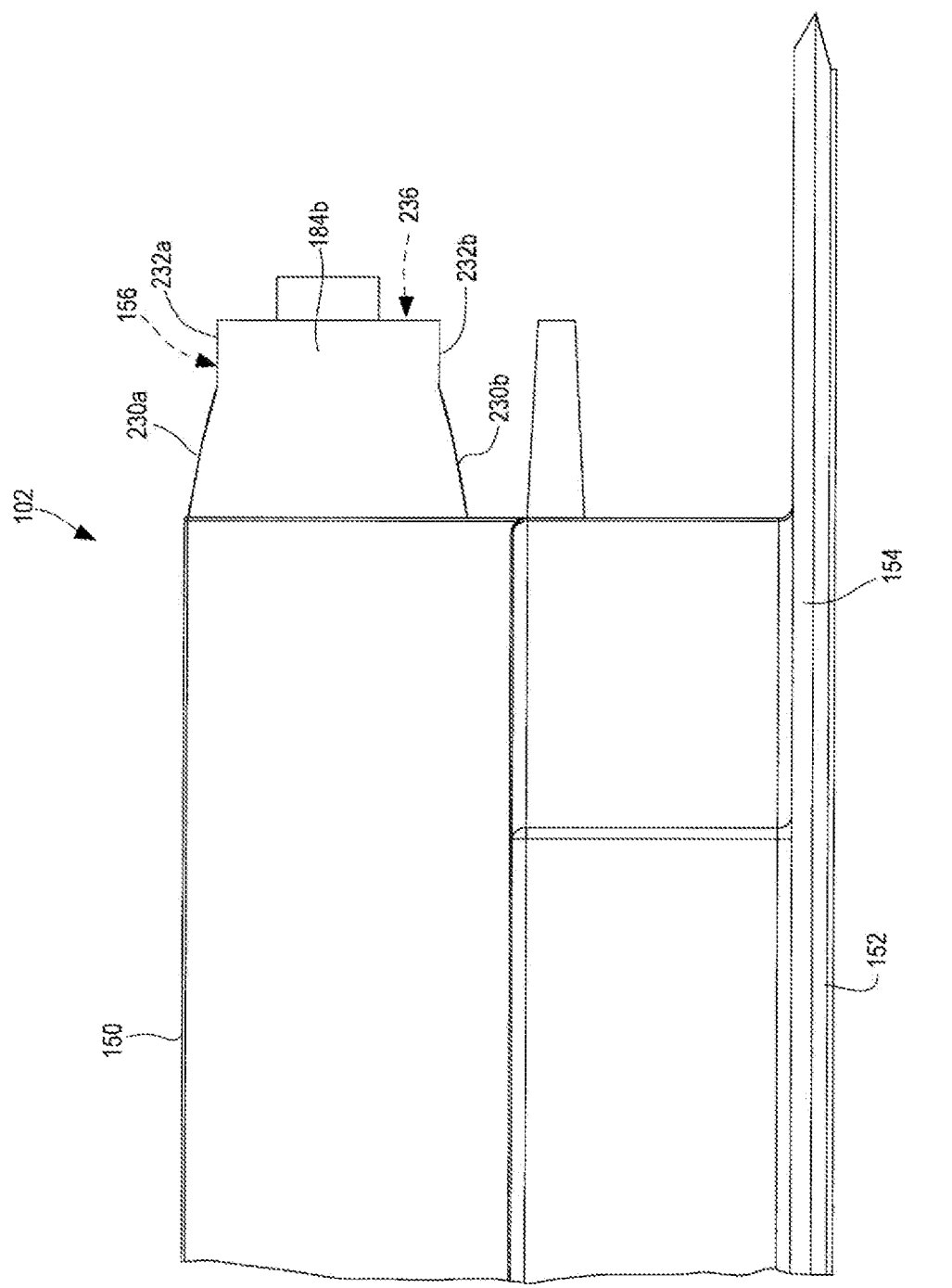
FIG. 38 is a side elevational view of the parabolic coupling cavity entrance geometry of FIG. 36.

Referring now to FIG. 35, an enlarged isometric view of the wedge-shaped coupling cavity entrance geometry of FIG. 25 is shown along with protrusions 184a, 184b for attaching and aligning the LED elements 136 and main holding member 180 to the waveguide body 102. Likewise, FIG. 36 shows an enlarged isometric view of the parabolic coupling cavity entrance geometry as previously seen in FIG. 24. FIGS. 37 and 38 show the wedge-shaped and parabolic coupling cavity entrance geometries, respectively. In FIGS. 35-38 the upper and lower surfaces 230a, 230b, 232a, 232b are shown. In both the wedge-shaped and parabolic coupling cavity entrance geometry embodiments, the upper and lower surfaces 230a, 230b, are tapered from where said surfaces meet the coupling end surface 158 to an end 236 of the coupling cavities 142 that meets the PCB 140 and LED elements 136. The upper and lower surfaces 230a, 230b are wider apart at the coupling end surface 158 and are tapered to be closer to one another at distances further therefrom until the upper and lower surfaces 230a, 230b are a height suitable for coupling to a column of LED elements as shown in FIG. 15.

As seen in FIG. 37 illustrating the wedge-shaped entrance geometry, the upper and lower surfaces 230a, 230b abut the upper and lower surfaces 232a, 232b near the end 236 of the coupling cavities 142. Further shown in FIG. 38, which illustrates the parabolic entrance geometry, the upper and lower surfaces 230a, 230b, also abut the upper and lower surfaces 232a, 232b near the end 236 of the coupling cavities 142. However, the upper and lower surfaces 232a, 232b are relatively larger in the parabolic entrance geometry embodiment of FIGS. 36 and 38, as compared with the corresponding upper and lower surfaces 232a, 232b of the wedge-shaped entrance geometry embodiment in FIGS. 35 and 37.

Figure 39:
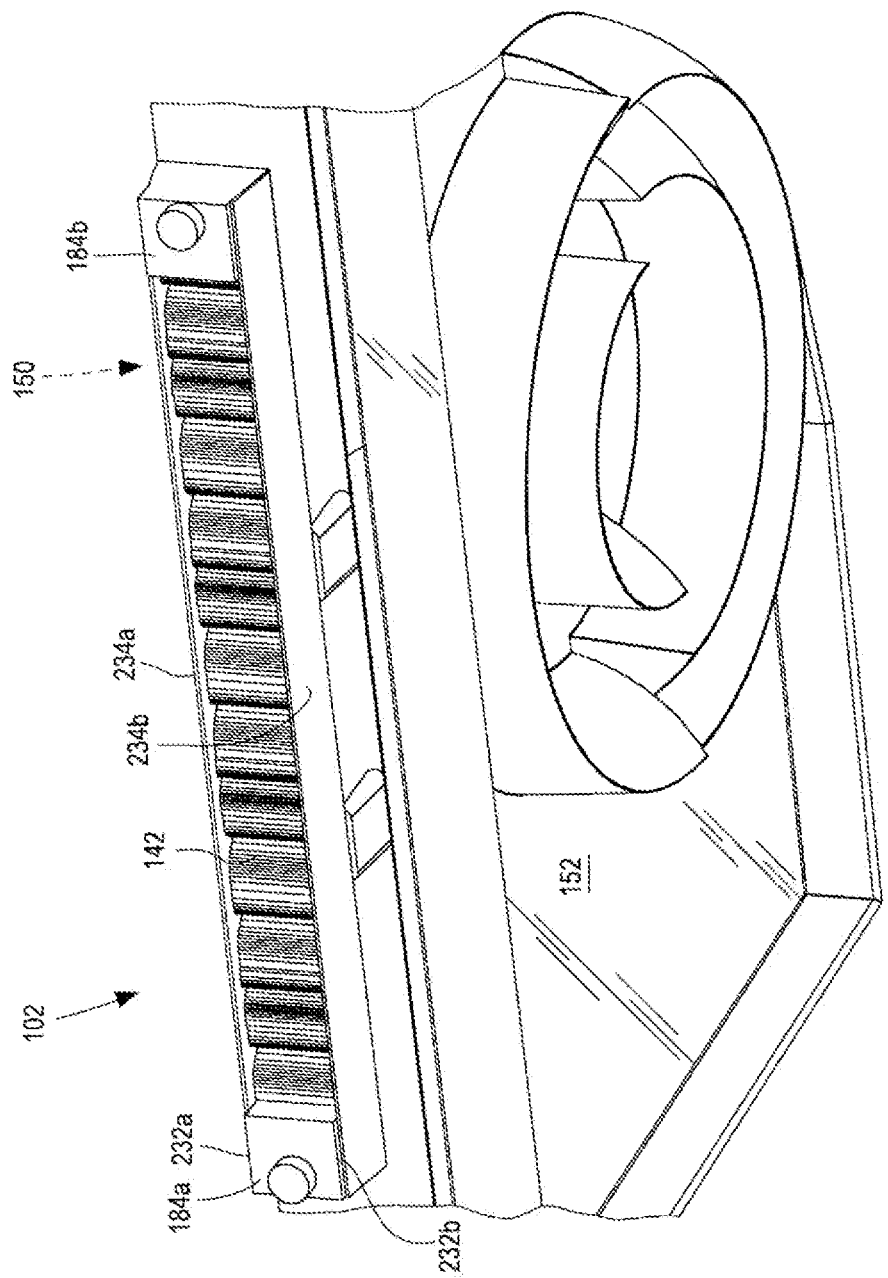
FIG. 39 is an enlarged, fragmentary, isometric view from above of a parabolic coupling cavity entrance geometry with reflective panels thereabout.
Figure 40:
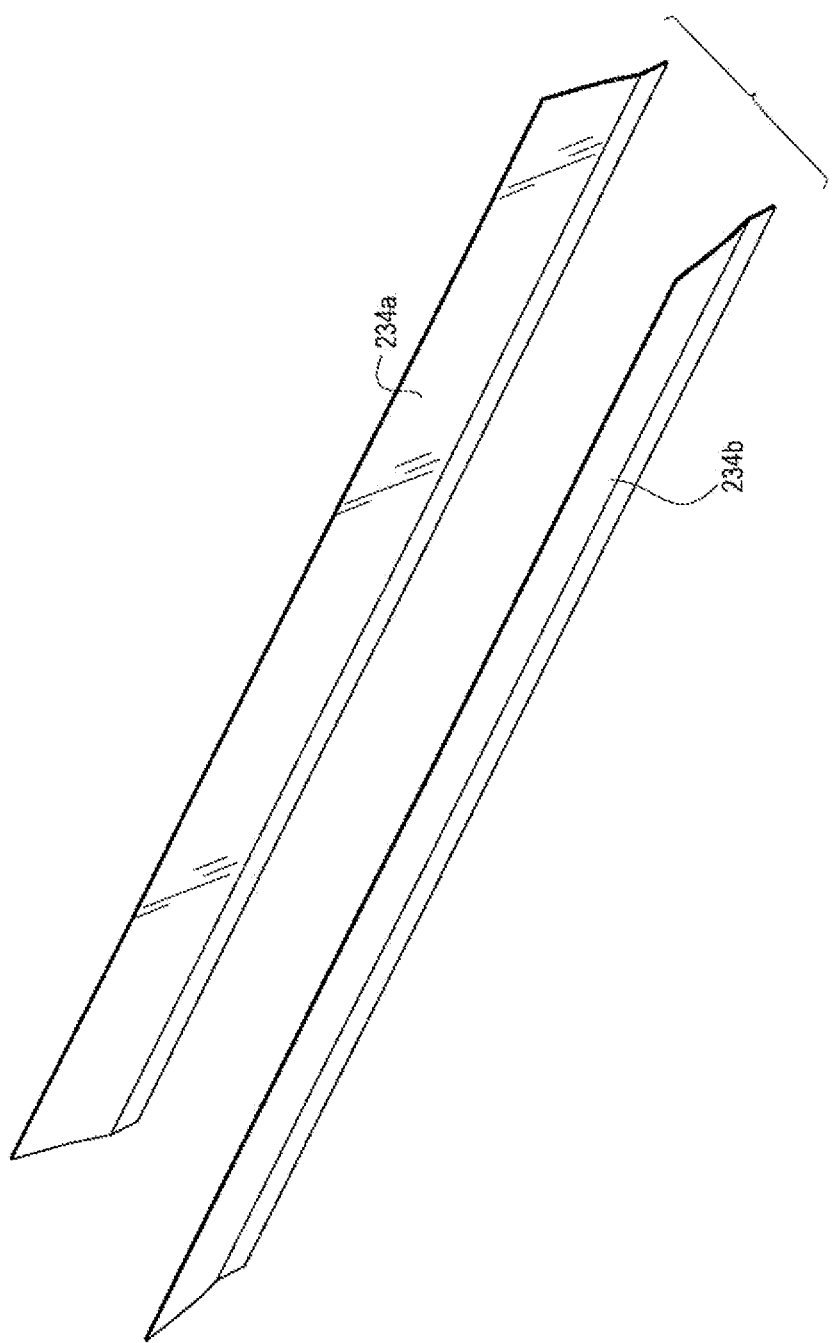
FIG. 40 is an isometric view of the reflective panels of FIG. 39.
Figure 41:
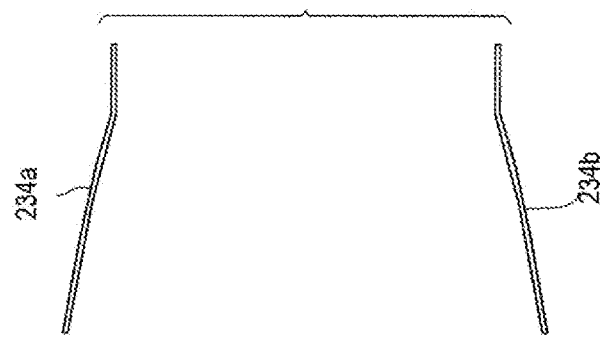
FIG. 41 is a side elevational view of the reflective panels of FIG. 39.
Figure 42:
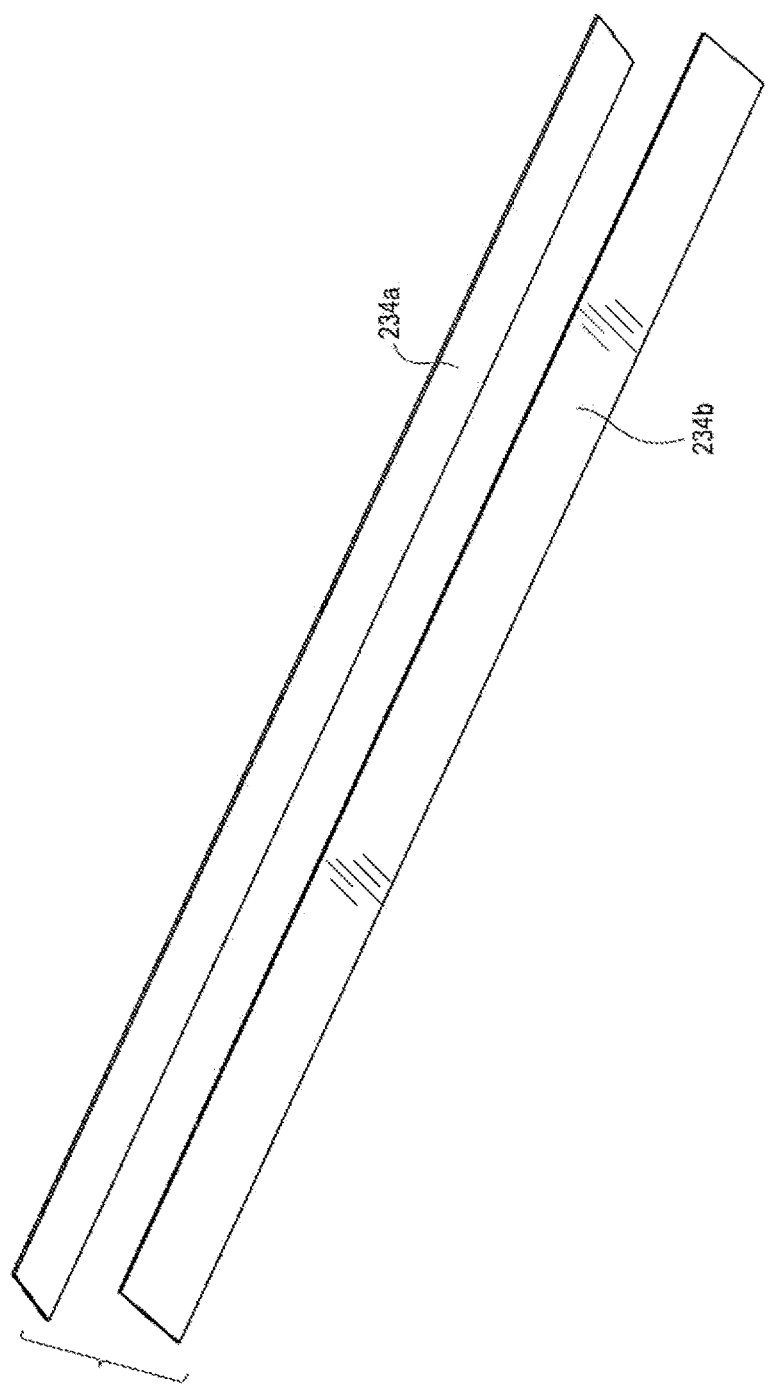
FIG. 42 is an isometric view of reflective panels for use with the wedge-shaped coupling cavity entrance geometry of FIG. 36.
Figure 43:
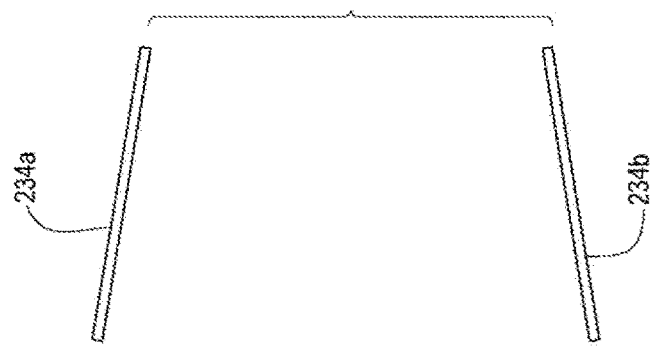
FIG. 43 is a side elevational view of the reflective panels of FIG. 42.

Referring now to FIG. 39, upper and lower reflective panels 234a, 234b may be arranged above and below the plurality of coupling cavities 142 along the upper and lower entrance geometry surfaces 230a, 230b. The reflective panels 234a, 234b assist in directing light from the LED elements 136 into the coupling cavities 142. FIGS. 39, 42, ad 43 show the reflective panels 234a, 234b utilized with the wedge-shaped entrance geometry. As illustrated, the reflective panels 234a, 234b for the wedge-shaped entrance geometry are substantially planar and may abut only the upper and lower wedge-shaped entrance geometry surfaces 230a, 230b without contacting the surfaces 232a, 232b. FIGS. 40 and 41 depict an embodiment of the reflective panels 234a, 234b for use with the parabolic entrance geometry. In this embodiment, each of the reflective panels 234a, 234b is configured such that the reflective panel 234a, 234b is bent or otherwise shaped to match the contour of the surfaces 230a, 230b as well as the surfaces 232a, 232b of the parabolic entrance geometry as seen in FIGS. 36 and 38.

Any number of any of the embodiments of the waveguide body 102 shown and described hereinabove may be utilized in the post top luminaries 300, 300a, 300b depicted in FIGS. 44-51 to produce an illumination pattern extending 360 degrees about the luminaire 300, 300a, 300b.

Figure 44:
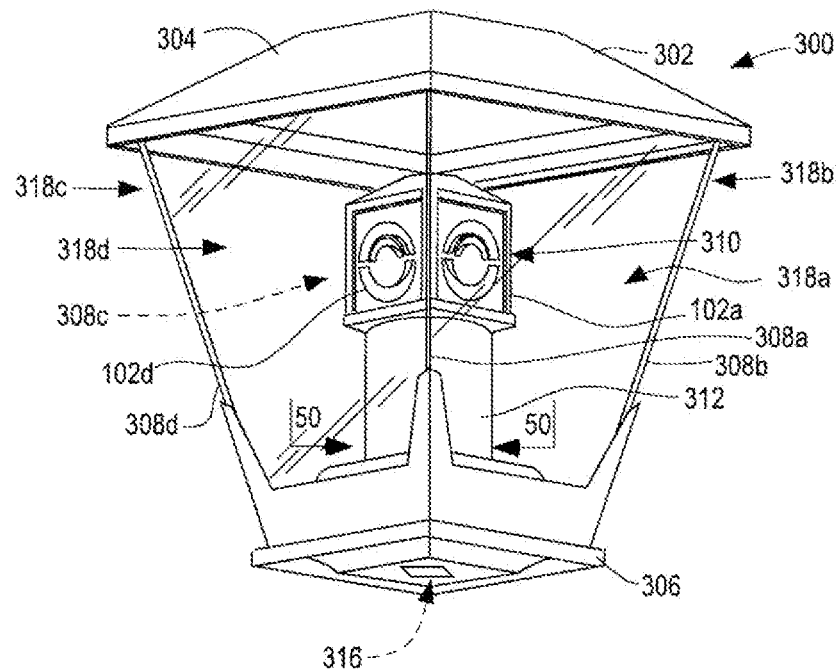
FIG. 44 is a side elevational view of a post top luminaire utilizing a waveguide body.
Figure 45:
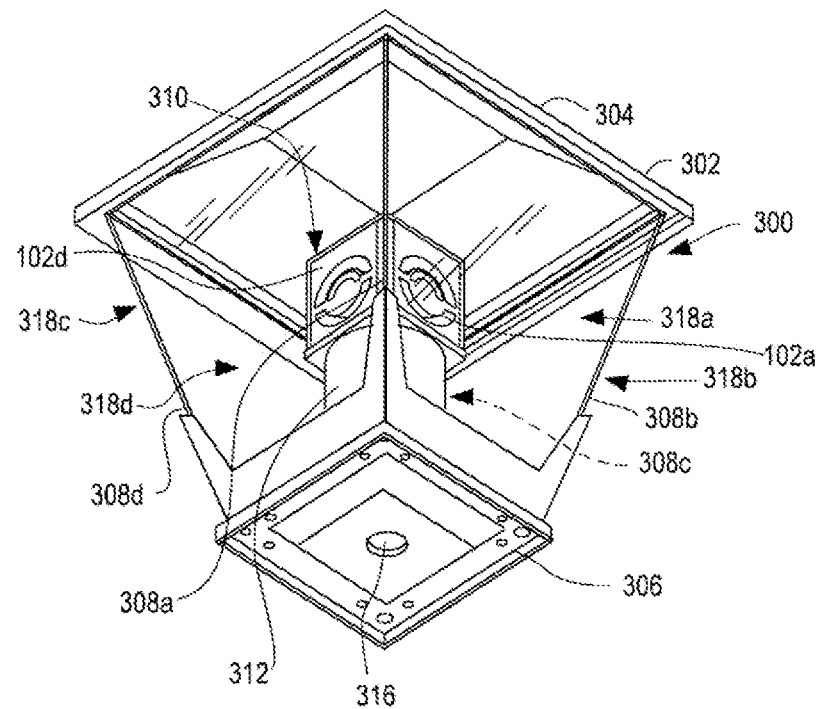
FIG. 45 is an isometric view from below of the post top luminaire of FIG. 44.

As seen in FIGS. 44 and 45, four waveguide bodies 102a-102d are arranged vertically in a square optical configuration 310 within a post top luminaire housing 302. The post top luminaire housing 302 includes a cover 304, a base 306, and at least four corner struts 308a-308d arranged therebetween. The struts, 308a-308d, the cover 304, and the base 306 together define four sides 318a-318d of the post top luminaire 300. The sides 318a-318b may have disposed therein a panel made of glass, plastic, or another suitable light transmissive material. The embodiment of the waveguide bodies 102a-102d utilized in the post top 302 are modified to remove segments of the outboard portion 186 and the interior transmission portion 206 as shown in FIGS. 44 and 45. Furthermore, the waveguide bodies 102a-102d are arranged vertically, and adjacent one another to form the square optical configuration 310 such that LED elements 136 may be coupled with the coupling cavities 142 thereof from either the top (nearer the cover 304) or bottom (nearer the base 306). In the embodiment of FIGS. 44 and 45 the bottom surface 152 as described hereinabove faces inward toward the center of the square optical configuration 310, while the previously described top surface 150 of each waveguide body 102a-102d faces out and away from the square optical configuration 310.

Referring still to FIGS. 44 and 45, the square optical configuration 310 is disposed on a circular cylindrical support post 312. The cylindrical support post 312 may contain operating circuitry 314 (see FIGS. 50 and 51) for powering the LED elements 136 or otherwise controlling the post top luminaire 300. Wiring or other access to a power source may pass through a hole 316 in the base 306 that leads into an interior of the cylindrical support post 312. The support post 312 may have an alternate shape, for example the support post 312 may be square in cross section. As described above, the light distribution provided by the waveguide bodies 102a-102d is symmetrical about 360 degrees in a Type 5 distribution pattern. Thus, the square optical configuration 310 shown in FIGS. 44 and 45 provides a distribution of light in all (or substantially all) directions from each side 318a-318d of the post top luminaire 300. However, in an alternate embodiment the waveguide bodies 102a-102d may develop a Type 3 light distribution pattern to provide additional downlight, or the waveguide bodies 102a-102d may develop a different symmetric or asymmetric light distribution individually or in combination. Utilizing the vertical configuration 310 of the four waveguide bodies 102a-102d, a Type 5 distribution may be created, on the whole, with a circular or square pattern by appropriately modifying the light redirection and reflection features 161 and/or the light refraction and extraction features 162 of the waveguide bodies 102a-102d, or through the inclusion of additional facets or features. In addition, Type 2, Type 3, or Type 4 distributions may be developed by omitting one of the four waveguide bodies 102a-102d and by adjusting the facets or features 161, 162 of the three retained waveguide bodies.

Figure 46:
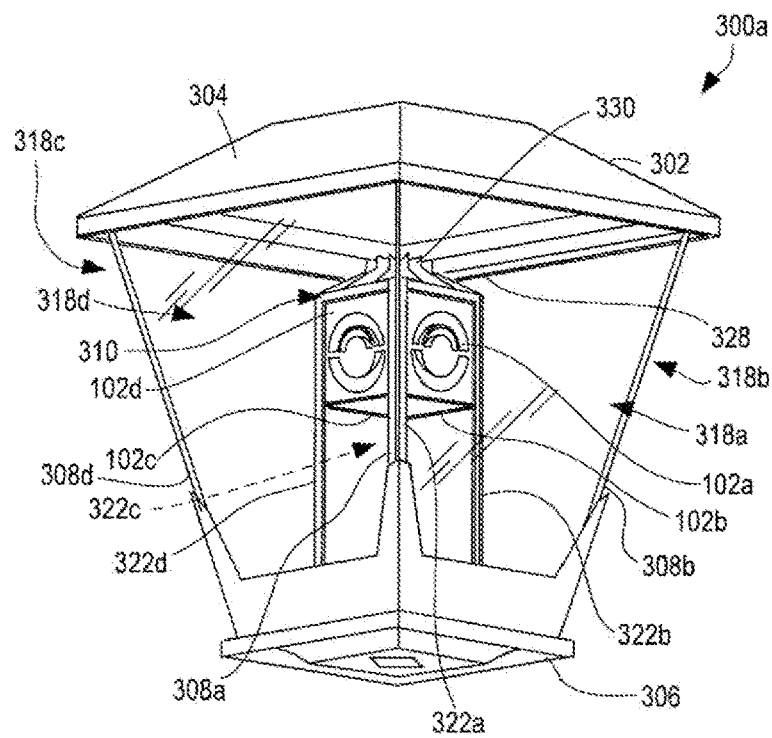
FIG. 46 is a side elevational view of an alternate embodiment of a post top luminaire utilizing a waveguide body.
Figure 47:
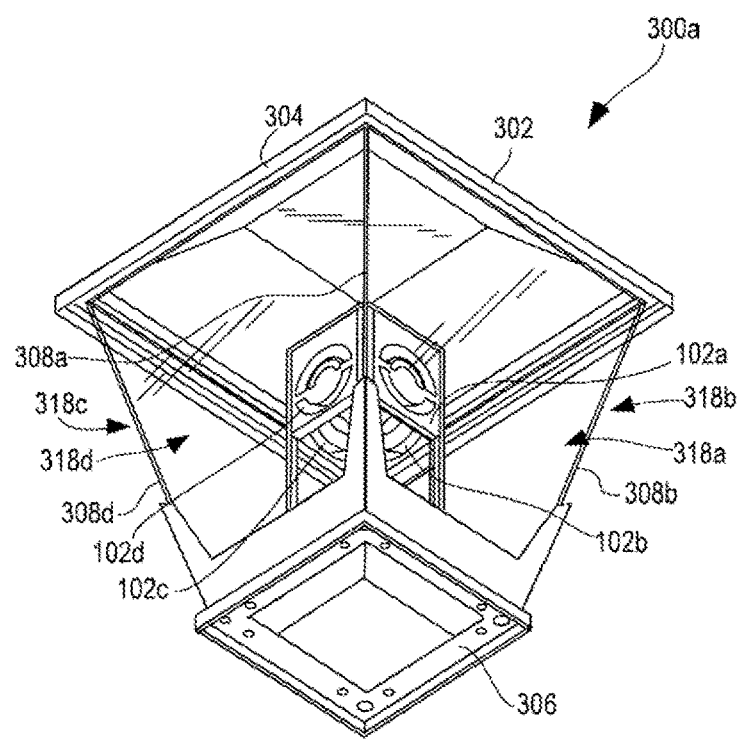
FIG. 47 is an isometric view from below of the alternate post top luminaire of FIG. 46.

Referring now to FIGS. 46 and 47, a luminaire 300a retains many of the features described with respect to the post top luminaire 300 of FIGS. 44 and 45. However, in this embodiment, the cylindrical support post 312 is replaced with four support members 322*a*-322*d*. Thus, the operating circuitry 314 is relocated into the cover 304. Furthermore, in the optical configuration 310*a* of FIGS. 46 and 47, the previously described bottom surface 152 of each of the waveguide bodies 102*a*-102*d* faces out and away from the optical configuration 310*a*, while the previously described top surface 150 of each of the waveguide bodies 102*a*-102*d* is oriented toward the interior of the square optical configuration 310*a*. Again, the optical configuration 310*a* provides a distribution of light in all directions and from each side 318*a*-318*d* of the post top luminaire 300*a*. A mounting section 328 operatively connects the square optical configuration 310*a* with the cover 304 and the operating circuitry 314 disposed therein. The mounting section 328 provides a heat sink function or is in thermal communication with a heat sink 330 arranged within the cover 304. The support members 322*a*-322*d* may also provide a heat sinking function for the square optical configuration 310*a*.

Figure 48:
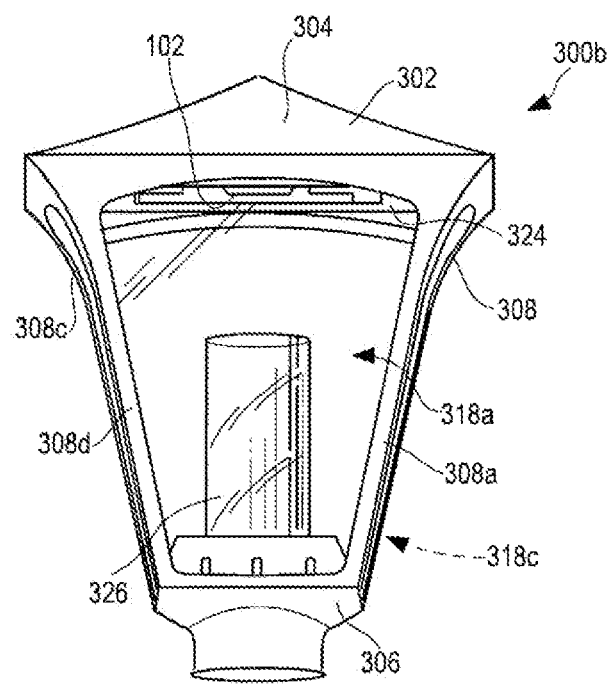
FIG. 48 is a side elevational view of an alternate embodiment of a post top luminaire utilizing the waveguide body of FIG. 11.
Figure 49:
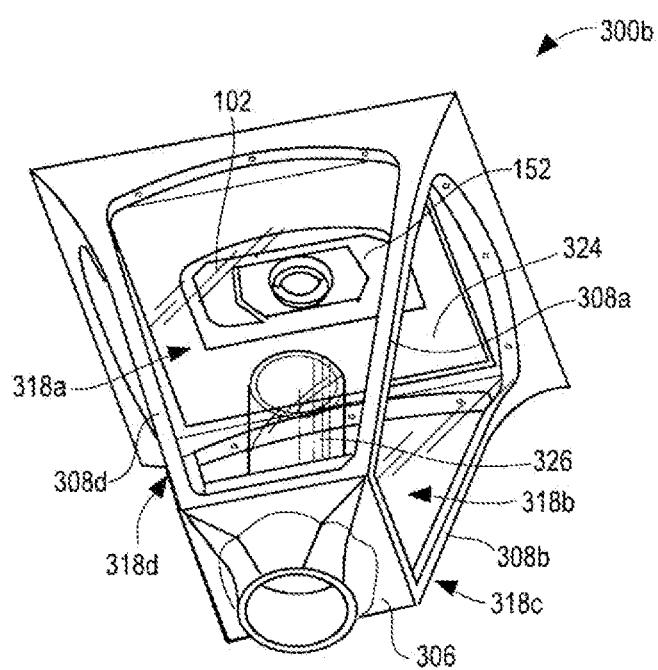
FIG. 49 is an isometric view from below of the alternate post top luminaire of FIG. 48.
Figure 50:
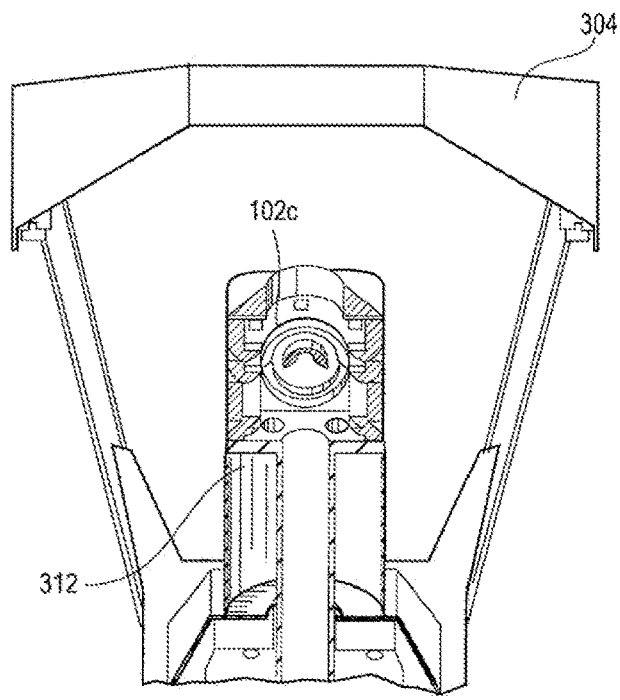
FIG. 50 is a cross-sectional view of the post top luminaire taken generally along the lines 50-50 indicated in FIG. 44.
Figure 51:
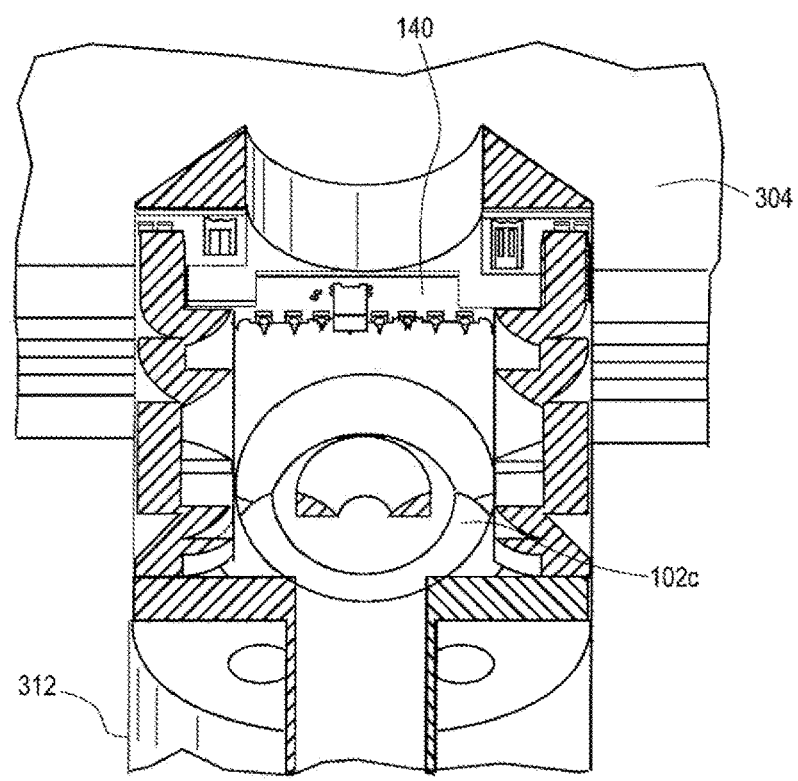
FIG. 51 is an enlarged, isometric view from below of the cross-sectional view shown in FIG. 50.

An alternate embodiment of the post top luminaire 300*b* is pictured in FIGS. 48 and 49. In this embodiment, the square optical configuration 310, 310*a* and the cylindrical support post 312 are omitted. Instead of four modified waveguide bodies 102*a*-102*d*, the optical waveguide body 102, as shown and described hereinabove for utilization in the luminaire 100, is disposed as a single waveguide within the cover 304. The waveguide body 102 is laterally arranged similar to the configuration thereof in the luminaire 100, such that the waveguide body 102 is horizontal with the bottom surface 152 facing downward toward the interior of the post top luminaire housing 302. The LED elements 136 are aligned with the coupling cavities 142 of the waveguide body 102 from one side thereof within the post top luminaire cover 304. The single waveguide body 102 is inserted in and retained by any suitable means within a lower surface 324 of the cover 304. The waveguide body 102 is proximal a center of the lower surface 204 of the cover 304, and is further arranged above, but spaced from a decorative lens 326. The operating circuitry 314 and a heatsink 330 are disposed above the waveguide body 102 within the cover 304. As with the luminaire 100, the post top luminaire 300*b* comprising the waveguide body 102 in a lateral configuration may develop a Type 5 light distribution that is emitted in 360 degrees through the four sides 318*a*-318*d* of the post top 314. This emission distribution may be facilitated by light redirected by the decorative lens. Alternatively, Type 2, Type 3, or Type 4 light distributions may also be created by modifying the refraction and extraction features 162 and/or the light redirection and reflection features 161 or other facets of the waveguide body 102 while maintaining the lateral configuration. In addition, by combining the lateral waveguide body 102 with a specially shaped decorative lens 326 in conjunction with reflection or scattering means associated with the decorative lens 326, various light distributions may be efficiently developed.

In some embodiments, the waveguide body includes a plurality of reflection and/or refraction features and a plurality of redirection features. In further embodiments, redirection and reflection features are disposed on or in a first surface of the waveguide and refraction and extraction features are disposed on or in a second surface of the waveguide opposite the first surface. Further still, the waveguide and luminaire dimensions are exemplary only, it being understood that one or more dimensions could be varied. For example, the dimensions can all be scaled together or separately to arrive at a larger or smaller waveguide body, if desired. While a uniform distribution of light may be desired in certain embodiments, other distributions of light may be contemplated and obtained using different sidewall surfaces of extraction/reflection/refraction features.

Other embodiments of the disclosure including all of the possible different and various combinations of the individual features of each of the foregoing embodiments and examples are specifically included herein. Any one of the light reflection features could be used in an embodiment, possibly in combination with any one of the light redirection features of any embodiment. Similarly, any one of the light redirection features could be used in an embodiment, possibly in combination with any one of the light reflection features of any embodiment. Thus, for example, a luminaire incorporating a waveguide of one of the disclosed shapes may include redirection and reflection features of the same or a different shape, and the redirection and reflection features may be symmetric or asymmetric, the luminaire may have combinations of features from each of the disclosed embodiments, etc. without departing from the scope of the invention.

The spacing, number, size, and geometry of refraction and extraction features 162 determine the mixing and distribution of light in the waveguide body 102 and light exiting therefrom. At least one (and perhaps more or all) of the refraction and extraction features 162 *r* any or all of the other extraction/refraction/redirection features disclosed herein may be continuous (i.e., the feature extends in a continuous manner), while any remaining extraction features may be continuous or discontinuous ridges or other structures (i.e., partial arcuate and/or non-arcuate features extending continuously or discontinuously) separated by intervening troughs or other structures.

If desired, inflections (e.g., continuous or discontinuous bends) or other surface features may be provided in any of the extraction features disclosed herein. Still further, for example, as seen in the illustrated embodiment of FIG. 11, all of the refraction and extraction features 162 may be symmetric with respect to the center line 172 of the waveguide body 102, although this need not be the case. Further, one or more of the redirection and reflection features 161 or refraction and extraction features 162 may have a texturing on the top surface 150 of the waveguide body 102, or the redirection features and reflection features may be smooth and polished. In any of the embodiments described herein, the top surface 150 of the waveguide body 102 may be textured in whole or in part, or the top surface 150 may be smooth or polished in whole or in part.

In addition to the foregoing, the waveguide body 102 and any other waveguide body disclosed herein may be tapered in an overall sense from the coupling end surface 158 to the end surface in that there is less material in the thickness dimension at the general location of the non-coupling front end surface than at portions adjacent the coupling cavities 142. Such tapering may be effectuated by providing extraction features and/or redirection features that become deeper and/or more widely separated with distance from the coupling cavities 142. The tapering maximizes the possibility that substantially all the light introduced into the waveguide body 102 is extracted over a single pass of the light therethrough. This results in substantially all of the light striking the outward directed surfaces of the redirection and reflection features 161, which surfaces are carefully controlled so that the extraction of light is also carefully controlled. The combination of tapering with the arrangement of redirection and reflection features 161 and refraction and extraction features 162 results in improved color mixing with minimum waveguide thickness and excellent control over the emitted light.

The driver circuit 118 may be adjustable either during assembly of the luminaire 100 or thereafter to limit/adjust electrical operating parameter(s) thereof, as necessary or desirable. For example, a programmable element of the driver circuit 118 may be programmed before or during assembly of the luminaire 100 or thereafter to determine the operational power output of the driver circuit 118 to one or more strings of LED elements 136. A different adjustment methodology/apparatus may be used to modify the operation of the luminaire 100 as desired.

In addition, an adjustable dimming control device may be provided inside the housing 104 and outside the reflective enclosure member 132 that houses the circuit board 140a. The adjustable control device may be interconnected with a NEMA ambient light sensor and/or dimming leads of the driver circuit and may control the driver circuit 118. The adjustable dimming control device may include a resistive network and a wiper that is movable to various points in the resistive network. An installer or user may operate (i.e., turn) an adjustment knob or another adjustment apparatus of the control device operatively connected to the wiper to a position that causes the resistive network to develop a signal that commands the output brightness of the luminaire 100 to be limited to no more than a particular level or magnitude, even if the sensor is commanding a luminaire brightness greater than the limited level or magnitude.

If necessary or desirable, the volume of the reflective enclosure member 132 may be increased or decreased to properly accommodate the driver circuit 118 and to permit the driver circuit to operate with adequate cooling. The details of the parts forming the reflective enclosure member 130 may be varied as desired to minimize material while providing adequate strength.

Further, any of the embodiments disclosed herein may include a power circuit having a buck regulator, a boost regulator, a buck-boost regulator, a SEPIC power supply, or the like, and may comprise a driver circuit as disclosed in U.S. patent application Ser. No. 14/291,829, filed May 30, 2014, or U.S. patent application Ser. No. 14/292,001, filed May 30, 2014, incorporated by reference herein. The circuit may further be used with light control circuitry that controls color temperature of any of the embodiments disclosed herein in accordance with user input such as disclosed in U.S. patent application Ser. No. 14/292,286, filed May 30, 2014, incorporated by reference herein.

Any of the embodiments disclosed herein may include one or more communication components forming a part of the light control circuitry, such as an RF antenna that senses RF energy. The communication components may be included, for example, to allow the luminaire to communicate with other luminaries and/or with an external wireless controller, such as disclosed in U.S. patent application Ser. No. 13/782,040, filed Mar. 1, 2013, or U.S. Provisional Application Ser. No. 61/932,058, filed Jan. 27, 2014, the disclosures of which are incorporated by reference herein. More generally, the control circuitry includes at least one of a network component, an RF component, a control component, and a sensor. The sensor, such as a knob-shaped sensor, may provide an indication of ambient lighting levels thereto and/or occupancy within the room or illuminated area. Such sensor may be integrated into the light control circuitry.

As noted above, any of the embodiments disclosed herein can be used in many different applications, for example, a parking lot light, a roadway light, a light that produces a wall washing effect, a light usable in a large structure, such as a warehouse, an arena, a downlight, etc. A luminaire as disclosed herein is particularly adapted to develop high intensity light greater than 1000 lumens, and more particularly greater than 10,000 lumens, and can even be configured to develop 35,000 or more lumens by adding LED elements and, possibly, other similar, identical or different waveguide bodies with associated LEDs in a luminaire.

Further, any LED chip arrangement and/or orientation as disclosed in U.S. patent application Ser. No. 14/101,147, filed Dec. 9, 2013, incorporated by reference herein and owned by the assignee of the present application, may be used in the devices disclosed herein. Where two LED elements are used in each light coupling cavity (as in the illustrated embodiments), it may be desired to position the LEDs elements within or adjacent the coupling cavity along a common vertical axis or the LED elements may have different angular orientations, as desired. The orientation, arrangement, and position of the LEDs may be different or identical in each waveguide body section of a waveguide as desired. Still further, each light coupling cavity may be cylindrical or non-cylindrical and may have a substantially flat shape, a segmented shape, an inclined shape to direct light out a particular side of the waveguide body, etc.

Figure 52:
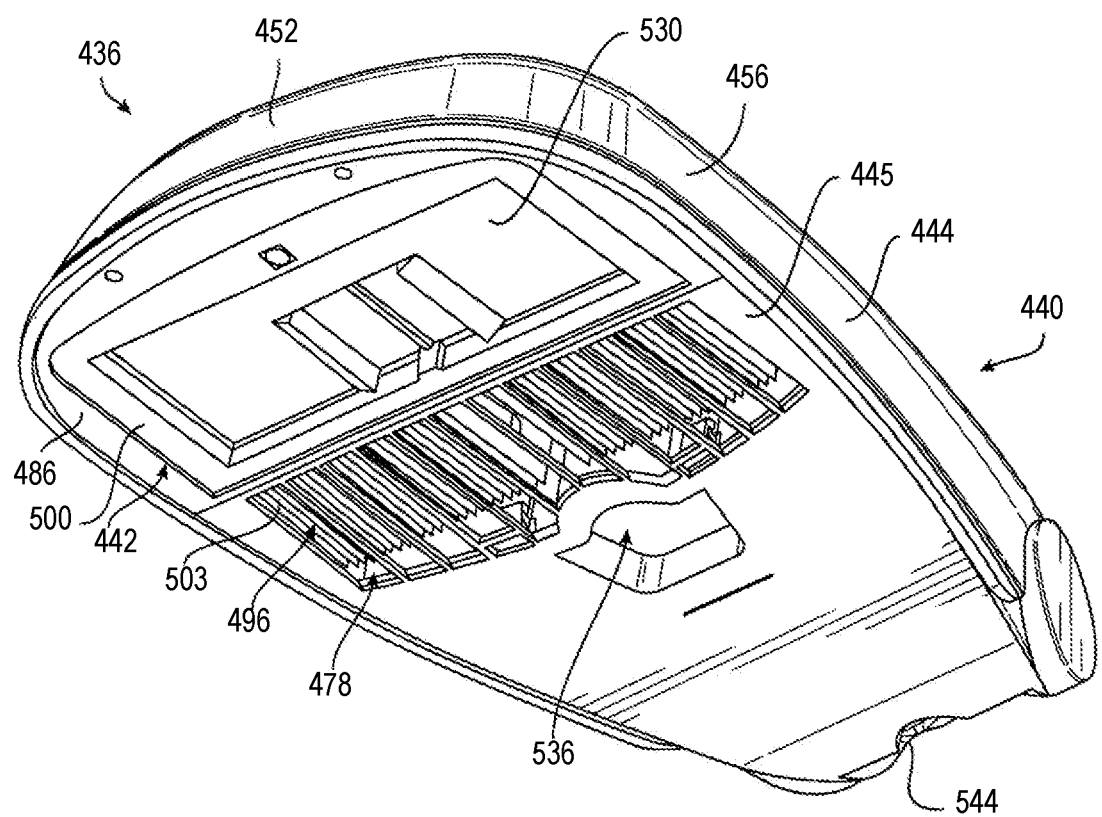
FIG. 52 is a bottom perspective view of an embodiment of a lighting device.
Figure 53:
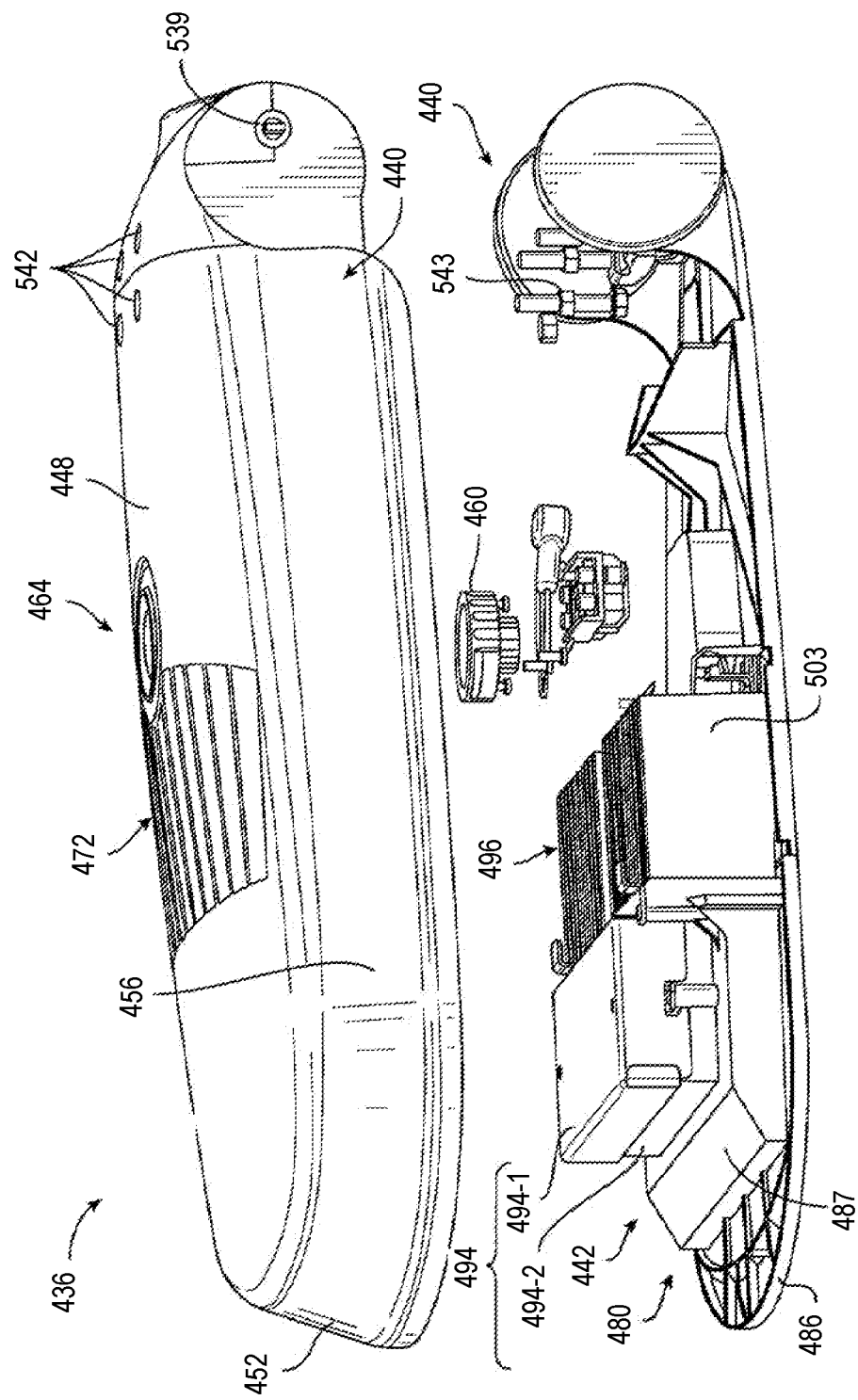
FIGS. 53 and 54 are exploded views of the lighting device of FIG. 52.
Figure 54:
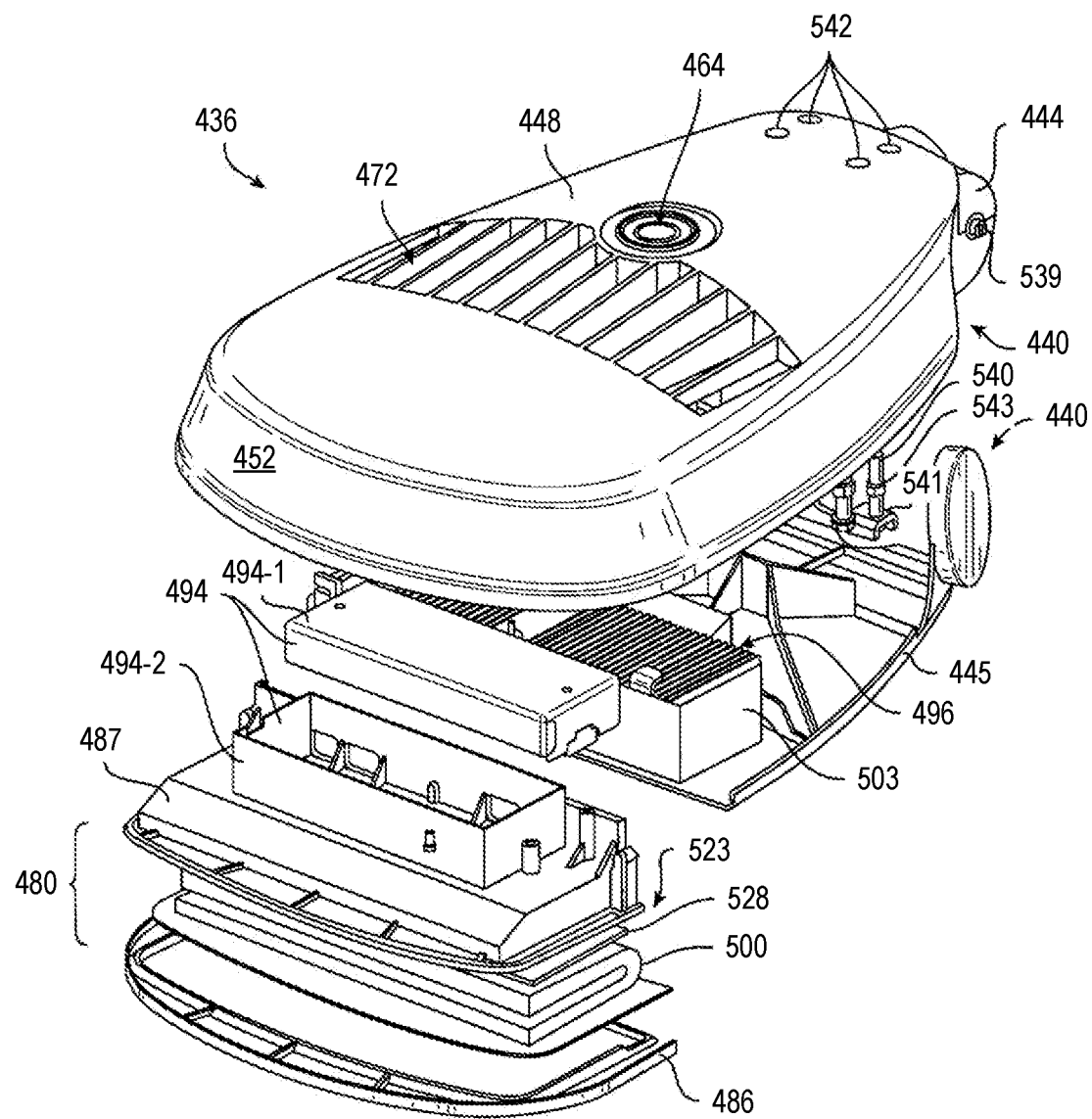

FIGS. 52 through 54 show an embodiment of the waveguide of the invention in an example embodiment of a lighting device 436. While one embodiment of a lighting device is shown and described with reference to FIGS. 52 through 54, lighting devices using the waveguides as disclosed herein may take many other forms and may be used in lighting applications other than as specifically shown and described herein. The lighting device shown and described herein is for explanatory purposes and is not intended to limit the applicability of the waveguides as disclosed herein. Lighting device 436 is suitable for outdoor applications such as in a parking lot or roadway and is capable of being mounted on a stanchion, pole or other support structure. Lighting devices that take advantage of the waveguides disclosed herein may take many other forms.

As shown in FIGS. 52 through 54, the lighting device 436 comprises a housing 440 and a head assembly 442. The housing 440 comprises a top housing portion 444 and a bottom housing portion 445. The top housing portion 444 comprises a top surface 448, a front wall 452, and side walls 456. A communication component 460 such as an RF antenna that senses RF energy, a light sensor or the like may be disposed in a receptacle 464 in the housing 440. The communication component may be located at any suitable position on the lighting device and more than one communication component may be used. An upper convection opening 472 is disposed in the top housing portion 444. The bottom housing portion 445 comprises a lower convection opening 478 disposed below the upper convection opening 472.

The head assembly 442 is at least partially enclosed by the housing 440 and comprises an optical assembly 480. The optical assembly 480 comprises a waveguide 500, a light source 523, a lower frame member 486 partially surrounding the waveguide 500 and forming a barrier between the waveguide 500 and the housing 440, and an upper frame member 487 disposed above the optical waveguide 500. The light source 523 comprises a plurality of LEDs 525 (FIG. 55) supported on an LED board 528 and disposed adjacent the waveguide 500 to direct light into the waveguide 500. The head assembly 442 further comprises a driver housing 494 that contains the LED driver circuit and other lamp electronics 522 (FIG. 55) to drive LEDs 525. A reflective bottom surface of the upper frame member 487 may be disposed adjacent one or more exterior surfaces of the optical waveguide 500.

The LED driver circuit and other lamp electronics 522 may be disposed in the driver housing 494, which is disposed proximal to the LEDs 525 on LED board 528. The driver housing 494 may comprise an upper portion 494-1 and a lower portion 494-2. The upper portion 494-1 forms a top cover of the driver housing 494. Part of the driver housing 494 may be made of a metal capable of efficient heat transfer.

A heat exchanger 496 is included in the housing 440. The heat exchanger 496 may comprise a plurality of fins 503. The fins 503 transfer heat at least by convection through the upper and lower convection openings 472 and 478. The heat exchanger 496 is in thermal communication (via conduction, convection, and/or radiation) with the LEDs 525, LED board 528 and the LED driver circuit and other lamp electronics 522. One or more thermally conductive LED boards 528, such as printed circuit boards (PCBs), receive and mount the LEDs 525 and conduct heat therefrom. The LED boards 528 are preferably made of one or more materials that efficiently conduct heat and are disposed in thermal communication with the heat exchanger 496. Alternative paths may be present for heat transfer between the LED driver circuit and other lamp electronics 522, the LEDs 525, the LED board 528 and the heat exchanger 496, such as a combination of conduction, convection, and/or radiation. In the illustrated embodiments, the upper and lower convection openings 472 and 478 are disposed above and below the heat exchanger 496, respectively, thus providing for efficient heat transfer via a direct vertical path of convection flow.

Figure 55:
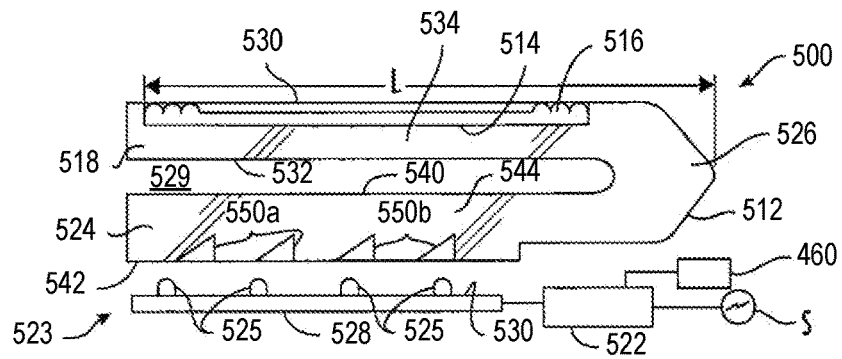
FIG. 55 is a side section view of an embodiment of a waveguide.

The bottom housing portion 445 may be opened by exerting a downward force on handle 536 to disconnect mating snap-fit connectors on the bottom housing portion 445 and the top housing portion 444. Also, as a result of the downward force, the bottom housing portion 445 rotates about pins 539 such that a front portion of the bottom housing portion 445 pivots downward, thus allowing access to the interior of the housing 440. In one embodiment, the lighting device 436 may be placed onto a stanchion such that an end of the stanchion extends through a mounting aperture 544. Fasteners 540, 543 engage fastener bores 542 to secure the stanchion to the housing. Many other mechanisms for supporting a light fixture may also be used. Electrical connections may be made from a power source S to the LED driver circuit and other lamp electronics 522 to power the LEDs 525 (FIG. 55).

Each LED 525 may be a single white LED or multiple white LEDs or each may comprise multiple LEDs either mounted separately or together on a single substrate or package including a phosphor-coated LED either alone or in combination with a color LED, such as a green LED, etc. Details of suitable arrangements of the LEDs and lamp electronics for use in the light fixture are disclosed in U.S. Pat. No. 9,786,639, issued Oct. 10, 2017, which is incorporated by reference herein in its entirety. In other embodiments, all similarly colored LEDs may be used where for example all warm white LEDs or all cool white LEDs may be used where all of the LEDs emit at a similar color point. In such an embodiment all of the LEDs are intended to emit at a similar targeted wavelength; however, in practice there may be some variation in the emitted color of each of the LEDs such that the LEDs may be selected such that light emitted by the LEDs is balanced such that the lighting device 436 emits light at the desired color point. In the embodiments disclosed herein, various combinations of LEDs of similar and different colors may be selected to achieve a desired color point. Each LED element or module may be a single white or other color LED chip or other bare component, or each may comprise multiple LEDs either mounted separately or together on a single substrate or package to form a module including, for example, at least one phosphor-coated LED either alone or in combination with at least one color LED, such as a green LED, a yellow LED, a red LED, etc. In those cases where a soft white illumination is to be produced, each LED 525 typically may include one or more blue shifted yellow LEDs and one or more red LEDs. The LEDs may be disposed in different configurations and/or layouts as desired. Different color temperatures and appearances may be produced using other LED combinations, as is known in the art. In one embodiment, the light source 523 comprises any LED, for example, an MT-G LED module incorporating TrueWhite® LED technology or as disclosed in U.S. Pat. No. 9,818,919, issued to Lowes et al. on Nov. 14, 2017, the disclosure of which is hereby incorporated by reference herein in its entirety. In any of the embodiments disclosed herein the LEDs 525 may have a Lambertian light distribution, although each may have a directional emission distribution (e.g., a side emitting distribution), as necessary or desirable. More generally, any Lambertian, symmetric, wide angle, preferential-sided, or asymmetric beam pattern LED(s) may be used as the light source. Various types of LEDs may be used, including LEDs having primary optics as well as bare LED chips. The LEDs 525 may be disposed in different configurations and/or layouts as desired. Different color temperatures and appearances could be produced using other LED combinations, as is known in the art. For example, a side emitting LED disclosed in U.S. Pat. No. 8,541,795, the disclosure of which is incorporated by reference herein, may be utilized. Still further, any of the LED arrangements and optical elements disclosed in U.S. Pat. No. 9,869,432, filed Dec. 9, 2013, which is hereby incorporated by reference herein, may be used.

Referring to FIGS. 55 through 58, the LEDs 525 are shown mounted on a substrate or LED board 528. The LED board 528 may be any appropriate board, such as a PCB, flexible circuit board, metal core circuit board or the like with the LEDs 525 mounted and electrically interconnected thereon. The LED board 528 can include the electronics and interconnections necessary to deliver power to the LEDs 525. The LED board 528 may provide the physical support for the LEDs 525 and may form part of the electrical path to the LEDs 525 for delivering current to the LEDs 525. If desired, a surface 530 of LED board 528 may be covered or coated by a reflective material, which may be a white material or a material that exhibits specular reflective characteristics. The LED board 528 is secured in fixed relation to the waveguide 500 in any suitable fashion such that the LEDs 525 are disposed opposite to the light coupling portion 524 as will be described.

The LEDs 525 emit light when energized through the electrical path. The term "electrical path" is used to refer to the entire electrical path to the LEDs 525, including an intervening driver circuit and other lamp electronics 522 in the lighting device disposed between the source of electrical power S and the LEDs 525. Electrical conductors (not shown) run between the LEDs 525, the driver circuit and other lamp electronics 522 and the source of electrical power S, such as an electrical grid, to provide critical current to the LEDs 525. The driver circuit and other lamp electronics 522 may be located remotely in driver housing 494, the driver circuit and other lamp electronics 522 may be disposed on the LED board 528 or a portion of the driver circuit and other lamp electronics 522 may be disposed on the LED board 528 and the remainder of the driver circuit and other lamp electronics 522 may be remotely located. The driver circuit and other lamp electronics 522 are electrically coupled to the LED board 528 and are in the electrical path to the LEDs 525. LED lighting systems can work with a variety of different types of power supplies or drivers. For example, a buck converter, boost converter, buck-boost converter, or single ended primary inductor converter (SEPIC) could all be used as driver or a portion of a driver for an LED lighting device or solid-state lamp. The driver circuit may rectify high voltage AC current to low voltage DC current and regulate current flow to the LEDs. The power source S can be a battery or, more typically, an AC source such as the utility mains. The driver circuit is designed to operate the LEDs 525 with AC or DC power in a desired fashion to produce light of a desired intensity and appearance. The driver circuit may comprise a driver circuit as disclosed in U.S. Pat. No. 9,791,110 issued on Oct. 17, 2017, or U.S. Pat. No. 9,303,823, issued Apr. 5, 2016, both of which are hereby incorporated by reference herein. The driver circuit may further be used with light control circuitry that controls color temperature of any of the embodiments disclosed herein in accordance with user input such as disclosed in U.S. patent application Ser. No. 14/292,286, filed May 30, 2014, which is hereby incorporated by reference herein. Preferably, the light source 523 develops light appropriate for general illumination purposes.

The light emitted by the LEDs 525 is delivered to waveguide 500 for further treatment and distribution of the light as will be described in detail. The waveguide 500 may be used to mix the light emitted by the LEDs 525 and to emit the light in a directional or omnidirectional manner to produce a desired luminance pattern.

Further, any of the embodiments disclosed herein may include one or more communication components 460 forming a part of the light control circuitry, such as an RF antenna that senses RF energy or a light sensor. The communication components may be included, for example, to allow the luminaire to communicate with other luminaires and/or with an external controller such as a wireless remote control. More generally, the control circuitry includes at least one of a network component, an RF component, a control component, and a sensor. The sensor may provide an indication of ambient lighting levels thereto and/or occupancy within the illuminated area. The communication components such as a sensor, RF components or the like may be mounted as part of the housing or lens assembly. Such a sensor may be integrated into the light control circuitry. The communication components may be connected to the lighting device via a 7-pin NEMA photocell receptacle or other connection. In various embodiments described herein various smart technologies may be incorporated in the lamps as described in the following disclosures: U.S. Pat. No. 8,736,186, issued May 27, 2014, U.S. Pat. No. 9,572,226, issued Feb. 14, 2017, U.S. Pat. No. 9,155,165, issued Oct. 6, 2015, U.S. Pat. No. 8,975,827, issued Mar. 1, 2013, U.S. Pat. No. 9,155,166, issued Oct. 6, 2015, U.S. Pat. No. 9,433,061, issued Aug. 30, 2016, U.S. Pat. No. 8,829,821, issued Sep. 9, 2014, U.S. Pat. No. 8,912,735, issued Dec. 16, 2014, U.S. patent application Ser. No. 13/838,398, filed Mar. 15, 2013, U.S. Pat. No. 9,622,321, issued Apr. 11, 2017, U.S. Patent Application Ser. No. 61/932,058, filed Jan. 27, 2014, the disclosures of which are incorporated by reference herein in their entirety. Additionally, any of the light fixtures described herein can include the smart lighting control technologies disclosed in U.S. Patent Application Ser. No. 2017/02310668, filed on Jun. 24, 2016, which is incorporated by reference herein in its entirety.

The lighting device 436 of FIGS. 52 through 54 is an embodiment of a solid-state lighting device suitable for use in outdoor applications; however, the system of the invention may be used in any solid-state lighting device. Moreover, while an embodiment of a lighting device is shown and described, the waveguides as disclosed herein may be used in any solid-state lighting device including lamps, luminaires, troffer-style lights, outdoor lighting or the like. The LEDs, waveguide, power circuit and other components may be housed in any suitable housing. The lighting devices described herein may be used for any suitable application in any environment such as interior lighting or exterior lighting. The lighting device may be used as a troffer luminaire, suspended luminaire, recessed lighting, street/roadway lighting, parking garage lighting or the like. The housing may be configured for the particular application and the light emitting portion of the waveguide may provide any suitable illumination pattern. Moreover, the number and type of LEDs used, and the total lumen output, color and other characteristics of the lighting device may be adjusted for the particular application.

In different lighting applications, the footprint of the waveguide is limited by the size constraints of the housing containing the waveguide and other lighting device components. For example, some lighting devices are built to fit predetermined standardized sizes. In other applications, such as streetlights, the size of the lighting device is limited by factors such as IP ratings, wind loading, and fixture weight. In other applications the size of the lighting device is limited by custom, aesthetic considerations, architectural considerations, or the like. In a typical LED based lighting device, the light output of the lighting device is dictated by the size and number of the LEDs and the power at which the LEDs are operated; however, the greater the number of LEDs and the higher power at which the LEDs are operated, the greater the heat generated by the LEDs. In traditional waveguides, LEDs run at high power concentrate thermal and photonic energy into a small input coupling region of the waveguide, e.g., the edge of an edge lit waveguide. Because heat has a deleterious effect on LED output and life and can adversely affect other components, such as the waveguide, the lumen power density of the LEDs at the input coupling region is limited, thereby limiting the output of the lighting device. While increasing the coupling area may reduce lumen power density, the constraints on increasing the footprint of the lighting device, and therefore the waveguide, limits the expansion of the footprint of the waveguide to an extent necessary to lower the lumen power density. As a result, existing waveguide designs are limited in lumen output by the lumen power densities. Existing lighting devices also may require extensive heat exchanger mechanisms to prevent overheating of the system components. The waveguides disclosed herein reduce the lumen power density at the LED/waveguide coupling interface to substantially reduce overheating without significantly increasing the footprint of the waveguide.

Referring again to FIGS. 55 through 59, the waveguide 500 comprises a waveguide body 512 that includes a light emitting portion 518, a light coupling portion 524, and a light transmission portion 526. The light emitting portion 518 includes a plurality of light extraction features 516 that extract light out of the waveguide body 512. The light coupling portion 524 is disposed adjacent to, and receives light emitted by, the light source 523 and directs light into the waveguide body 512. The light transmission portion 526 optically couples the light emitting portion 518 to the light coupling portion 524 such that light introduced into the light coupling portion 524 is transmitted to the light emitting portion 518.

Figure 56:
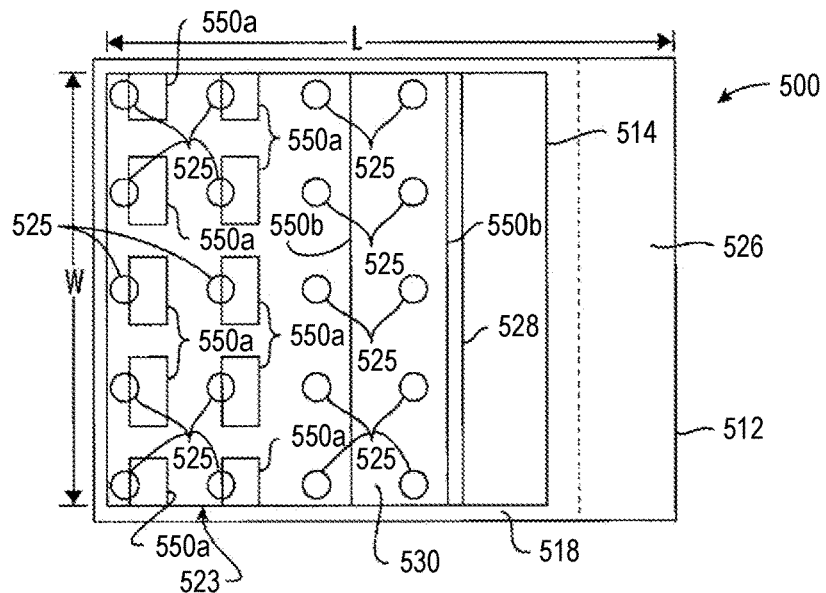
FIG. 56 is a top view of the waveguide of FIG. 55.
Figure 57:
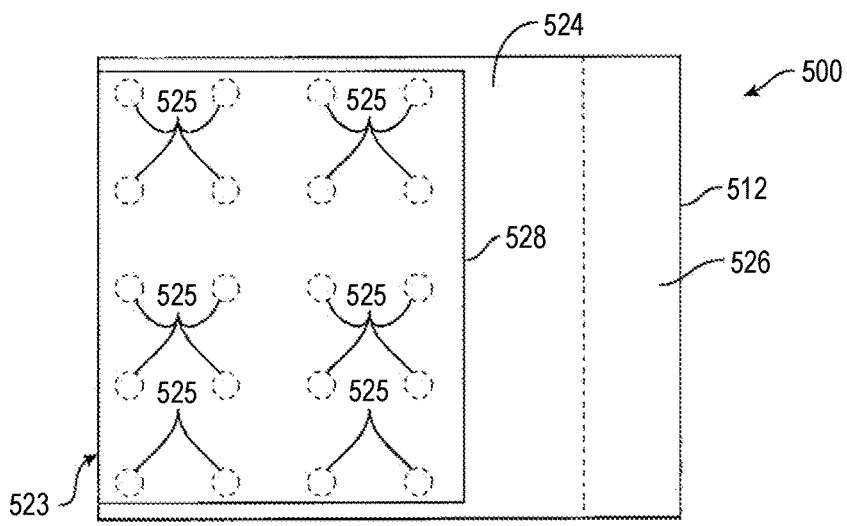
FIG. 57 is a bottom view of the waveguide of FIG. 55.
Figure 58:
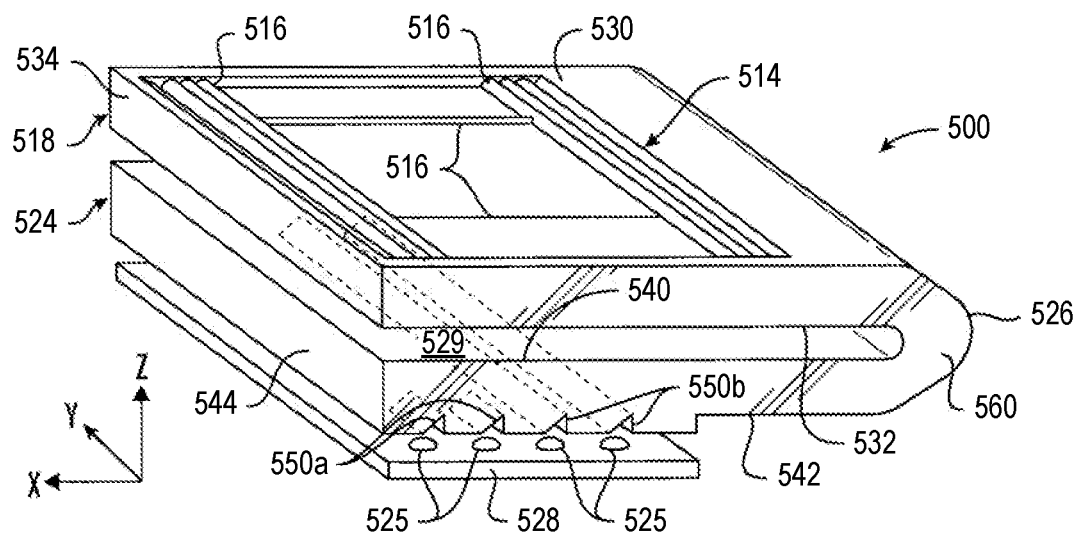
FIG. 58 is a first perspective view of the waveguide of FIG. 55.
Figure 59:
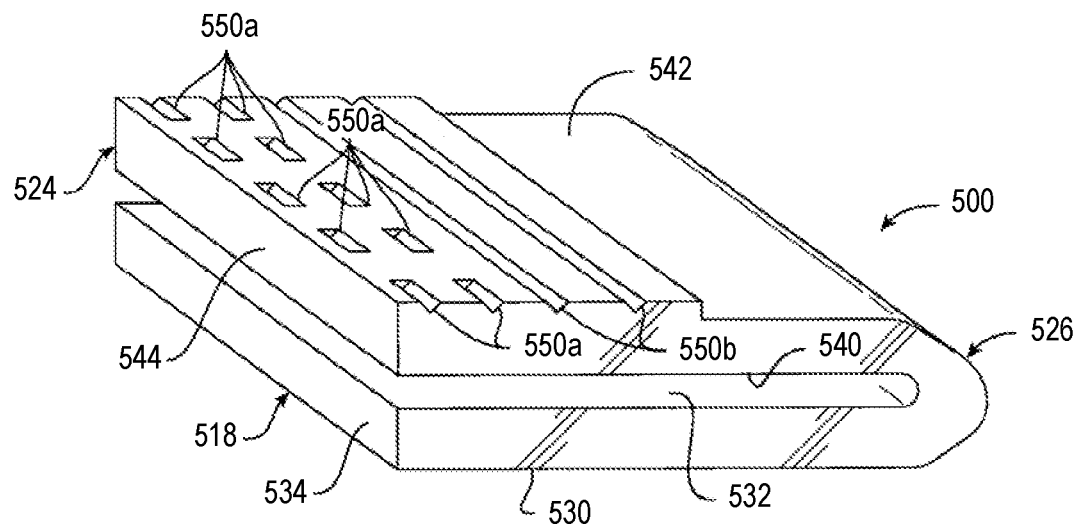
FIG. 59 is a second perspective view of the waveguide of FIG. 55.

The waveguide 500 may be made of any suitable optical grade material that exhibits total internal reflection (TIR) characteristics. The material may comprise but is not limited to acrylic, polycarbonate, glass, molded silicone, or the like. The waveguide 500 has a footprint that may be described, generally, in terms of the area of the waveguide in the plane of the light emitting surface. For example, in the waveguide 500 shown in FIGS. 55 through 59, the light emitting surface 530 is a generally rectangular area of the light emitting portion 518. The waveguide 500 has a generally rectangular footprint (FIG. 56). The footprint of the waveguide 500 may be slightly greater than the area of the light emitting surface 530 where, for example, as shown in FIG. 55, the light transmission portion 526 extends slightly laterally beyond the light emitting portion 518. For a rectangular waveguide the footprint of the waveguide 500 may be described in terms of its length and width. For example, the area of the footprint of waveguide 500 may be described in terms of its length L and width W, transverse to the length L. While the waveguide 500 shown in FIGS. 55 through 59 is rectangular, the waveguide may have any suitable shape including round, square, multi-sided, oval, irregular shaped or the like. In these and in other embodiments, the footprint of the waveguide may be expressed in terms other than length and width.

The light emitting portion 518 may be described generally as having an exterior surface 530, an interior surface 532 and a side surface 534. The exterior surface 530 is the light emitting surface. In the illustrated embodiment, the surfaces comprise generally planar walls; however, where the light emitting portion 518 has other than a rectangular shape, the surfaces may be defined in whole or part by curved walls, planar walls, faceted walls, or combinations of such walls.

One or more of the surfaces of the light emitting portion 518 may be formed with light extraction features 516 to define a light emitting area 514 on light emitting surface 530 (note, the light extraction features 516 are not shown in FIG. 56 in order to more clearly show the light source 523). The light extraction features 516 may be formed on the light emitting exterior surface 530, as shown. Alternatively, the light extraction features may be formed on the interior surface 532 to reflect light to and out of the exterior surface 530. In some embodiments, the light extraction features 516 may be formed on both the exterior surface 530 and the interior surface 532. The light extraction features 516 may also be formed within the waveguide body 512 at positions between the exterior and interior surfaces 530, 532. It is to be understood that in use, the waveguides described herein may assume any spatial orientation and the light emitting surface 530 may be an upper surface of the waveguide, a lower surface of the waveguide and/or a side surface of the waveguide. For example, in FIG. 55 the light emitting surface 530 faces up while in the embodiment of FIGS. 52 through 54, the light emitting surface 530 faces down to produce downlight. The light extraction features 516 may be designed to emit light from the waveguide in any direction and in any illumination pattern.

Figure 72:
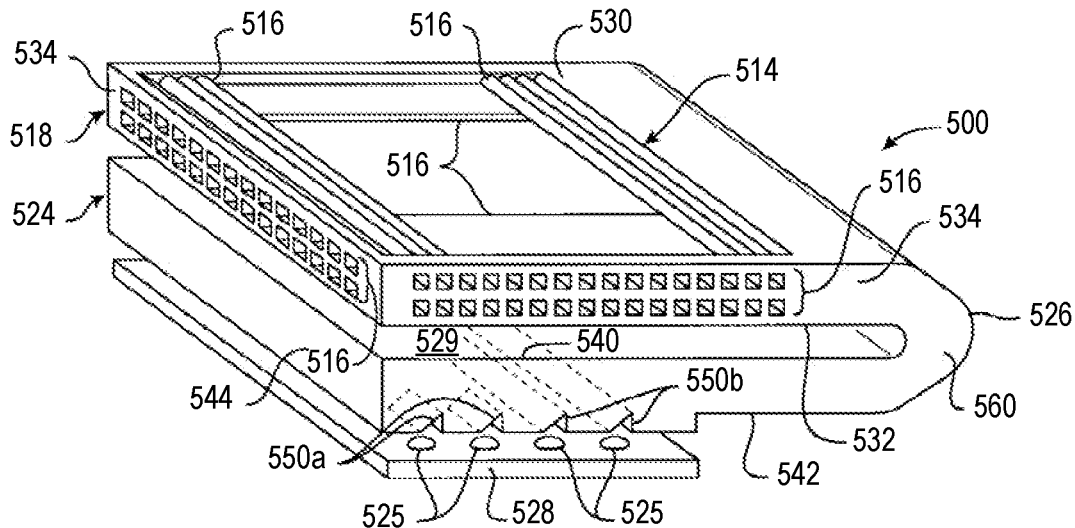
FIG. 72 is a perspective view of another embodiment of the waveguide.

Referring to FIG. 72, the light extraction features 516 may also be formed on the side surfaces 534 of the light emitting portion 518 such that light may emitted laterally from the waveguide in a direction substantially perpendicular to the direction of the light emitted from surface 534. The side surfaces 534 may form light emitting surfaces in addition to light emitting surface 530 or in place of light emitting surface 530.

The light extraction features 516 can comprise a single light extraction element or a plurality of individual light extraction elements. The size, shape and/or density of individual light extraction features 516 can be uniform or vary across one or more surfaces of the waveguide body 512 in a regular or irregular fashion to produce desired light emission pattern. The light extraction features 516 can comprise indents, depressions, facets or holes extending into the waveguide, or bumps, facets or steps rising above the waveguide surface, or a combination of both bumps and depressions. The light extraction features 516 may be part of the waveguide body 512 or may be coupled to surfaces of the waveguide body 512. Individual light extraction features 516 may have a symmetrical or asymmetrical shape or geometry. The light extraction features 516 can be arranged in an array and may exhibit regular or irregular spacing. The light extraction features 516 may be applied to the waveguide as part of the molding process of the waveguide body 512, by etching or other process, by application of a film containing the light extraction features or in other manners.

One example of light extraction features is described in U.S. Pat. No. 9,835,317 issued Dec. 5, 2017, which is incorporated by reference herein in its entirety. Additionally, the extraction features may comprise small indents, protrusions, and/or reflective materials and/or surfaces as shown in U.S. Pat. No. 9,690,029, issued Jun. 27, 2017, which is incorporated by reference herein in its entirety. Light extraction features and light coupling features are also shown in U.S. Pat. No. 9,625,636, issued Apr. 18, 2017, which is incorporated by reference herein in its entirety. Another example of light extraction features is described in U.S. patent application Ser. No. 15/587,442, filed May 5, 2017, which is incorporated by reference herein in its entirety.

The light coupling portion 524 may be described generally as having an interior surface 540, an exterior surface 542 and a side surface 544. In the illustrated embodiment the surfaces comprise generally planar walls; however, where the light coupling portion 524 has other than a rectangular shape the surfaces may be defined in whole or part by curved walls, planar walls, faceted walls or combinations of such walls. The light coupling portion 524 is arranged such that it is disposed approximately parallel to the light emitting portion 518 in a layered or stacked configuration. In the orientation of the waveguide shown in FIG. 55 the light emitting portion 518 may be described as being over the light coupling portion 524 while in the orientation of the waveguide shown in FIGS. 52 through 54 the light emitting portion 518 may be described as being under the light coupling portion 524. In any orientation the light emitting portion 518 and the light coupling portion 524 may be described as being in a stacked or layered configuration. The light coupling portion 524 is spaced from the light emitting portion 518 by a narrow air gap 529. In some embodiments, the light coupling portion 524 is closely spaced from the light emitting portion 518 to minimize the height of the waveguide in the z-direction. In this manner, the light coupling portion 524 is arranged back-to-back with the light emitting portion 518. The light coupling portion 524 is disposed adjacent the non-light emitting interior surface 532 of the light emitting portion 518 such that the light coupling portion 524 does not interfere with light emitted from the light emitting portion 518.

As is evident from FIGS. 55 through 59, the light coupling portion 524 has substantially the same area as the light emitting portion 518 and is arranged to be substantially coextensive with the light emitting portion 518 such that the light coupling portion 524 does not increase the footprint of the waveguide relative to the light emitting portion 518. In some embodiments, the light coupling portion 524 may have a smaller footprint than the light emitting portion 518 provided the lumen density at the coupling face does not create overheating conditions for the system components. Moreover, in some embodiments, the light coupling portion 524 may have a larger footprint than the light emitting portion provided that the increase in footprint is not an issue in the lighting device. However, in some preferred embodiments, the footprint of the light coupling portion 524 is equal to or smaller that the footprint of the light emitting portion 518 such that the overall footprint of the waveguide is not increased. Moreover, the light emitting portion 518 and light coupling portion 524 may have different shapes. While the arrangement of the light coupling portion 524 may not increase the footprint of the waveguide, the entire exterior surface 542 of the light coupling portion 524 may be used as the coupling surface for the LEDs 525. As shown in FIGS. 55 through 59, an array of LEDs 525 may be positioned to input light into the light coupling portion 524 over substantially the entire exterior surface 542 thereof. The spacing of the LEDs 525 may be increased over a traditional edge lit waveguide and a greater number of LEDs operated at higher power may be used while still maintaining or decreasing the lumen power density of the device. Whether the footprint of the light coupling portion 524 is smaller than, larger than, or substantially the same as the footprint of the light emitting portion 518, the arrangement of the light guide as described herein can be used to control the routing of the light through the waveguide to produce any mixture of light output patterns. The direction, intensity and lumen density of the light may be managed simultaneously using the waveguide arrangements as described herein.

Each of the LEDs 525 may be optically coupled to the light coupling portion 524 by light coupling features 550a, 550b. The light coupling features 550a are arranged in a one-to-one relationship with the LEDs 525 while the light coupling features 550b optically couple more than one LED 525 to the waveguide 500. In some embodiments, all of the light coupling features may be in a one-to-one relationship with the LEDs, and in other embodiments, all of the light coupling features may be coupled to plural LEDs. The number, spacing and pattern of the LEDs 525 and of light coupling features 550a, 550b may be different than as shown herein. Light may be coupled into the waveguide through an air gap and a coupling cavity defined by surfaces located at an edge and/or interior portions of the waveguide. Such surfaces comprise an interface between the relatively low index of refraction of air and the relatively high index of refraction of the waveguide material. One way of controlling the spatial and angular spread of injected light is by fitting each source with a dedicated lens. These lenses can be disposed with an air gap between the lens and the coupling optic, or may be manufactured from the same piece of material that defines the waveguide's distribution element(s). The light coupling features may differ from those disclosed herein and may be used provide directional light into the waveguide.

Figure 71:
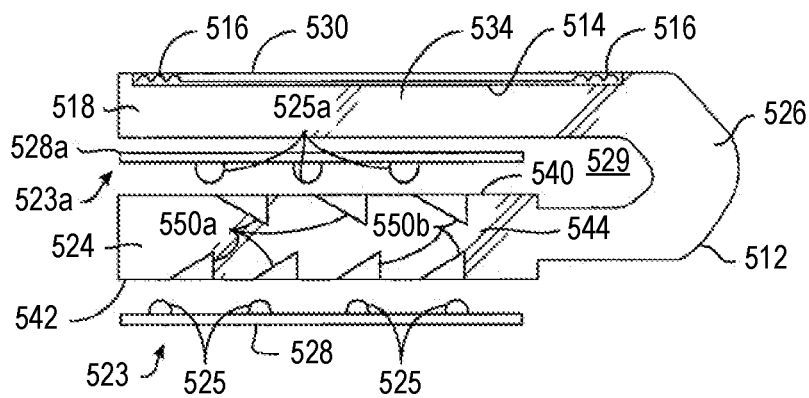
FIG. 71 is a side section view of another embodiment of a waveguide.

As shown in FIGS. 55 through 59, the LEDs 525 are placed adjacent the exterior surface 542 of the light coupling portion 524 to allow access to the LEDs 525 and to simplify manufacturing; however, the LEDs 525 may be arranged in the air gap 529 between the light coupling portion 524 and the light emitting portion 518. In such an arrangement, the LEDs are arranged opposite the interior face 540 of the light coupling portion 524 to direct light into the light coupling portion 524. In other embodiments, the LEDs may be arranged adjacent both the exterior surface 542 of the light coupling portion 524 and in the air gap 529 between the light coupling portion 524 and the light emitting portion 518. As shown in FIG. 71, in such an arrangement, a second light source 523a is arranged in space 529 such that the LEDs 525a of the second light source 523a are arranged opposite the internal face 540 of the light coupling portion 524. The light source 523a may be powered as previously described with respect to light source 523. Light coupling features 550a, 550b may be provided in face 540 to couple LEDs 525a to the waveguide. Using a first light source 523 and a second light source 523a increases the light directed into the waveguide and increases the over-all lumen output at the light emitting portion 534.

Regardless of the type of light coupling features used, the entire surface 542 of the light coupling portion 524 is available to couple the LEDs 525 to the waveguide. As shown in the embodiment of FIGS. 55 to 59, the light coupling surface 542 extends substantially parallel to the light emitting surface 530 such that the area of the light coupling surface is approximately the same as the area of the light emitting surface 530. It is to be understood that in some embodiments, the light emitting portion 518 and the light coupling portion 524 may be tapered or curved such that the light coupling portion 524 and the light emitting portion 518 may not be parallel in the strictest sense and may have slightly different areas even where the footprints of the light coupling portion 524 and the light emitting portion 518 are the same.

The waveguide 500 is arranged such that the light coupling surface 542 is a major surface of the waveguide. As explained above, the light coupling portion 524 has major interior and exterior surfaces connected by much smaller side or edge surfaces. The areas of the major interior and exterior surfaces are significantly greater than the area of the side edge surfaces such that using one of the major surfaces of the waveguide as the light coupling surface 542 greatly reduces the density of the LEDs 525.

The light transmission portion 526 optically couples the light coupling portion 524 to the light emitting portion 518. The light transmission portion 526 transmits the light from the light coupling portion 524 to the light emitting portion 518 and may be used to condition the light. For example, the light transmission portion 526 may be used to color mix the light and to eliminate hot spots. In the embodiment of FIGS. 55 through 59, the light transmission portion 526 comprises a curved or angled section of the waveguide body that bends back over itself to transmit the light from an edge of the light coupling portion 524 to an edge of the light emitting portion 518.

The light may be transmitted through the light coupling portion 524, the light transmission portion 526 and the light emitting portion 518 using total internal reflection (TIR) principles. Total internal reflection occurs when a propagating wave strikes a medium boundary at an angle larger than a particular critical angle with respect to the normal to the surface. If the refractive index is lower on the other side of the boundary and the incident angle is greater than the critical angle, the wave cannot pass through and is entirely reflected. In the waveguide 500 TIR principles may be used to transmit the light through the waveguide. However, in some embodiments reflectors may be used. For example, reflectors or a reflective material may be disposed over all a part of the light transmission portion 526 and over parts of the light coupling portion 524 and the light emitting portion 518. The reflective material may comprise a specular layer, a white optic layer or the like and may comprise a film, paint, a physical layer or the like.

In addition to increasing the area of the light coupling surface 542, the waveguides as described herein also increase the functional light path of the light traveling from the light coupling features 550 to the light extraction features 516. As is evident from FIGS. 55 through 59, the light path includes some, or all, of the light coupling portion 524, some, or all, of the light emitting portion 518 as well as the length of the light transmission portion 526. The light path is increased while maintaining a minimum footprint of the waveguide. While the z-dimension of the waveguide is increased, the x, y dimensions (as represented by width W and length L in FIG. 56) are not increased and typically the x, y dimensions are the critical dimensions in lighting device design.

Figure 73:
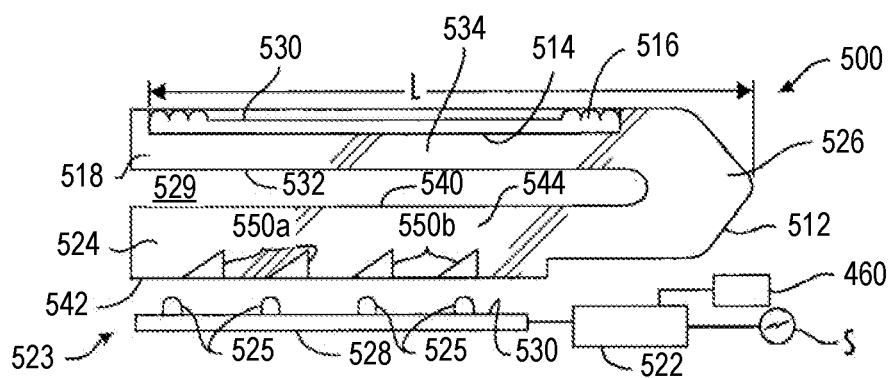
FIG. 73 is a side section view of another embodiment of a waveguide.

In some embodiments, one or more of the light coupling portion 524, the light transmission portion 526 and the light emitting portion 518 may be provided with internal light altering features 533 for diffusing and/or reflecting the light as shown in FIG. 73. These internal light altering features 533 may comprise gas voids (such as air "bubbles"), discrete elements such as diffusive and/or specular reflective particles suspended in or dispersed throughout the waveguide body or other reflective, diffusive or refractive elements such as elongated features. The light altering features 533 may be of any suitable shape and size, and each of the light altering features may be of the same or different shapes and sizes as other ones of the light altering features. The light altering features 533 may be dispersed uniformly or non-uniformly in the wave guide body to alter the path of travel of the light through the waveguide body and to alter the light pattern of the emitted light. In some embodiments, one section of the waveguide body, such as the light emitting portion, may have the light altering features while other sections of the waveguide body, such as the light coupling portion, may not have the light altering features. Moreover, the density of the light altering features may be uniform or non-uniform throughout the waveguide.

Figure 60:
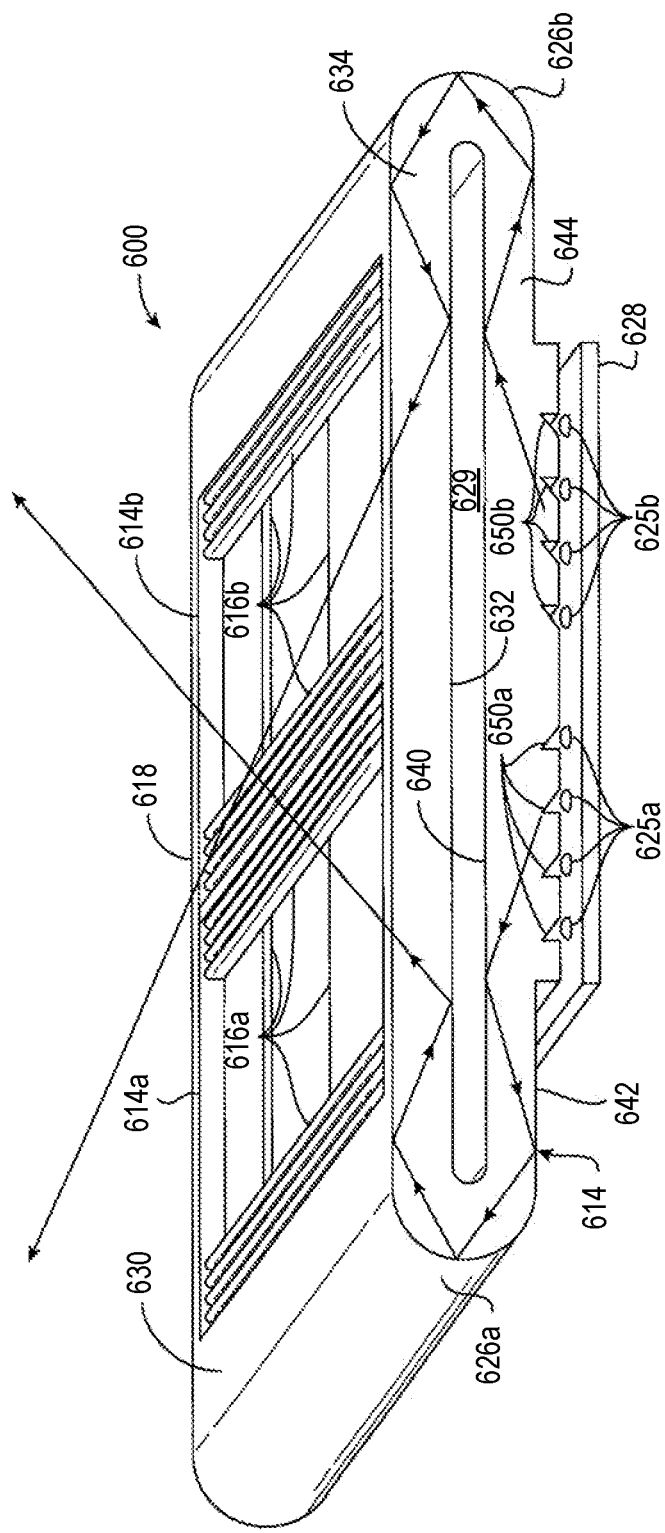
FIG. 60 is a perspective view of another embodiment of the waveguide.

Referring to FIG. 60, another embodiment of a waveguide 600 is illustrated. The embodiment of FIG. 60 is similar to that described above with reference to FIGS. 55 through 59 except that the LEDs 625*a*, 625*b* and light coupling features 650*a*, 650*b* are arranged in multiple groups and the light from each group is transmitted through opposing light transmission sections 626*a*, 626*b* such that the light of the two groups enters the light emitting portion 618 from opposite ends and in opposite directions. The light emitting portion 618 may be described generally as having an exterior surface 630, an interior surface 632 and side or edge surfaces 634. In the illustrated embodiment, the surfaces comprise generally planar surfaces; however, where the light emitting portion 618 has other than a rectangular shape these surfaces may be defined in whole or part by curved walls, planar walls, faceted walls, or combinations of such walls.

One or more of the surfaces of the light emitting portion may be formed with two groups of light extraction features 616*a*, 616*b* to define light extraction areas 614*a*, 614*b*. In the illustrated embodiment, the light extraction features 616*a*, 616*b* are formed on the exterior surface 630 to direct light out of the exterior surface 630. Exterior surface 630 is the light emitting surface. Alternatively, the light extraction features may be formed on the interior surface 632 such that the light extraction features redirect the light to the exterior surface 630. The light extraction features may also be formed between the interior surface 632 and the exterior surface 630. Further, the light extraction features 616*a*, 616*b* may be directional such that the light extraction area 614*a* directs light in a first direction, to the right as viewed in FIG. 60, and the light extraction area 614*b* directs light in a second direction, to the left as viewed in FIG. 60. The light extraction features 616*a*, 616*b* may be configured as previously described.

The light coupling portion 624 may be described generally as having an interior surface 640, an exterior surface 642 and edge or side surfaces 644. In the illustrated embodiment, the surfaces comprise generally planar surfaces; however, where the light coupling portion 624 has other than a rectangular shape these surfaces may be defined in whole or part by curved walls, planar walls, faceted walls, or combinations of such walls. The light coupling portion 624 is arranged such that it is disposed approximately parallel to and spaced closely from the light emitting portion 618 by an air gap 629. In this manner the light coupling portion 624 is arranged back-to-back with the light emitting portion 618. The light coupling portion 624 is disposed adjacent the non-light emitting surface 632 of the light emitting portion 618 such that the light coupling portion 624 does not interfere with light emitted from the light emitting portion 618. As is evident from FIG. 60, the light coupling portion 624 has substantially the same area as the light emitting portion 618 and is arranged to be substantially coextensive with the light emitting portion 618 such that the light coupling portion does not increase the footprint of the waveguide relative to the light emitting portion. While the light coupling portion does not increase the footprint of the waveguide, the entire lower surface 642 of the light coupling portion 614 may be used as the coupling surface for the LEDs 625*a*, 625*b*.

As shown in FIG. 60, a first array of LEDs 625*a* may be positioned to input light into the light coupling portion 624 over a first section of the exterior surface 642 thereof and a second array of LEDs 625*b* may be positioned to input light into the light coupling portion 624 over a second section of the exterior surface 642 thereof. In the illustrated embodiment, the number and spacing of the LEDs 625*a*, 625*b* is approximately equal; however, the two groups of LEDs may differ in size, number of LEDs, spacing of LEDs, types of LEDs, or the like. The spacing of the LEDs may be increased over a traditional edge lit waveguide and a greater number of LEDs operated at higher power may be used while still maintaining or decreasing the lumen power density.

Each of the LEDs 625*a*, 625*b* may be optically coupled to the light coupling portion by light coupling features 650*a*, 650*b*, respectively. The light coupling features 650*a*, 650*b* may be arranged in a one-to-one relationship with the LEDs or a single light coupling feature may be used to optically couple multiple LEDs to the waveguide, as previously described. Regardless of the type of light coupling feature used, the entire surface 642 of the light coupling portion 618 is available to couple the LEDs 625*a*, 625*b* to the waveguide. The light coupling features may be configured such that the light emitted from the first group of LEDs 625*a* is directed in a different direction than the light emitted from the second group of LEDs 625*b*. As shown in FIG. 60, the light from LEDs 625*a* is directed to the left and the light from LEDs 625*b* is directed to the right.

Optically coupling the light coupling portion 614 to the light emitting portion 618 are two light transmission portions 626*a*, 626*b*, one arranged at each end of the light emitting portion and the light coupling portion such that light emitted from LEDs 625*a* is transmitted through light coupling portion 626*a* and light emitted from LEDs 625*b* is transmitted through light coupling portion 626*b*. The light enters the light emitting portion 618 from opposite ends thereof and travels through the light emitting portion in opposite directions as represented by arrows in FIG. 60. The light extraction features 616*a*, 616*b* may be arranged such that light traveling through light emitting portion 618 in the first direction is emitted generally in the first direction and light traveling through light emitting portion 618 in the second direction is emitted generally in the second direction. Because the light is emitted in the same general direction as it is traveling through the light emitting portion 618 optical efficiency of the waveguide is increased as compared to a system where a portion of the light must be reversed against its direction of travel. The arrangement described with respect to FIG. 60 may be used to generate a bi-directional light pattern with greater efficiency than if one of the directional light patterns had to be turned against its input direction. It is noted that the light extraction features may be selected to generate any light pattern including for example, a narrow beam angle spot light, wide beam angle flood light or the like. The illumination pattern may be directionally asymmetrical, or it may be directionally symmetrical.

Figure 61:
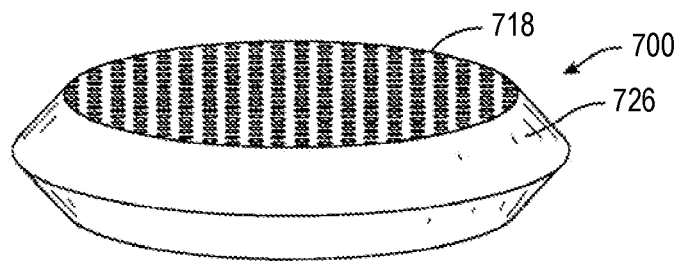
FIG. 61 is a perspective view of another embodiment of the waveguide.
Figure 62:
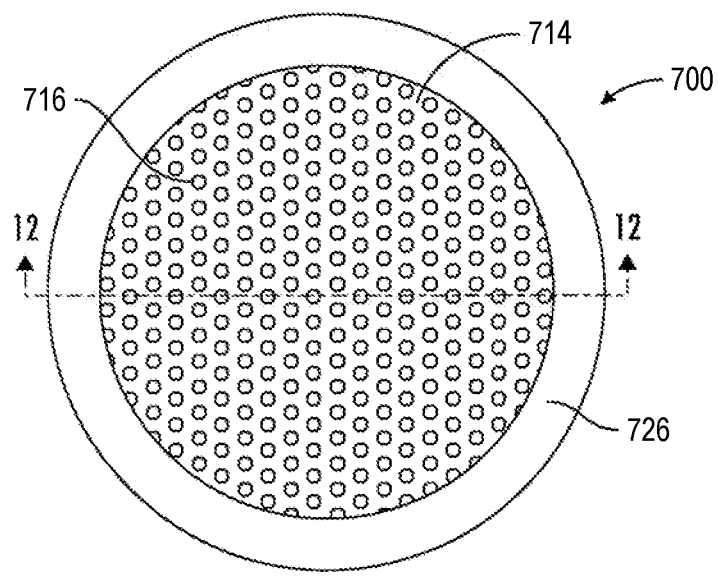
FIG. 62 is a top view of the waveguide of FIG. 61.
Figure 63:
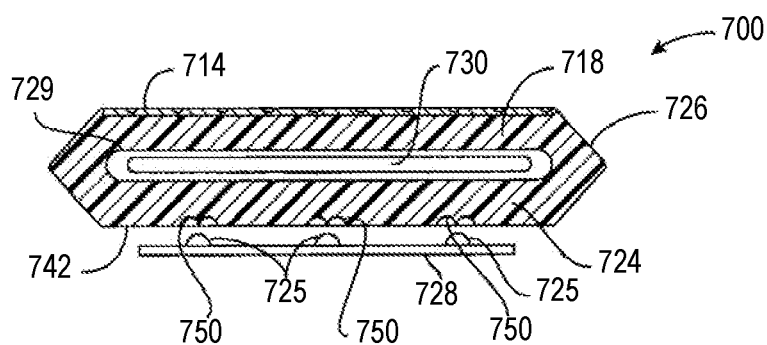
FIG. 63 is a side section view of the waveguide of FIG. 61.

Another embodiment of the waveguide of the invention is shown in FIGS. 61 through 63. In this embodiment, the waveguide 700 has a generally circular footprint where the light coupling portion 724 and the light emitting portion 718 are generally cylindrical in shape. Light is emitted into the generally circular light coupling surface 742 of light coupling portion 724 by LEDs 725 mounted on LED board 728. The light may be directed into light coupling features 750. The light is directed radially outwardly in the light coupling portion 724. The light is transmitted to a generally annular light transmission portion 726. The light transmission portion 726 transmits the light into the outer periphery of the circular light emitting portion 718 and the light is directed radially inwardly by the light transmission portion 726. The light emitting portion 718 has a light emitting surface 714 that includes light emitting features 716. The light may be emitted from the light emitting portion 718 in any suitable pattern. In this and in any of the other embodiments described herein a reflector 730 may be positioned between the light emitting portion 718 and the light coupling portion 724 to optically isolate these portions from one another. As in the other embodiments described above, the light emitting portion 718 is arranged in a layer above the light coupling portion 724 and the two layers are separated by a small air gap 729. While the embodiment shown in FIGS. 61 through 63 is circular, the lighting device may be oval, rectangular, or irregularly shaped where the light is projected radially inwardly into the light emitting portion from the periphery of the light emitting portion 718 by the light transmission portion 724.

Figure 64:
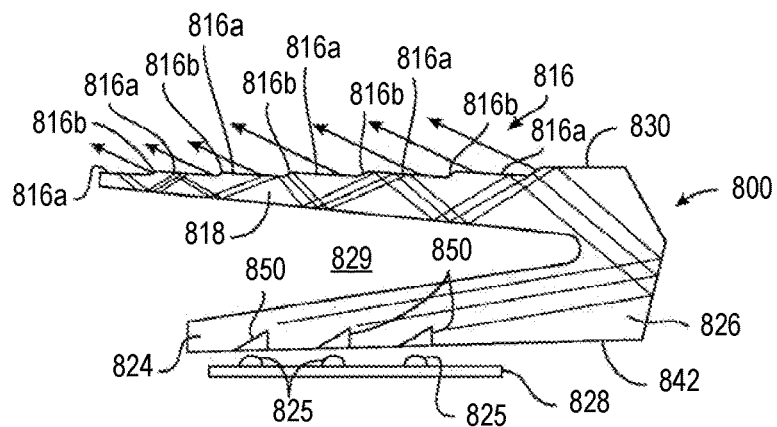
FIG. 64 is a side section view of another embodiment of a waveguide.

Another embodiment of the waveguide of the invention is shown in FIG. 64. In this embodiment, the waveguide 800 has a generally rectangular footprint where the light coupling portion 824 and the light emitting portion 818 are generally rectangular in shape. The light coupling portion 824, light emitting portion 818 and the light transmission portion 826 are generally arranged as explained with respect to the embodiment of FIGS. 55 through 59; however, the light coupling portion 824 is arranged to generate collimated light and the light emitting portion 818 tapers from the light transmission portion 818 to its distal end. Light is emitted into the light coupling surface 842 of light coupling portion 824 by LEDs 825 mounted on LED board 828. The light may be directed into light coupling features 850. As in the other embodiments described above, the light emitting portion 826 is arranged in a layer above the light coupling portion 824 and the two layers are separated by an air gap 829. A light transmission portion 826 optically connects the light emitting portion 818 and the light coupling portion 824 as previously described. In this embodiment, the light emitting portion 818 comprises a light emitting surface 830 formed by light emitting features 816 comprising a plurality of stepped faces 816*a* connected by intermediate surfaces 816*b* that may be planar, curved, concave, scalloped or the like.

Figure 65:
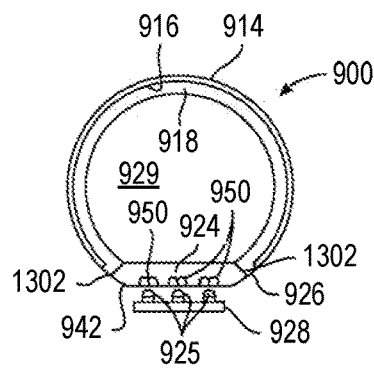
FIG. 65 is a top view of another embodiment of a waveguide.
Figure 66:
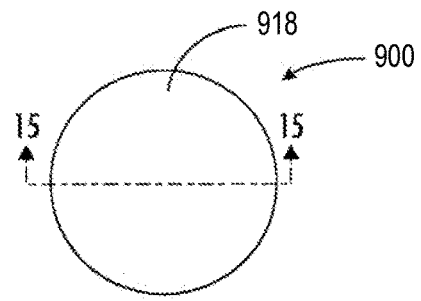
FIG. 66 is a section view taken along line 15-15 of FIG. 65.
Figure 67:
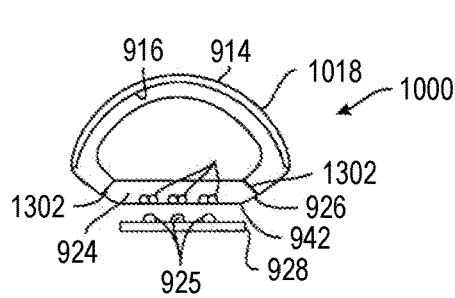
FIG. 67 is a top view of another embodiment of a waveguide.
Figure 68:
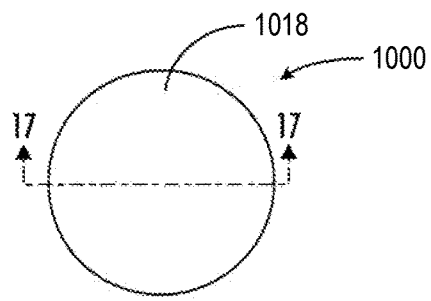
FIG. 68 is a section view taken along line 17-17 of FIG. 67.

Another embodiment of the waveguide of the invention is shown in FIGS. 65 and 66. In this embodiment, the waveguide 900 may have a generally circular footprint, as shown, or it may have a rectangular footprint. Light is emitted into the light coupling surface 942 of light coupling portion 924 such that the light is directed radially outwardly from the light coupling portion 924. Light is emitted into the generally circular light coupling surface 942 of light coupling portion 924 by LEDs 925 mounted on LED board 928. The light may be directed into light coupling features 950. The light is transmitted to a generally annular light transmission portion 926. The light transmission portion 926 transmits the light into the edge of a dome shaped light emitting portion 918. The light emitting portion 918 has a light emitting surface 914 formed by light emitting features 916 as described above. The light may be emitted from the light emitting portion 918 in any suitable pattern; however, with the dome style light emitting portion the light may be emitted nearly omnidirectionally. As in the other embodiments described above, the light emitting portion 918 is arranged in a layer above the light coupling portion 924 and the two layers are separated by an air gap 929. FIGS. 67 and 68, show another embodiment of a waveguide 1000 that is similar to the waveguide of FIGS. 65 and 66 (where like reference numbers are used to identify the same elements) except that the light emitting portion 1018 is formed as a shallower dome and is more closely spaced to the light coupling portion 924.

Figure 69:
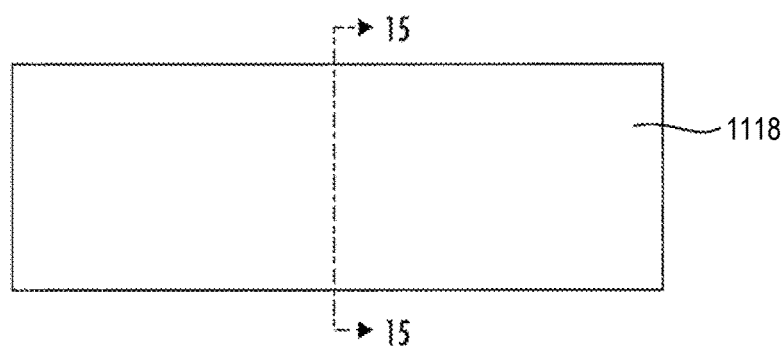
FIG. 69 is a top view of another embodiment of a waveguide.

Another embodiment of the waveguide of the invention is shown in FIG. 69. The waveguide that is similar to the waveguide of FIGS. 65 through 68 (where like reference numbers are used to identify the same elements) except that the light coupling portion, light emitting portion 1018 and the light transmission portion extend linearly to create an elongated, linear waveguide. It should be noted that in this and in the other embodiments described herein the relative dimensions of the waveguide in the x, y, z directions may be different than as shown, such that the waveguides may be relatively longer, wider or narrower than as specifically shown herein. For example, the width dimension W, as shown in FIG. 56, may be increased relative to the length L to create a linear waveguide.

In the embodiments described above, the light coupling portion, light emitting portion and the light transmission portion are formed as part of an integral, one-piece waveguide. In the embodiments described above, the waveguide may be made of a single piece of material, or the waveguide may be made of separate pieces connected together to create the unitary structure. For example, the light emitting portion, the light coupling portion and the light transmission portion may be molded as a single piece. In other embodiments, the light coupling portion and the light transmission portion may be molded as a single piece and the light emitting portion may be molded as a separate piece. The pieces may be designed specifically to be optically coupled to one another to create a finished waveguide.

Figure 70:
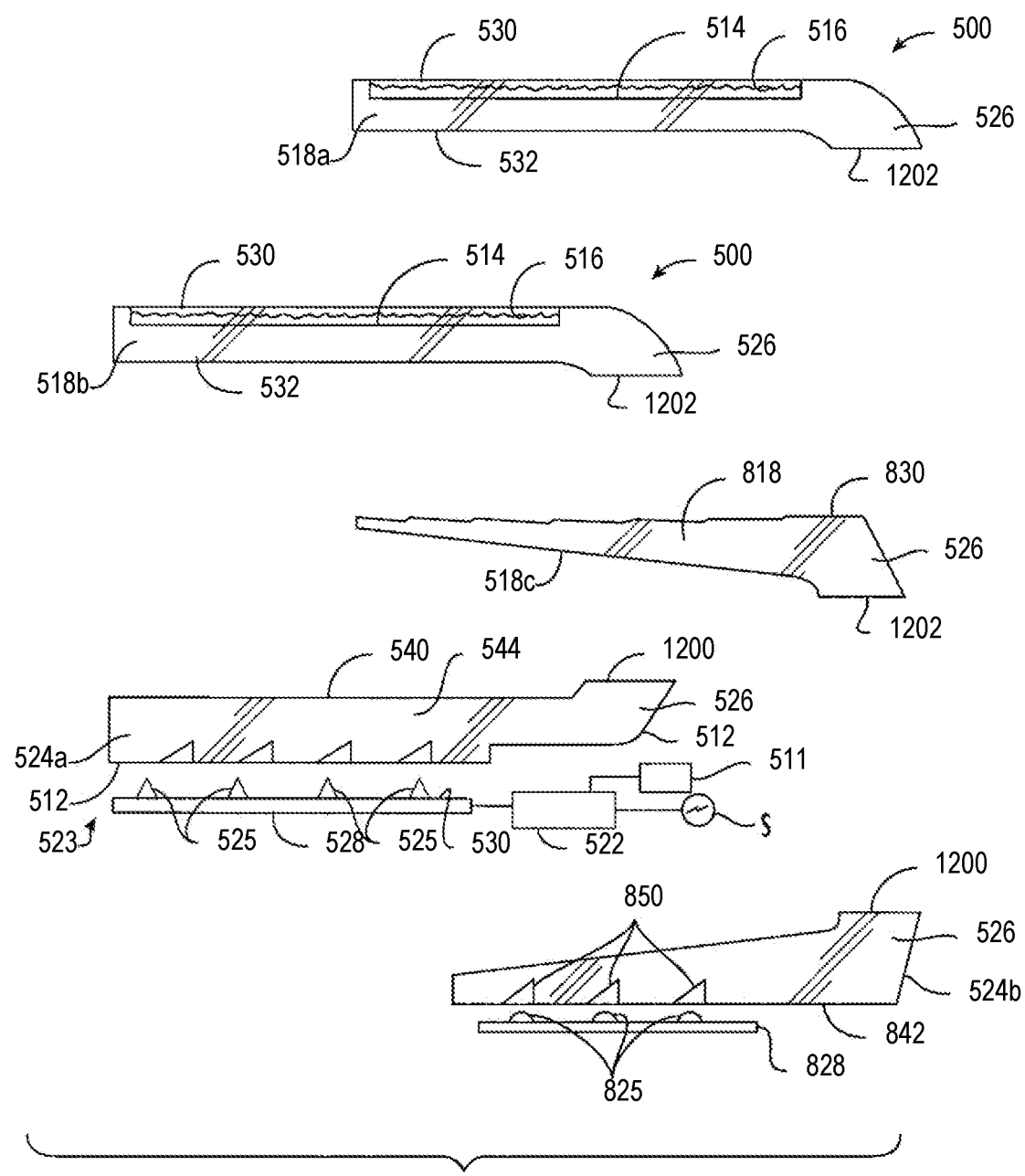
FIG. 70 shows side section views of waveguide components of a modular waveguide system.

However, in other embodiments, a standardized light coupling portion may be designed to be used with multiple different types of light emitting sections as shown in FIG. 70. In such embodiments, the light coupling portion 524a may be formed separately from a plurality of the light emitting portions 518a, 518b, 518c such that the light coupling portion 524a may be optically connected to any one of a plurality of light emitting portions. In the illustrated embodiment each of the light coupling portion 524a and the light emitting portions 518a, 518b, 518c include a portion of the light transmission portion 526. However, the light transmission portion 526 may be entirely contained within one of the light coupling portion or the light emitting portions. Moreover, each of the light transmission portion, the light coupling portion and the light emitting portion may be formed separately. An interface 5200 is created on the light coupling portion 524a that optically couples the light coupling portion 524a to a mating interface 1202 provided on any one of the plurality of different types of light emitting portions 518a, 518b, and 518c. The interfaces 1201, 1202 may comprise mechanical connectors to secure the portions to one another and an optical gel or other medium may be used between the portions to optically couple the portions to one another. In this manner a single light coupling portion may be used with different types of light emitting portions and/or light transmission portions. For example, as shown in FIG. 70 the light emitting portion 518a may be substantially similar to the light emitting portion described with respect to FIGS. 55 through 59; the light emitting portion 518c may be substantially similar to the light emitting portion described with respect to FIG. 64; and the light emitting portion 518b may be similar to the light emitting portion of FIGS. 55 through 59 except that the light emitting portion 518b may be circular rather than rectangular. While examples of different types of light emitting portions are shown, it is to be understood that the light emitting portions may differ from one another in ways different than as specifically described. Moreover, different types of light coupling portions 524a, 524b may also be provided. For example, light coupling portion 524a may be substantially similar to the light coupling portion described with respect to FIGS. 55 through 59; and the light emitting portion 524b may be substantially similar to the light emitting portion described with respect to FIG. 64. While examples of different types of light coupling portions are shown it is to be understood that the light coupling portions may differ from one another in ways different than as specifically described. For example, referring to FIGS. 66 and 68, the domed light emitting portions 918, 1018 may be coupled to the same type of light coupling portion 942 at interfaces 1302. The modular approach as described herein allows the number of components to be reduced where, for example, a single light coupling portion may be used with a variety of different types of light emitting portions to create different types of waveguides.

In some embodiments, different portions of the waveguide may be made of different materials to provide different portions of the waveguide with different optical properties. For example, the light emitting portions may be formed of glass while the light coupling portion may be formed of a different material such acrylic or silicone. In other embodiments the light extracting region may be formed of silicone while the remainder of the light emitting portion may be glass. Making different portions of the waveguide of different materials may be most easily performed where the light guide comprises separately made portions; however, even where the waveguide is an integral, one-piece waveguide, different materials may be used to create different portions of the waveguide. The different materials may comprise acrylic, polycarbonate, glass, molded silicone, other optical materials or combinations of such materials. Moreover, the materials may include particles, additives, or the like that alter the optical properties such that, for example, one portion of the waveguide may be made of acrylic and a second portion of the waveguide may be made of acrylic containing reflective or diffusive particles. In such an embodiment, the acrylic and acrylic containing particles are considered different materials. Other materials and in combinations other than as described herein may be used to create different portions of the waveguide having different optical properties.

The waveguide(s) 500 described herein may comprise additional features to assist in developing the target illumination distribution(s). The embodiments discussed herein may incorporate reflecting and/or diffusing surface coverings/coatings. The coverings/coatings may take the form of reflecting/diffusing coatings, paints, and/or sprays as applied to metals, plastics, papers, and/or films. Further, the coverings/coatings contemplated herein may take the form of reflecting/diffusing films and/or sheets including paper films, plastic films, paper sheets, plastics sheets, and/or metal sheets. The reflecting/diffusing films, coatings, paints, sheets, and/or sprays may have the same and/or different reflecting and/or diffusing properties. Further, the films, coatings, paints, sheets, and/or sprays may be applied to provide more or less coverage of the example waveguide(s). Still further, the films, coatings, paints, and/or sprays may be applied to particular parts while not being applied to other parts. The films, coatings, paints, sheets, and/or sprays may be applied during or after manufacture of the waveguide(s) 500, and before, during, and/or after the manufacture and/or assembly of the lighting systems. The films, coatings, paints, sheets, and/or sprays contemplated by this disclosure are referred to as coatings and films, although use of these terms referentially should not limit the materials/substances added to the waveguide.

INDUSTRIAL APPLICABILITY

When one uses a relatively small light source which emits into a broad (e.g., Lambertian) angular distribution (common for LED-based light sources), the conservation of etendue, as generally understood in the art, requires an optical system having a large emission area to achieve an asymmetric angular light distribution. In the case of parabolic reflectors, a large optic is thus generally required to achieve high levels of collimation. In order to achieve a large emission area in a more compact design, the prior art has relied on the use of Fresnel lenses, which utilize refractive optical surfaces to direct and collimate the light. Fresnel lenses, however, are generally planar in nature, and are therefore not well suited to re-directing high-angle light emitted by the source, leading to a loss in optical efficiency. In contrast, in the present invention, light is coupled into the optic, where primarily TIR is used for re-direction and light distribution. This coupling allows the full range of angular emission from the source, including high-angle light, to be re-directed, resulting in higher optical efficiency in a more compact form factor.

The placement of multiple LED element(s) and the optics of the waveguide bodies overlay the illumination from each LED element onto each other, which further helps color mixing while maintaining a desired photometric distribution. While specific coupling feature and extraction feature and/or redirection feature parameters including shapes, sizes, locations, orientations relative to a light source, materials, etc. are disclosed as embodiments herein, the present invention is not limited to the disclosed embodiments, inasmuch as various combinations and all permutations of such parameters are also specifically contemplated herein. Any of the features such as various shaped coupling cavities, LED elements, redirection features, color mixing structures and/or cavities, extraction features, etc. described and/or claimed in U.S. patent application Ser. No. 13/842,521, U.S. patent application Ser. No. 13/839,949, U.S. patent application Ser. No. 13/841,074, filed Mar. 15, 2013, U.S. patent application Ser. No. 13/840,563, U.S. patent application Ser. No. 14/101,086, filed Dec. 9, 2013, U.S. patent application Ser. No. 14/101,132, filed Dec. 9, 2013, U.S. patent application Ser. No. 14/101,147, filed Dec. 9, 2013, U.S. patent application Ser. No. 14/101,129, filed Dec. 9, 2013, and U.S. patent application Ser. No. 14/101,051, filed Dec. 9, 2013, International Patent Application No. PCT/US14/13931, filed Jan. 30, 2014, and International Patent Application No. PCT/US14/030017, filed Mar. 15, 2014, incorporated by reference herein, may be used in a luminaire, either alone or in combination with one or more additional elements, or in varying combination(s) to obtain light mixing and/or a desired light output distribution. Thus, for example, any of the luminaires disclosed herein disclosed herein may include one or more waveguide bodies including coupling features, one or more light redirection features, one or more extraction features or optics, and/or particular waveguide body shapes and/or configurations as disclosed in such applications, as necessary or desirable. Other waveguide body form factors and luminaires incorporating such waveguide bodies are also contemplated.

At least some of the luminaries disclosed herein are particularly adapted for use in installations, such as outdoor products (e.g., streetlights, high-bay lights, canopy lights; area lights) preferably requiring a total luminaire output of at least about 3,000 lumens or greater, and, in some embodiments, a total luminaire output of up to about 8,000 lumens, and, in other embodiments, a total lumen output from about 10,000 lumens to about 23,000 lumens. Further, the luminaries disclosed herein preferably develop a color temperature of between about 2,500 degrees Kelvin and about 6,200 degrees Kelvin, and more preferably between about 3,000 degrees Kelvin and about 6,000 degrees Kelvin, and, in some embodiments, between about 3,500 degrees Kelvin and about 4,500 degrees Kelvin. Also, at least some of the luminaries disclosed herein preferably exhibit an efficacy of at least about 90 lumens per watt, and more preferably at least about 100 lumens per watt, and more preferably, at least about 110 lumens per watt, and more preferably, about 115 lumens per watt. Also, at least some of the luminaries disclosed herein exhibit an efficacy of about 115 lumens per watt or greater. Further, at least some of the waveguide bodies used in the luminaries disclosed herein preferably exhibit an overall efficiency (i.e., light extracted out of the waveguide body divided by light injected into the waveguide body) of at least about 90 percent. A color rendition index (CRI) of at least about 80 is preferably attained by at least some of the luminaries disclosed herein, with a CRI of at least about 85 being more preferable. The luminaries disclosed herein produce a scotopic to photopic (S/P) ratio of at least 1.4, preferably at least 2.0. Any desired form factor and particular output light distribution, including up and down light distributions or up only or down only distributions, etc. may be achieved.

Embodiments disclosed herein are capable of complying with improved operational standards as compared to the prior art as follows:

In certain embodiments, the waveguide bodies used in the luminaries disclosed herein may generally taper from a first edge to a second edge thereof so that substantially all light is extracted during a single pass of each light ray from the LED element(s) to the second edge of the waveguide body. This extraction strategy maximizes the incidence of light rays impinging on an outer side of each extraction feature and being reflected out a surface (or surfaces) of the waveguide body in a controlled manner, as opposed to striking other surfaces at an angle greater than the critical angle and escaping as uncontrolled light. The outer sides of the extraction features are accurately formed so that control is maintained over the direction of extracted light, thereby allowing a high degree of collimation. Still further, the waveguide body is very low profile, leaving more room for heat exchanger structures, driver components, and the like in the luminaire. Also, glare is reduced as compared with other lamps using LED light sources because light is directed outwardly in the waveguide body while being extracted from the waveguide body by the extraction features such that the resulting emitted light is substantially mixed and substantially uniformly distributed throughout the beam angle. The result is a light distribution that is pleasing and particularly useful for general illumination and other purposes using a light source, such as one or more LED element(s).

In some embodiments, one may wish to control the light rays such that at least some of the rays are collimated, but in the same or other embodiments, one may also wish to control other or all of the light rays to increase the angular dispersion thereof so that such light is not collimated. In some embodiments, one might wish to collimate to narrow ranges, while in other cases, one might wish to undertake the opposite. Any of these conditions may be satisfied by the luminaires utilizing waveguide bodies disclosed herein through appropriate modification thereof.

All references, including publications, patent applications, and patents, cited herein are hereby incorporated by reference to the same extent as if each reference were individually and specifically indicated to be incorporated by reference and were set forth in its entirety herein.

Those skilled in the art will recognize improvements and modifications to the preferred embodiments of the present disclosure. All such improvements and modifications are considered within the scope of the concepts disclosed herein and the claims that follow.

What is claimed is:

1. A lighting device, comprising:
   a housing;
   a light emitter disposed in the housing; and
   a waveguide at least partially disposed in an opening of the housing and comprising:
      a light input surface defining coupling features, wherein the light emitter is disposed adjacent the light input surface and emits light into the coupling features;
      a light transmission portion disposed between the light input surface and a light extraction portion, wherein light from the light emitter received at the light input surface propagates through the light transmission portion toward the light extraction portion; and
      the light extraction portion comprising at least one light redirection feature and at least one light extraction feature that cooperate to generate a controlled light pattern exiting the lighting device, the light extraction portion positioned to extract a redirected portion of light received from at least one light deflection surface of the light transmission portion, and positioned to receive a non-redirected portion of light received from the light transmission portion.

2. The lighting device of claim 1, wherein the controlled light pattern comprises a uniform illumination pattern on a target surface.

3. The lighting device of claim 1, wherein the controlled light pattern comprises a circular illumination pattern on a target surface.

4. The lighting device of claim 1, wherein the controlled light pattern comprises a rectangular illumination pattern on a target surface.

5. The lighting device of claim 1, wherein the light deflection surface comprises one or more walls the light transmission portion.

6. The lighting device of claim 5, wherein:
the body comprises a width dimension, a length dimension, and a thickness dimension; and
the first extraction surface is curved along the thickness dimension.

7. The lighting device of claim 5, wherein the light extraction portion comprises a first extraction surface for extracting the redirected portion of light deflected by the at least one light deflection surface out of the body and a second extraction surface for extracting non-redirected portion of light.

8. The lighting device of claim 7, wherein the light extraction portion comprises a first section proximal to the light input surface and comprising the first extraction surface, and a second section distal from the light input surface and comprising the second extraction surface.

9. The lighting device of claim 1, wherein the first section further comprises a third extraction surface spaced from the first extraction surface.

10. The lighting device of claim 9, wherein:
the waveguide body comprises a width dimension and a length dimension; and
the first extraction surface is curved along the width dimension and the length dimension.

11. The lighting device of claim 1, wherein:
the light input surface is disposed at an edge of the waveguide body;
the light extraction portion is disposed at an interior of the waveguide body; and
the light transmission portion at least partially surrounds the light extraction portion.

12. A lighting device, comprising:
a housing;
a light emitting diode (LED) light source disposed in the housing; and
a waveguide at least partially disposed in an opening of the housing and comprising:
a light input surface, wherein the LED light source emits light into the light input surface;
a light transmission portion disposed between the light input surface and a light extraction portion, wherein light from the LED light source received at the light input surface propagates through the light transmission portion toward the light extraction portion; and
the light extraction portion comprising at least two spaced surfaces for directing light out of the body to generate a controlled light pattern exiting the lighting device, the light extraction portion positioned to extract a redirected portion of light received from at least one light deflection surface of the light transmission portion, and positioned to receive a non-redirected portion of light received from the light transmission portion.

13. The lighting device of claim 12, wherein the controlled light pattern comprises a uniform illumination pattern on a target surface.

14. The lighting device of claim 12, wherein the controlled light pattern comprises at least one of a circular or a rectangular illumination pattern on a target surface.

15. The lighting device of claim 12, wherein:
the waveguide body comprises a width dimension and a length dimension; and
at least one of the at least two spaced surfaces is curved in the width and length dimensions.

16. The lighting device of claim 12, wherein the light extraction portion comprises a first section proximal to the light input surface and comprising one of the at least two spaced surfaces and a second section distal from the light input surface and comprising another of the at least two spaced surfaces.

17. The lighting device of claim 16, wherein the at least two spaced surfaces comprise a first surface in the first section, a second surface in the second section, and a third surface in the first section.

18. The lighting device of claim 16, wherein the waveguide body comprises:
a width dimension, a length dimension, and a thickness dimension; and
at least one of the at least two spaced extraction surfaces is curved in the thickness dimension.

19. The lighting device of claim 16, wherein:
the waveguide body comprises a width dimension, a length dimension, and a thickness dimension; and
the at least two spaced surfaces are disposed opposite one another along the thickness dimension.

20. The lighting device of claim 16, wherein the light input surface is disposed at an edge of the body and the light extraction portion is disposed at an interior of the waveguide body.

* * * * *